US007210236B2

(12) United States Patent
Sato et al.

(10) Patent No.: US 7,210,236 B2
(45) Date of Patent: May 1, 2007

(54) METHOD AND APPARATUS FOR MEASURING MAGNETIC OFFSET OF GEOMAGNETIC SENSOR AND PORTABLE ELECTRONIC APPARATUS

(75) Inventors: Hideki Sato, Hamamatsu (JP); Satoshi Nihashi, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 41 days.

(21) Appl. No.: 11/150,643

(22) Filed: Jun. 10, 2005

(65) Prior Publication Data
US 2005/0283988 A1    Dec. 29, 2005

(30) Foreign Application Priority Data

| Jun. 11, 2004 | (JP) | 2004-174108 |
| Jun. 14, 2004 | (JP) | 2004-175672 |
| Jun. 30, 2004 | (JP) | 2004-194846 |

(51) Int. Cl.
G01C 17/38    (2006.01)
(52) U.S. Cl. .................. 33/356; 33/355 R; 702/92
(58) Field of Classification Search ........... 33/352, 33/355 R, 356–357, 316; 701/220; 702/92–94; 455/575.1
See application file for complete search history.

(56) References Cited

U.S. PATENT DOCUMENTS

| 4,751,783 | A | 6/1988 | Ina et al. |
| 6,768,957 | B2 * | 7/2004 | Kato ............................ 702/92 |
| 6,946,991 | B2 * | 9/2005 | Hasebe et al. .......... 342/357.08 |
| 7,028,410 | B2 * | 4/2006 | Sato et al. ..................... 33/356 |
| 2002/0056202 | A1 | 5/2002 | Tamura |
| 2003/0013507 | A1 | 1/2003 | Sato |
| 2003/0134665 | A1 | 7/2003 | Kato et al. |
| 2005/0072011 | A1 * | 4/2005 | Miyashita et al. ......... 33/355 R |
| 2005/0150122 | A1 * | 7/2005 | Cho et al. ..................... 33/356 |

FOREIGN PATENT DOCUMENTS

| EP | 1 519 148 A1 | 3/2005 |
| JP | 56-006169 | 1/1981 |
| JP | 3-152412 | 6/1991 |
| JP | 6-29731 | 4/1994 |

(Continued)

OTHER PUBLICATIONS

Written opinion of the International Searching Authority and International Search Report for PCT/JP2004/011191.

(Continued)

Primary Examiner—Yaritza Guadalupe-McCall
(74) Attorney, Agent, or Firm—Dickstein Shapiro LLP

(57) ABSTRACT

A method is designed for measuring a magnetic offset of a geomagnetic sensor equipped in a portable information terminal apparatus having a storage. The geomagnetic sensor has a magnetic sensitivity to a geomagnetic field and is affected by magnetization to cause the magnetic offset. In the method, an output of the geomagnetic sensor is measured to successively provide measurement data of the geomagnetic field from the output of the geomagnetic sensor. The measurement data is stored in the storage. The measurement data is read out from the storage when a number of the measurement data stored in the storage reaches a predetermined number, and an offset value of the magnetic offset is estimated based on the predetermined number of the measurement data read out from the storage.

38 Claims, 26 Drawing Sheets

FOREIGN PATENT DOCUMENTS

| | | |
|---|---|---|
| JP | 7-111348 | 11/1995 |
| JP | 8-105745 | 4/1996 |
| JP | 9-81308 | 3/1997 |
| JP | 9-133530 | 5/1997 |
| JP | 2003-294447 | 10/2003 |
| JP | 2004-012416 | 1/2004 |
| JP | 2004-12416 A | 1/2004 |
| KR | 2002-0030244 | 4/2002 |
| WO | WO 2004/003476 A1 | 1/2004 |

OTHER PUBLICATIONS

Written opinion of the International Searching Authority and International Search Report for PCT/JP2004/010479.

* cited by examiner

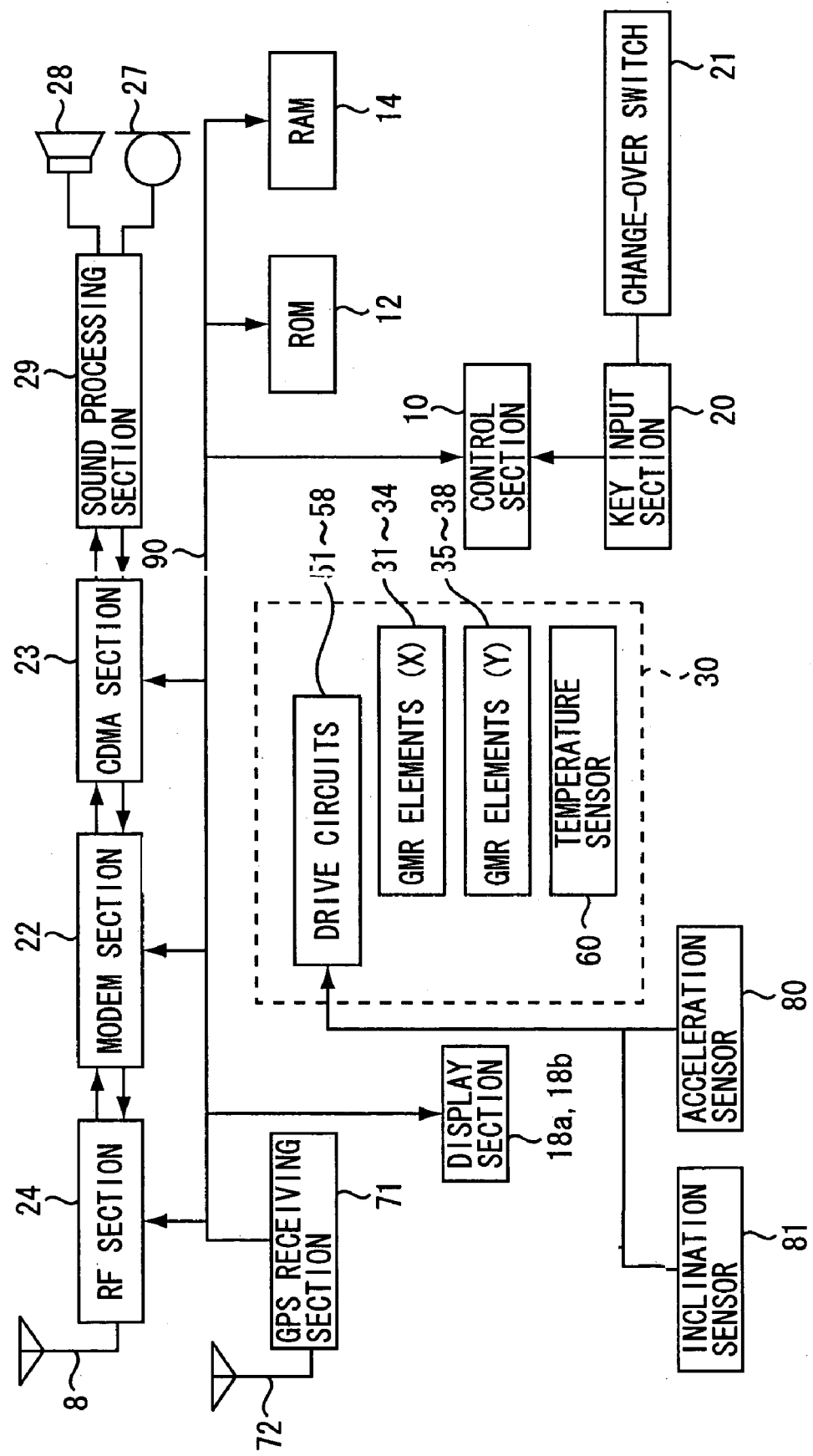

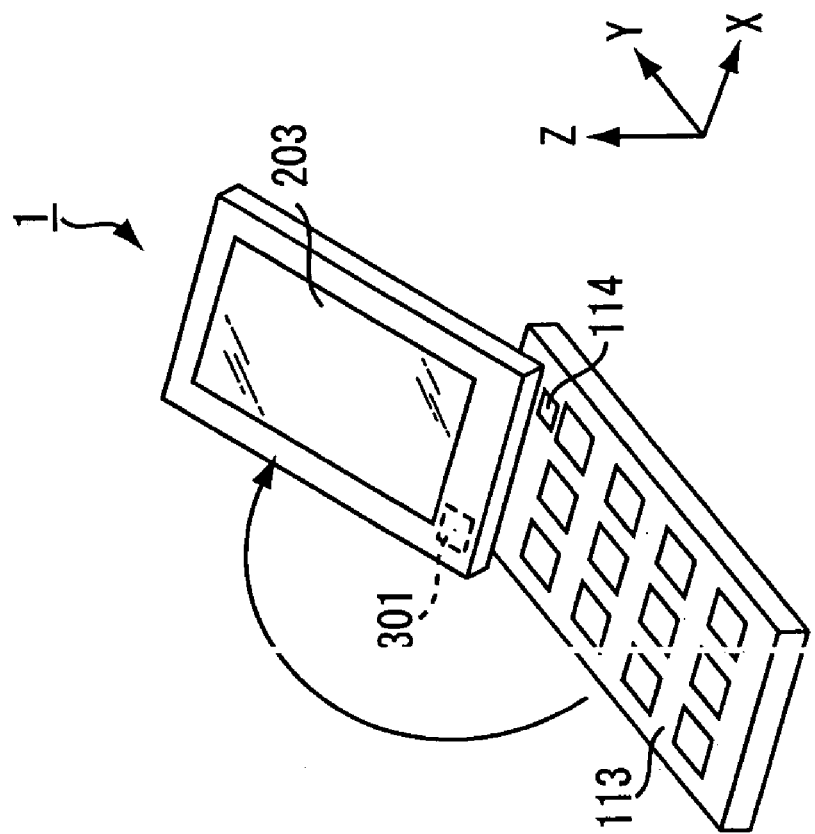
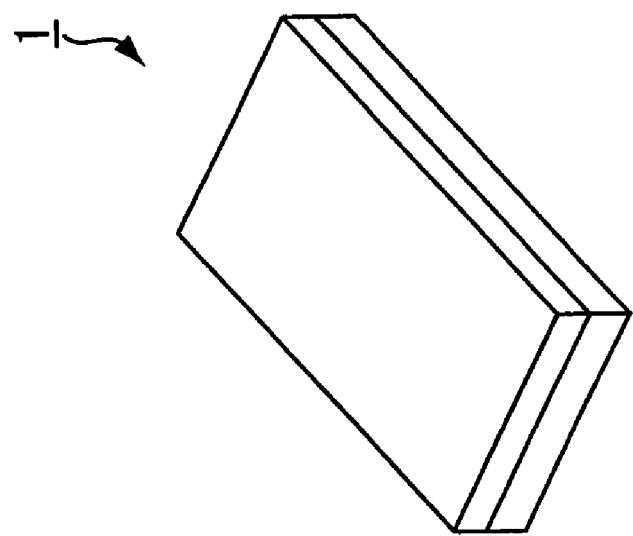

METHOD AND APPARATUS FOR MEASURING MAGNETIC OFFSET OF GEOMAGNETIC SENSOR AND PORTABLE ELECTRONIC APPARATUS

BACKGROUND OF THE INVENTION

1. Technical Field

The present invention relates to a method and apparatus for measuring a magnetic offset of a geomagnetic sensor equipped in a portable information terminal apparatus.

2. Background Art

In the case of a conventional geomagnetic sensor, when mounted inside a portable telephone (portable information terminal), because of the presence of magnetic fields leaking from a speaker, a metal package of magnetized electronic components, and so on that are mounted together, the geomagnetic sensor detects even those noise magnetic fields generated by them. As a result, there have been instances where, in a portable telephone that detects the geomagnetism by a geomagnetic sensor mounted therein, an azimuth calculated on the basis of a magnetic field existing inside the portable telephone does not indicate a correct azimuth.

For example, in a portable telephone mounted with a geomagnetic sensor having sensitivity directions along two axes (X- and Y-axis directions) perpendicular to each other and having sensitivities equal to each other in the respective directions, given that an angle formed between a vector of the geomagnetism and the X-axis is θ, a detection value Vx of the geomagnetic sensor in the X-axis direction and a detection value Vy of the geomagnetic sensor in the Y-axis direction are obtained as outputs in the state where offset m and n corresponding to magnetization amounts in the X- and Y-axis directions, respectively, are added as expressed by (formula 1) and (formula 2), respectively, due to a noise magnetic field existing inside the portable telephone.

$$Vx = R \times \cos\theta + m \quad \text{(formula 1)}$$

$$Vy = R \times \sin\theta + n \quad \text{(formula 2)}$$

(where R is a proportional constant)

That is, when a non-magnetized geomagnetic sensor disposed at a certain fixed place rotates in the state where there is no change in geomagnetism, i.e. a constant external magnetic field is applied, detection values of the geomagnetic sensor draw a real circle having center coordinates (0, 0). Hereinafter, a circle drawn by detection values of a geomagnetic sensor will be referred to as an compass circle. On the other hand, when a magnetized geomagnetic sensor is rotated, detection values of the geomagnetic sensor a real circle having center coordinates (m, n) as shown in FIG. 21. Use is made of a method wherein the center coordinates of the compass circle are derived to thereby equivalently derive magnetization amounts magnetized on the geomagnetic sensor and, by calculation of subtracting the center coordinate values (correction values) from detection values of the geomagnetic sensor, the detection values are corrected to thereby derive a correct azimuth.

Specifically, offsets of the center coordinate values are first derived. For example, when the geomagnetic sensor is caused to make a turn in the plane including the sensitivity directions, while being kept horizontal, to thereby derive detection values of the geomagnetic sensor in the X-axis and Y-axis directions with respect to all the directions, and maximum values and minimum values of these detection values are given as Xmax, Ymax and Xmin and Ymin, respectively, the offset center coordinates (m, n) are derived by the following formulas.

$$m = (X\max + X\min)/2 \quad \text{(formula 3)}$$

$$n = (Y\max + Y\min)/2 \quad \text{(formula 4)}$$

Otherwise, with respect to detection values (X1, Y1) obtained when the geomagnetic sensor is moved to a predetermined position A and output values (X2, Y2) obtained when the geomagnetic sensor is moved therefrom to a position D located in a 180° opposite direction while being kept horizontal, the center coordinates (m, n) are derived by the following formulas as the mean values thereof.

$$m = (X1 + X2)/2 \quad \text{(formula 5)}$$

$$n = (Y1 + Y2)/2 \quad \text{(formula 6)}$$

Then, the offset center coordinate values are subtracted by calculation to make correction. On the basis of the thus derived center coordinates (m, n), and a detection value Vx of the geomagnetic sensor in the X-axis direction and a detection value Vy of the geomagnetic sensor in the Y-axis direction, an azimuth angle θ is derived by the following formula.

When $|Vy-n| < |Vx-m|$ and $Vx-m > 0$, $\theta = \tan^{-1}((Vy-n)/(Vx-m))$     (formula 7).

When $|Vy-n| > |Vx-m|$ and $Vy-n > 0$, $\theta = 90[\deg] - \tan^{-1}((Vx-m)/(Vy-n))$     (formula 8).

When $|Vy-n| < |Vx-m|$ and $Vx-m < 0$, $\theta = 180[\deg] - \tan^{-1}((Vy-n)/(Vx-m))$     (formula 9).

When $|Vy-n| > |Vx-m|$ and $Vy-n < 0$, $\theta = 270[\deg] - \tan^{-1}((Vx-m)/(Vy-n))$     (formula 10).

However, in the foregoing conventional geomagnetic sensor correction method, since the magnetization state of the geomagnetic sensor always changes, it is necessary for a user to cause the portable telephone to make one or more turns in order to derive maximum values and minimum values of detection values of the geomagnetic sensor every time the geomagnetic sensor is considered to have been magnetized. There has been a problem that it is difficult, in particular, to cause the portable telephone to make one or more turns while keeping it horizontal so that there is a possibility of the portable telephone being dropped once in a while and, even with no occurrence of the portable telephone being dropped, variation occurs in obtained data so that an offset cannot be derived accurately. Therefore, there has also been a problem that the foregoing conventional geomagnetic sensor correction method is unsuitable for portable devices.

In view of this, Patent Document 1, for example, describes an electronic azimuth finder wherein magnetic field judging means judges whether or not the strength of a magnetic field detected by a magnetic sensor is outside a predetermined range and, when it is outside the range, judges that the magnetic sensor is magnetized, and the magnetized magnetic sensor is demagnetized by applying thereto an alternating damping magnetic field by the use of a coil that applies a bias magnetic field to the magnetic sensor in measurement. However, although the technique according to this publication can demagnetize, inside the electronic azimuth finder, a magnetic field generated by one, for example, a permanent magnet, that generates a magnetic field in a constant direction with respect to a direction of the electronic azimuth finder regardless of a direction of the geomagnetism, it cannot demagnetize an induction magnetic field that is generated by a soft magnetic body being a ferromagnetic body which can be magnetized or demagnetized relatively easily, for example, a lead of an electronic component, when the electronic azimuth finder moves in the geomagnetism. Therefore, the foregoing problem cannot be solved.

On the other hand, Patent Document 2 describes an azimuth detection device that judges whether or not a signal input into arithmetic means from a geomagnetic sensor deviates from a predetermined judgment zone, to thereby recognize, without rotation, that the magnetization amount of the geomagnetic sensor is large, and gives warning about it. However, the technique according to this publication detects that the magnetization amount of the magnetic sensor is large and gives warning, but does not disclose a specific technique about correction of output and therefore cannot solve the foregoing problem.

On the other hand, Patent Document 3 describes a magnetism detection method wherein, in advance, detection values of a magnetic sensor with respect to a predetermined uniform magnetic field are adjusted to certain values in the state where the foregoing soft magnetic body is not present in the neighborhood and then a correction coefficient is derived from detection values obtained when there is a magnetic field from a direction of magnetism-sensitive axis in the state where the soft magnetic body is present in the neighborhood and, by canceling an induction magnetic field generated around the soft magnetic body by the use of a predetermined calculation formula on the basis of the correction coefficient, an output caused by the foregoing induction magnetic field is corrected. However, the technique according to this publication does not disclose a specific technique about what situation requires the correction or what timing the correction is performed, and therefore cannot solve the foregoing problem.

On the other hand, Patent Document 4 describes an adjusting method for an electronic azimuth finder, wherein a magnetic field for adjustment is generated while changing the strength thereof according to a predetermined sequence by the use of a magnetic field generator that can generate a magnetic field stronger than the geomagnetism and adjusting data is obtained using a sequence that obtains data or a magnetic sensor according to the predetermined sequence, thereby performing an adjustment. However, there has been a problem that the technique according to this publication requires, apart from the electronic azimuth finder, the magnetic field generator that applies the external magnetic field.

Aside, Patent Document 5 describes a calibration method of the magnetic sensor mounted in the portable terminal. In this technique, a portable terminal is rotated per predetermined angle and, based on data measured by a magnetic sensor at respective angles, an offset is estimated to thereby carry out calibration without depending on the rotation speed. However, even in the method described in Patent Document 5, it is necessary for a user to consciously rotate the portable device mounted with the magnetic sensor to thereby perform calibration thereof. Therefore, although improved as compared with conventional, since the user is forced to carry out the operation for calibration, it still remains troublesome to the user. Further, if the user neglects or forgets the calibration, the geomagnetic sensor cannot be operated in an optimal state.

[Patent Document 1]
Unexamined Patent Publication No. Hei 6-174472
[Patent Document 2]
Unexamined Patent Publication No. Hei 6-249663
[Patent Document 3]
Unexamined Patent Publication No. Hei 7-151842
[Patent Document 4]
Unexamined Patent Publication No. 2002-48551
[Patent Document 5]
Unexamined Patent Publication No. 2004-12416

SUMMARY OF THE INVENTION

Therefore, the present invention has been made in consideration of the foregoing circumstances and has an object to provide a geomagnetic sensor correction method that corrects an offset caused by magnetization, for example, only by swinging a geomagnetic sensor on a horizontal plane, and a portable information terminal that can simplify an operation for correction of an offset of a geomagnetic sensor by the use of an azimuth data processing device that performs correction of the geomagnetic sensor.

The present invention has been made also in view of the foregoing points and provides a portable electronic apparatus having an azimuth detection function that can easily perform calibration of azimuth detection element in the form of a magnetic sensor mounted in the folding portable electronic apparatus without applying a load to a user, and a calibration method thereof.

For achieving the foregoing objects, this invention proposes the following means.

In a first aspect of the invention, there is provided a method of measuring a magnetic offset of a geomagnetic sensor equipped in a portable information terminal apparatus, the geomagnetic sensor having a magnetic sensitivity to a geomagnetic field in a plurality of axes of a coordinate system, and being affected by magnetization to cause the magnetic offset. The inventive method comprises: a data measurement step of measuring an output of the geomagnetic sensor and acquiring a plurality of measurement data of the geomagnetic field, each measurement data being represented by a data point in the coordinate system; an offset estimation step of estimating an offset value of the magnetic offset of the geomagnetic sensor from the plurality of the measurement data of the geomagnetic field, the offset value being represented by an offset point in the coordinate system; a mean value calculation step of calculating distances between the offset point corresponding to the offset value and a plurality of the data points corresponding to the plurality of the measurement data used for estimating of the offset value, and further calculating a mean value of the calculated distances between the offset point and the plurality of the data points; a standard deviation calculation step of calculating a standard deviation of the calculated distances with respect to the calculated mean value of the distances; and a validity judgment step of judging validity of the estimated offset value on the basis of the calculated standard deviation.

Preferably, the portable information terminal apparatus has a first storage and a second storage, and the data measurement step successively acquires the measurement data from the geomagnetic sensor. The inventive method further comprises, a data storing step of storing the measurement data successively acquired by the data measurement step into the first storage, so that the offset estimation step reads out the plurality of the measurement data from the first storage and estimates the offset value of the magnetic offset from the plurality of the measurement data read out from the first storage, and an offset storing step of storing the estimated offset data in the second storage when the validity of the estimated offset value is confirmed by the validity judgment step.

Preferably, the portable information terminal apparatus has a first storage for storing the measurement data and a second storage for storing the offset value, and the data measurement step successively acquires the measurement data including previous measurement data and current measurement data. The inventive method further comprises a distance calculation step of calculating a distance between a current data point corresponding to the current measurement data and a previous data point corresponding to the previous measurement data which has been stored in the first storage, a determining step of determining whether the calculated distance between the current data point and the previous data point is greater than a predetermined distance, a data storing step of storing the current measurement data in the first storage when the calculated distance is determined greater than the predetermined distance, thereby accumulating the measurement data in the first storage by repeating a routine of the distance calculation step, the determining step and the data storing step, so that the offset estimation step reads out the plurality of the measurement data from the first storage when a number of the measurement data stored in the first storage reaches a predetermined number and estimates the offset value of the magnetic offset from the plurality of the measurement data read out from the first storage, and an offset storing step of storing the estimated offset data in the second storage when the validity of the estimated offset value is confirmed by the validity judgment step.

Preferably, the inventive method further comprises a notifying step of notifying a user when the estimated offset value is judged not to be valid by the validity judgment step.

Preferably, the inventive method further comprises a comparing step of comparing with one anther the plurality of the measurement data each of which is used for the estimating of the offset value and each of which is denoted by a set of coordinate components corresponding to a set of the axes of the coordinate system, such that the comparing is done in terms of the coordinate components of the measurement data for each axis to obtain a difference between a maximum value and a minimum value of the coordinate components for each axis, wherein the validity judgment step judges the validity of the estimated offset value on the basis of the obtained difference between the maximum value and the minimum value of the coordinate components for each axis in addition to the calculated standard deviation.

Preferably in the inventive method, the data measurement step measures the output of the geomagnetic sensor which is selected from a group consisting of a Giant Magnetoresistive device, a Tunneling Magnetoresistive device, a Magnetoresistive device, a Hall device, a Magneto Impedance device and a flux gate sensor.

Preferably, the data measurement step measures the output of the geomagnetic sensor having a magnetic sensitivity either in two axes of a two dimensional coordinate system or three axes of a three dimensional coordinate system, such that each measurement data is represented by a data point in either of the two dimensional coordinate system or the three dimensional coordinate system.

There is provided another method of measuring a magnetic offset of a geomagnetic sensor equipped in a portable information terminal apparatus having a storage, the geomagnetic sensor having a magnetic sensitivity to a geomagnetic field in a plurality of axes of a coordinate system and being affected by magnetization to cause the magnetic offset. The inventive method comprises: a data measurement step of measuring an output of the geomagnetic sensor, and successively providing a plurality of measurement data of the geomagnetic field including previous measurement data and current measurement data, each measurement data being represented by a data point in the coordinate system; a distance determining step of calculating a distance between a current data point corresponding to the current measurement data and a previous data point corresponding to the previous measurement data which has been stored in the storage, and determining whether the calculated distance between the current data point and the previous data point is greater than a predetermined distance; a data storing step of storing the current measurement data in the storage when the calculated distance is determined greater than the predetermined distance, thereby accumulating the measurement data in the storage; and an offset estimation step of reading a plurality of the measurement data from the storage and estimating an offset value of the magnetic offset from the plurality of the measurement data read out from the storage.

There is provided a further method of measuring a magnetic offset of a geomagnetic sensor equipped in a portable information terminal apparatus having a storage and an inclination sensor, the geomagnetic sensor having a magnetic sensitivity to a geomagnetic field in two axes of a two dimensional coordinate system and being affected by magnetization to cause the magnetic offset, the inclination sensor sensing an inclination angle of the portable information terminal apparatus. The inventive method comprises: a data measurement step of measuring an output of the geomagnetic sensor, and successively providing a plurality of the measurement data of the geomagnetic field including preceding measurement data and succeeding measurement data; an inclination measurement step of measuring an output of the inclination sensor and successively providing a plurality of angle data which represent the inclination angles of the portable information terminal apparatus and which include preceding angle data measured concurrently with the preceding measurement data and succeeding angle data measured concurrently with the succeeding measurement data; a data storing step of storing the succeeding measurement data in the storage when a difference between a inclination angle of the portable information terminal apparatus denoted by the succeeding angle data and another inclination angle of the portable information terminal apparatus denoted by the preceding angle data is greater than a predetermined difference, thereby accumulating the measurement data in the storage by repeating a routine of the data measurement step, the inclination measurement step and the data storing step; and an offset estimation step of reading out a plurality of the accumulated measurement data from the storage and estimating the offset value of the magnetic offset from the plurality of the accumulated measurement data read out from the storage.

Preferably, the offset estimation step reads out the plurality of the accumulated measurement data from the storage to estimate the offset value when a number of the measurement data accumulated in the storage reaches a predetermined number. The inventive method further comprises a mean value calculation step of calculating distances between an offset point defined in the two dimensional coordinate system in correspondence to the estimated offset value and a plurality of data points defined in the two dimensional coordinate system in correspondence to the plurality of the measurement data used for the estimating of the offset value, and further calculating a mean value of the calculated distances between the offset point and the plurality of the data points, a standard deviation calculation step of calculating a standard deviation of the calculated distances with respect to the calculated mean value of the distances, a validity judgment step of judging validity of the estimated offset value on the basis of the calculated standard deviation, and an offset storing step of storing the estimated offset data when the validity of the estimated offset value is confirmed by the validity judgment step.

There is provided a still further method of measuring a magnetic offset of a geomagnetic sensor equipped in a portable information terminal apparatus having a storage, the geomagnetic sensor having a magnetic sensitivity to a geomagnetic field and being affected by magnetization to cause the magnetic offset. The inventive method comprises: a data measurement step of measuring an output of the geomagnetic sensor and successively providing measurement data of the geomagnetic field from the output of the geomagnetic sensor; a data storing step of storing the measurement data into the storage; and an offset estimation step of reading out the measurement data from the storage when a number of the measurement data stored in the storage reaches a predetermined number, and estimating an offset value of the magnetic offset based on the predetermined number of the measurement data read out from the storage.

According to the first aspect of the invention, the validity of the offset value estimated by the offset estimation step is judged by the validity judgment step. Therefore, it is possible to constantly obtain proper offset value. Note that a distance between arbitrary measurement points (detection values) on the compass circle is defined as a "distance". According to this invention, the validity of the offset value estimated by the offset estimation step is judged by the validity judgment step and, when the validity is confirmed, the offset value stored in the first storage means is updated. Therefore, it is possible to constantly store proper offset value in the first storage means. According to this invention, the measurement data is entered only when a current measurement point is located at a position that is distanced from a one-prior measurement point by a certain value or more in the vicinity of the compass circle formed by the measurement data of the geomagnetic sensor. Therefore, even if the speed of swinging the portable information terminal is not uniform, it is possible to equalize distribution of the measurement data. According to this invention, the measurement data is entered only when either the detection output of the geomagnetic sensor or the detection output of the inclination sensor at a current measurement point has changed over a prescribed amount as compared with that at a one-prior measurement point. Therefore, it is possible to avoid a problem that the measurement data is not entered however long the time passes, except a case where the geomagnetism is directed perpendicularly to the ground. According to this invention, when the offset value is not valid, the user is notified to that effect. Therefore, the user can recognize that the estimation of offset value has not been completed. According to this invention, when the offset values are not valid, the correction of the offset is carried out again after confirming whether or not the user wishes it. Therefore, the correction of the offset can be implemented until offset values become valid, and can be selected according to convenience of the user. According to this invention, in the portable information terminal mounted with the geomagnetic sensor having the two-axis magnetism-sensitive directions, it is easily correct the influence to measurement data values due to the offset of the output caused by magnetization of the geomagnetic sensor.

Further in the first aspect of the invention, there is provided an apparatus for measuring a magnetic offset of a geomagnetic sensor equipped in a portable information terminal, the geomagnetic sensor having a magnetic sensitivity to a geomagnetic field in a plurality of axes of a coordinate system, and being affected by magnetization to cause the magnetic offset. The inventive apparatus comprises: a data measurement section that measures an output of the geomagnetic sensor and that acquires a plurality of measurement data of the geomagnetic field, each measurement data being represented by a data point in the coordinate system; an offset estimation section that estimates an offset value of the magnetic offset of the geomagnetic sensor from the plurality of the measurement data of the geomagnetic field, the offset value being represented by an offset point in the coordinate system; a mean value calculation section that calculates distances between the offset point corresponding to the offset value and a plurality of the data points corresponding to the plurality of the measurement data used for estimating of the offset value, and further calculates a mean value of the calculated distances between the offset point and the plurality of the data points; a standard deviation calculation section that calculates a standard deviation of the calculated distances with respect to the calculated mean value of the distances; and a validity judgment section that judges validity of the estimated offset value on the basis of the calculated standard deviation.

There is provided another apparatus for measuring a magnetic offset of a geomagnetic sensor equipped in a portable information terminal, the geomagnetic sensor having a magnetic sensitivity to a geomagnetic field in a plurality of axes of a coordinate system and being affected by magnetization to cause the magnetic offset. The inventive apparatus comprises: a data measurement section that measures an output of the geomagnetic sensor, and successively provides a plurality of measurement data of the geomagnetic field including previous measurement data and current measurement data, each measurement data being represented by a data point in the coordinate system; a distance determining section that calculates a distance between a current data point corresponding to the current measurement data and a previous data point corresponding to the previous measurement data which has been stored in the storage, and that determines whether the calculated distance between the current data point and the previous data point is greater than a predetermined distance; a data storage that stores the current measurement data when the calculated distance is determined greater than the predetermined distance, thereby accumulating the measurement data; and an offset estimation section that reads a plurality of the measurement data from the data storage and estimates an offset value of the magnetic offset from the plurality of the measurement data read out from the data storage.

There is provided a further apparatus for measuring a magnetic offset of a geomagnetic sensor equipped in a portable information terminal having an inclination sensor, the geomagnetic sensor having a magnetic sensitivity to a geomagnetic field in two axes of a two dimensional coordinate system and being affected by magnetization to cause the magnetic offset, the inclination sensor sensing an inclination angle of the portable information terminal. The inventive apparatus comprises: a data measurement section that measures an output of the geomagnetic sensor, and successively provides a plurality of the measurement data of the geomagnetic field including preceding measurement data and succeeding measurement data; an inclination measurement section that measures an output of the inclination sensor and successively provides a plurality of angle data which represent the inclination angles of the portable information terminal and which include preceding angle data measured concurrently with the preceding measurement data and succeeding angle data measured concurrently with the succeeding measurement data; a data storage that stores the succeeding measurement data when a difference between a inclination angle of the portable information terminal denoted by the succeeding angle data and another inclination angle of the portable information terminal denoted by the preceding angle data is greater than a predetermined difference, thereby accumulating the measurement data by repeatedly operating the data measurement section and the inclination measurement section; and an offset estimation section that reads out a plurality of the accumulated measurement data from the data storage and estimates the offset value of the magnetic offset from the plurality of the accumulated measurement data read out from the data storage.

There is provided a still further apparatus for measuring a magnetic offset of a geomagnetic sensor equipped in a portable information terminal, the geomagnetic sensor having a magnetic sensitivity to a geomagnetic field and being affected by magnetization to cause the magnetic offset. The inventive apparatus comprises: a data measurement section that measures an output of the geomagnetic sensor and successively provides measurement data of the geomagnetic field from the output of the geomagnetic sensor; a data storage that stores the measurement data; and an offset estimation section that reads out the measurement data from the data storage when a number of the measurement data stored in the data storage reaches a predetermined number, and that estimates an offset value of the magnetic offset based on the predetermined number of the measurement data read out from the data storage.

Moreover in the first aspect of the invention, there is provided a machine readable medium for use in a portable information terminal apparatus having a CPU and geomagnetic sensor which has a magnetic sensitivity to a geomagnetic field in a plurality of axes of a coordinate system and which is affected by magnetization to cause an magnetic offset. The inventive medium contains program instructions executable by the CPU for causing the portable information terminal apparatus to perform a method of measuring the magnetic offset of the geomagnetic sensor, wherein the method comprises: a data measurement step of measuring an output of the geomagnetic sensor and acquiring a plurality of measurement data of the geomagnetic field, each measurement data being represented by a data point in the coordinate system; an offset estimation step of estimating an offset value of the magnetic offset of the geomagnetic sensor from the plurality of the measurement data of the geomagnetic field, the offset value being represented by an offset point in the coordinate system; a mean value calculation step of calculating distances between the offset point corresponding to the offset value and a plurality of the data points corresponding to the plurality of the measurement data used for estimating of the offset value, and further calculating a mean value of the calculated distances between the offset point and the plurality of the data points; a standard deviation calculation step of calculating a standard deviation of the calculated distances with respect to the calculated mean value of the distances; and a validity judgment step of judging validity of the estimated offset value on the basis of the calculated standard deviation.

There is provided another machine readable medium for use in a portable information terminal apparatus having a CPU, a storage and a geomagnetic sensor which has a magnetic sensitivity to a geomagnetic field in a plurality of axes of a coordinate system and which is affected by magnetization to cause an magnetic offset. The inventive medium contains program instructions executable by the CPU for causing the portable information terminal apparatus to perform a method of measuring the magnetic offset of the geomagnetic sensor, wherein the method comprises: a data measurement step of measuring an output of the geomagnetic sensor, and successively providing a plurality of measurement data of the geomagnetic field including previous measurement data and current measurement data, each measurement data being represented by a data point in the coordinate system; a distance determining step of calculating a distance between a current data point corresponding to the current measurement data and a previous data point corresponding to the previous measurement data which has been stored in the storage, and determining whether the calculated distance between the current data point and the previous data point is greater than a predetermined distance; a data storing step of storing the current measurement data in the storage when the calculated distance is determined greater than the predetermined distance, thereby accumulating the measurement data in the storage; and an offset estimation step of reading a plurality of the measurement data from the storage and estimating an offset value of the magnetic offset from the plurality of the measurement data read out from the storage.

There is provided a further machine readable medium for use in a portable information terminal apparatus having a CPU, a storage, a geomagnetic sensor and an inclination sensor, the geomagnetic sensor having a magnetic sensitivity to a geomagnetic field in two axes of a two dimensional coordinate system and being affected by magnetization to cause a magnetic offset, the inclination sensor sensing an inclination angle of the portable information terminal apparatus. The inventive medium contains program instructions executable by the CPU for causing the portable information terminal apparatus to perform a method of measuring the magnetic offset of the geomagnetic sensor, wherein the method comprises: a data measurement step of measuring an output of the geomagnetic sensor, and successively providing a plurality of the measurement data of the geomagnetic field including preceding measurement data and succeeding measurement data; an inclination measurement step of measuring an output of the inclination sensor and successively providing a plurality of angle data which represent the inclination angles of the portable information terminal apparatus and which include preceding angle data measured concurrently with the preceding measurement data and succeeding angle data measured concurrently with the succeeding measurement data; a data storing step of storing the succeeding measurement data in the storage when a difference between a inclination angle of the portable information terminal apparatus denoted by the succeeding angle data and another inclination angle of the portable information terminal apparatus denoted by the preceding angle data is greater than a predetermined difference, thereby accumulating the measurement data in the storage by repeating a routine of the data measurement step, the inclination measurement step and the data storing step; and an offset estimation step of reading out a plurality of the accumulated measurement data from the storage and estimating the offset value of the magnetic offset from the plurality of the accumulated measurement data read out from the storage.

There is provided a still further machine readable medium for use in a portable information terminal apparatus having a CPU, a storage and a geomagnetic sensor which has a magnetic sensitivity to a geomagnetic field and which is affected by magnetization to cause an magnetic offset. The inventive medium contains program instructions executable by the CPU for causing the portable information terminal apparatus to perform a method of measuring the magnetic offset of the geomagnetic sensor, wherein the method comprises: a data measurement step of measuring an output of the geomagnetic sensor and successively providing measurement data of the geomagnetic field from the output of the geomagnetic sensor; a data storing step of storing the measurement data into the storage; and an offset estimation step of reading out the measurement data from the storage when a number of the measurement data stored in the storage reaches a predetermined number, and estimating an offset value of the magnetic offset based on the predetermined number of the measurement data read out from the storage.

In a second aspect of the invention, there is provided a portable electronic apparatus having a foldable body handled by opening operation and closing operation, comprising: an azimuth detection section that has a geomagnetic sensor for measuring a geomagnetism with an offset and outputting measurement data of the geomagnetism such that the measurement data may contain an error due to the offset, and that detects an azimuth direction based on the measurement data from the geomagnetic sensor; an open/close detection section that detects the opening operation and the closing operation of the foldable body; and a control section that responds when either of the opening operation or the closing operation is detected for commencing acquisition of a series of the measurement data from the geomagnetic sensor, then that estimates a value of the offset on the basis of the acquired series of the measurement data, and that sets the estimated value of the offset for use in correcting the error contained in the measurement data during the detection of the azimuth direction.

Preferably, the foldable body comprises a pair of units coupled to open and close with one another by the opening operation and the closing operation, and wherein the open/close detection section physically senses the opening and closing of the pair of the units for detecting the opening operation and the closing operation.

Preferably, the pair of the units comprise a stationary unit which is generally held stationary in the opening operation and a movable unit which is moved relative to the stationary unit in response to the opening operation, and wherein the geomagnetic sensor is mounted in the movable unit.

Preferably, the inventive portable electronic apparatus further comprises a display device that displays information associated with operations of the portable electronic apparatus and that is mounted in the movable unit.

Preferably, the foldable body contains a magnetic source of generating a magnetism which may cause the offset in the geomagnetic sensor, and wherein the geomagnetic sensor is positioned in the foldable body remote from the magnetic source such a manner as to reduce a magnetic influence of the magnetic source.

Preferably, the inventive portable electronic apparatus further comprises a validity judgment section that judges validity of the estimated value of the offset, a notification section that operates when the estimated value of the offset is judged invalid by the validity judgment section for prompting a user to perform again the opening operation or the closing operation.

Preferably, the inventive portable electronic apparatus further comprises a validity judgment section that judges validity of the estimated value of the offset, a notification section that operates when the estimated value of the offset is judged invalid by the validity judgment section for prompting a user to further perform the opening operation and the closing operation while placing the foldable body in different orientations.

Preferably, the foldable body is a revolver type having a part which revolves in the opening operation or the closing operation.

Preferably, the geomagnetic sensor measures the geomagnetism in three axes orthogonal to each other, and wherein the foldable body of the revolver type comprises a pair of a stationary unit and a movable unit, which are coupled to open and close with one another by the opening operation and the closing operation, the stationary unit generally being held stationary in the opening operation and the movable unit being revolved to displace in directions of the three axes in response to the opening operation.

There is provided another apparatus for measuring a magnetic offset of a geomagnetic sensor which has a magnetic sensitivity to a geomagnetism in axes X, Y and Z of a coordinate system XYZ, and which is affected by magnetization to cause the magnetic offset. The inventive apparatus comprises: a data measurement section that measures an output of the geomagnetic sensor and acquires a plurality of measurement data (xi, yi, zi) (i=1, . . . , N) of the geomagnetism; and an offset estimation section that estimates an offset value (X0, Y0, Z0) of the magnetic offset of the geomagnetic sensor from the plurality of the measurement data (xi, yi, zi) (i=1, . . . , N) of the geomagnetism, wherein the offset value (X0, Y0, Z0) is estimated by the following computation algorithm (1) through (6):

(1) assuming a compass sphere of the geomagnetic sensor having a radius R in the coordinate system XYZ, and making an equation $(xi-X0)^2+(yi-Y0)^2+(zi-Z0)^2=R^2$ for each of the measurement data (xi, yi, zi) (i=1, . . . , N);

(2) defining a square error $\epsilon$ for the above equations;

$$\varepsilon = \sum \{(x_i - X0)^2 + (y_i - Y0)^2 + (z_i - Z0)^2 - R^2\}^2$$
$$= \sum \{(x_i^2 + y_i^2 + z_i^2) - 2x_iX0 - 2y_iY0 - 2z_iZ0 + (X0^2 + Y0^2 + Z0^2) - R^2\}^2$$

(3) shaping the square error $\epsilon$ as follows;

$\epsilon = \Sigma(a_i + b_iX0 + c_iY0 + d_iZ0 + D)^2$ where, $a = xi^2 + yi^2 + zi^2$, $b = -2xi$, $c = -2yi$, $d = -2zi$ and $D = (X0^2 + Y0^2 + Z0^2) - R^2$;

(4) differentiating $\epsilon$ with the variables X0, Y0, Z0, and D as follows for setting the square error $\epsilon$ to the minimum;

$$\begin{cases} \dfrac{\partial \varepsilon}{\partial X0} = 2\sum (a_i + b_i X0 + c_i Y0 + d_i Z0 + D)b_i = 0 \\ \dfrac{\partial \varepsilon}{\partial Y0} = 2\sum (a_i + b_i X0 + c_i Y0 + d_i Z0 + D)c_i = 0 \\ \dfrac{\partial \varepsilon}{\partial Z0} = 2\sum (a_i + b_i X0 + c_i Y0 + d_i Z0 + D)d_i = 0 \\ \dfrac{\partial \varepsilon}{\partial D} = 2\sum (a_i + b_i X0 + c_i Y0 + d_i Z0 + D) = 0 \end{cases}$$

(5) obtaining the following simultaneous equations by effecting the above differentiating computation, where the variables X0, Y0, Z0 and D are treated as an independent variable of $\epsilon$ for simplifying the computation;

$$\begin{bmatrix} [bb] & [bc] & [bd] & [b] \\ [bc] & [cc] & [cd] & [c] \\ [bd] & [cd] & [dd] & [d] \\ [b] & [c] & [d] & N \end{bmatrix} \begin{bmatrix} X0 \\ Y0 \\ Z0 \\ D \end{bmatrix} = \begin{bmatrix} -[ab] \\ -[ac] \\ -[ad] \\ -[a] \end{bmatrix}$$

where the operator [ ] used in the above equation represents:

$$[m] = \sum_{i=1}^{N} m_i, \quad [mn] = \sum_{i=1}^{N} m_i n_i$$

(6) solving these simultaneous equations to derive the estimated offset (X0, Y0, Z0).

There is provided another azimuth data computing apparatus with a geomagnetic sensor, comprising: a data acquisition section that inputs a signal from the geomagnetic sensor to measure a magnetic field which may be a mixture of a geomagnetic field and other magnetic field causing an offset, thereby providing measurement data of the magnetic field, which is represented by a set of coordinate components corresponding to a set of different axes of a given coordinate system; an offset calculating section that calculates an offset value of the offset based on a plurality of the measurement data which are measured successively from the signal inputted from the geomagnetic sensor; a comparing section that compares the plurality of the measurement data used for calculating the offset value with one another in terms of the coordinate components of each axis to obtain a difference between a maximum value and a minimum value of the coordinate components for each axis; a judging section that judges the calculated offset value to be valid when the difference obtained for each axis is greater than a predetermined difference; an updating section that updates a previous offset value based on the offset value currently judged to be valid; and a correcting section that corrects the measurement data according to the updated offset value and computes azimuth data according to the corrected measurement data.

Further in the second aspect of the invention, there is provided an azimuth measurement method performed in a portable electronic apparatus having a geomagnetic sensor and a foldable body handled by opening operation and closing operation. The inventive method comprises the steps of: using the geomagnetic sensor to measure a geomagnetism with a certain offset and outputting measurement data of the geomagnetism such that the measurement data may contain an error due to the offset; detecting an azimuth direction based on the measurement data from the geomagnetic sensor; detecting the opening operation and the closing operation of the foldable body, and commencing acquisition of a series of the measurement data from the geomagnetic sensor when either of the opening operation or the closing operation of the foldable body is detected; estimating a value of the offset on the basis of the acquired series of the measurement data; and setting the estimated value of the offset for use in correcting the error contained in the measurement data during the detection of the azimuth direction.

There is provided a method of measuring a magnetic offset of a geomagnetic sensor which has a magnetic sensitivity to a geomagnetism in axes X, Y and Z of a coordinate system XYZ, and which is affected by magnetization to cause the magnetic offset. The inventive method comprises: a data measurement step of measuring an output of the geomagnetic sensor and acquiring a plurality of measurement data (xi, yi, zi) (i=1, ..., N) of the geomagnetism; and an offset estimation step of estimating an offset value (X0, Y0, Z0) of the magnetic offset of the geomagnetic sensor from the plurality of the measurement data (xi, yi, zi) (i=1, ..., N) of the geomagnetism, wherein the offset value (X0, Y0, Z0) is estimated by the steps (1) through (6) of:

(1) assuming a compass sphere of the geomagnetic sensor having a radius R in the coordinate system XYZ, and making an equation $(xi-X0)^2+(yi-Y0)^2+(zi-Z0)^2=R^2$ for each of the measurement data (xi, yi, zi) (i=1, ..., N);

(2) defining a square error $\epsilon$ for the above equations;

$$\varepsilon = \sum \{(x_i - X0)^2 + (y_i - Y0)^2 + (z_i - Z0)^2 - R^2\}^2$$
$$= \sum \{(x_i^2 + y_i^2 + z_i^2) - 2x_i X0 - 2y_i Y0 - 2z_i Z0 + (X0^2 + Y0^2 + Z0^2) - R^2\}^2$$

(3) shaping the square error $\epsilon$ as follows;

$\epsilon = \Sigma(a_i + b_i X0 + c_i Y0 + d_i Z0 + D)^2$ where, $a_i = xi^2 + yi^2 + zi^2,\ b_i = -2xi,\ c_i = -2yi,\ d_i = -2zi$ and $D = (X0^2 + Y0^2 + Z0^2) - R^2;$ (4) differentiating e with the variables X0, Y0, Z0, and D as follows for setting the square error $\epsilon$ to the minimum;

$$\begin{cases} \dfrac{\partial \varepsilon}{\partial X0} = 2\sum (a_i + b_i X0 + c_i Y0 + d_i Z0 + D)b_i = 0 \\ \dfrac{\partial \varepsilon}{\partial Y0} = 2\sum (a_i + b_i X0 + c_i Y0 + d_i Z0 + D)c_i = 0 \\ \dfrac{\partial \varepsilon}{\partial Z0} = 2\sum (a_i + b_i X0 + c_i Y0 + d_i Z0 + D)d_i = 0 \\ \dfrac{\partial \varepsilon}{\partial D} = 2\sum (a_i + b_i X0 + c_i Y0 + d_i Z0 + D) = 0 \end{cases}$$

(5) obtaining the following simultaneous equations by effecting the above differentiating computation, where the variables X0, Y0, Z0 and D are treated as an independent variable of $\epsilon$ for simplifying the computation, $$\begin{bmatrix} [bb] & [bc] & [bd] & [b] \\ [bc] & [cc] & [cd] & [c] \\ [bd] & [cd] & [dd] & [d] \\ [b] & [c] & [d] & N \end{bmatrix} \begin{bmatrix} X0 \\ Y0 \\ Z0 \\ D \end{bmatrix} = \begin{bmatrix} -[ab] \\ -[ac] \\ -[ad] \\ -[a] \end{bmatrix}$$

where the operator [ ] used in the above equation represents:

$$[m] = \sum_{i=1}^{N} m_i, \quad [mn] = \sum_{i=1}^{N} m_i n_i$$

(6) solving these simultaneous equations to derive the estimated offset (X0, Y0, Z0).

There is provided an azimuth data computing method comprising the steps of: inputting a signal from a geomagnetic sensor to measure a magnetic field which may be a mixture of a geomagnetic field and other magnetic field causing an offset, thereby providing measurement data of the magnetic field, which is represented by a set of coordinate components corresponding to a set of different axes of a given coordinate system; calculating an offset value of the offset based on a plurality of the measurement data which are measured successively from the signal inputted from the geomagnetic sensor; comparing the plurality of the measurement data used for calculating the offset value with one another in terms of the coordinate components of each axis to obtain a difference between a maximum value and a minimum value of the coordinate components for each axis; judging the calculated offset value to be valid when the difference obtained for each axis is greater than a predetermined difference; updating a previous offset value based on the offset value currently judged to be valid; and correcting the measurement data according to the updated offset value and computing azimuth data according to the corrected measurement data.

Further in the second aspect of the invention, there is provided an azimuth data computing program executable by a computer to perform a process of computing an azimuth data. The process comprises the steps of: acquiring a signal from a geomagnetic sensor to measure a magnetic field which may be a mixture of a geomagnetic field and other magnetic field causing an offset; providing measurement data of the magnetic field, which is represented by a set of coordinate components corresponding to a set of different axes of a given coordinate system; calculating an offset value of the offset based on a plurality of the measurement data which are measured successively from the signal inputted from the geomagnetic sensor; comparing the plurality of the measurement data used for calculating the offset value with one another in terms of the coordinate components of each axis to obtain a difference between a maximum value and a minimum value of the coordinate components for each axis; judging the calculated offset value to be valid when the difference obtained for each axis is greater than a predetermined difference; updating a previous offset value based on the offset value currently judged to be valid; and correcting the measurement data according to the updated offset value and computing azimuth data according to the corrected measurement data.

In a third aspect of the invention, there is provided a portable electronic apparatus having a foldable body handled by opening operation and closing operation, and generating a leakage magnetic field. The inventive apparatus comprises: an azimuth detection section that has a geomagnetic sensor for measuring a geomagnetic field with an offset and outputting measurement data of the geomagnetic field such that the measurement data may contain an error due to the offset, and that detects an azimuth direction based on the measurement data from the geomagnetic sensor; an offset estimation section that acquires a plurality of the measurement data from the geomagnetic sensor, and that estimates a value of the offset on the basis of the acquired measurement data for use in correcting the error contained in the measurement data during the detection of the azimuth direction; an operation detection section that detects the opening operation of the foldable body; and a leakage magnetic field removal section that operates when the opening operation of the foldable body is detected for computing a value of the leakage magnetic field generated in the foldable body and that subtracts the computed value of the leakage magnetic field from the estimated value of the offset, thereby removing an influence of the leakage magnetic field from the estimated value of the offset.

Preferably, the foldable body comprises a pair of units coupled to open and close with one another by the opening operation and the closing operation, and the operation detection section physically senses the opening of the pair of the units for detecting the opening operation.

Preferably, the leakage magnetic field removal section operates when the opening operation of the foldable body is detected for acquiring a series of the measurement data from the geomagnetic sensor, and computes the value of the leakage magnetic field based on the acquired measurement data.

Preferably the operation detection section further detects the closing operation of the foldable body, and wherein the offset estimation section operates when the closing operation is detected for commencing acquisition of a series of the measurement data from the geomagnetic sensor, and estimates the value of the offset on the basis of the acquired series of the measurement data.

There is provided a magnetic sensor device equipped in a portable electronic apparatus which has a foldable body handled by opening operation and closing operation, and which generates a leakage magnetic field. The magnetic sensor device comprises: an azimuth detection section that has a geomagnetic sensor for measuring a geomagnetic field with an offset and outputting measurement data of the geomagnetic field such that the measurement data may contain an error due to the offset, and that detects an azimuth direction based on the measurement data from the geomagnetic sensor; an offset estimation section that acquires a plurality of the measurement data from the geomagnetic sensor, and that estimates a value of the offset on the basis of the acquired measurement data for use in correcting the error contained in the measurement data during the detection of the azimuth direction; and a leakage magnetic field removal section that responds to the opening operation of the foldable body for computing a value of the leakage magnetic field generated in the foldable body and that subtracts the computed value of the leakage magnetic field from the estimated value of the offset, thereby removing an influence of the leakage magnetic field from the estimated value of the offset.

Further in the third aspect of the invention, there is provided an azimuth detection method performed in a portable electronic apparatus which has a geomagnetic sensor and a foldable body handled by opening operation and closing operation, and which generates a leakage magnetic field. The inventive method comprises the steps of: using the geomagnetic sensor for measuring a geomagnetic field with an offset and outputting measurement data of the geomagnetic field such that the measurement data may contain an error due to the offset; detecting an azimuth direction based on the measurement data from the geomagnetic sensor; acquiring a plurality of the measurement data from the geomagnetic sensor, and estimating a value of the offset on the basis of the acquired measurement data for use in correcting the error contained in the measurement data during the detection of the azimuth direction; detecting the opening operation of the foldable body; computing a value of the leakage magnetic field generated by the portable electronic apparatus when the opening operation of the foldable body is detected; and subtracting the computed value of the leakage magnetic field from the estimated value of the offset, thereby removing an influence of the leakage magnetic field from the estimated value of the offset.

Moreover in the third aspect of the invention, there is provided a machine readable medium for use in a portable electronic apparatus having a CPU, a geomagnetic sensor and a foldable body which is handled by opening operation and closing operation and which generates a leakage magnetic field. The machine readable medium contains an azimuth measurement program executable by the CPU for causing the portable electronic apparatus to perform an azimuth measurement process comprising the steps of: operating the geomagnetic sensor for measuring a geomagnetic field with a certain offset and outputting measurement data of the geomagnetic field such that the measurement data may contain an error due to the offset; detecting an azimuth direction based on the measurement data from the geomagnetic sensor; acquiring a plurality of the measurement data from the geomagnetic sensor, and estimating a value of the offset on the basis of the acquired measurement data for use in correcting the error contained in the measurement data during the detection of the azimuth direction; detecting the opening operation of the foldable body; computing a value of the leakage magnetic field generated from the foldable body when the opening operation of the foldable body is detected; and subtracting the computed value of the leakage magnetic field from the estimated value of the offset, thereby removing an influence of the leakage magnetic field from the estimated value of the offset.

According to the first aspect of the invention, since it is possible to correct an offset of output of a geomagnetic sensor without rotating a portable information terminal by a user, there is an effect that the offset of the output of the geomagnetic sensor can be corrected with a simple operation without referring to an instruction manual of the portable information terminal.

According to the second aspect of the invention, since calibration of azimuth detection means is automatically performed at the time of opening/closing operation of a foldable portable electronic apparatus, a user is not forced to carry out an operation for calibration so that the calibration is facilitated. Conventionally, when the user neglects or forgets the operation for calibration, a geomagnetic sensor cannot be operated in an optimal state. However, in the present invention, since the calibration is automatically implemented at the time of the opening/closing operation when the portable electronic apparatus is normally used, there is no such a problem.

According to the third aspect of the present invention, since calibration of azimuth detection means is automatically performed at the time of opening/closing operation of a foldable portable electronic device, a user is not forced to carry out an operation for calibration so that the calibration is facilitated. Conventionally, when the user neglects or forgets the operation for calibration, a geomagnetic sensor cannot be operated in an optimal state. However, in the present invention, since the calibration is automatically implemented at the time of the opening/closing operation when the portable electronic device is normally used, there is no such a problem.

BRIEF DESCRIPTION OF THE DRAWINGS

FIG. 18 is a block diagram showing a structure of a portable telephone in a fourth embodiment of the present invention.

FIGS. 30(a) and 30(b) are diagrams showing the external appearance of a general folding portable terminal (closed state and opened state).

DETAILED DESCRIPTION OF THE INVENTION

Hereinbelow, embodiments of this invention will be described with reference to the drawings.

Figure 1:
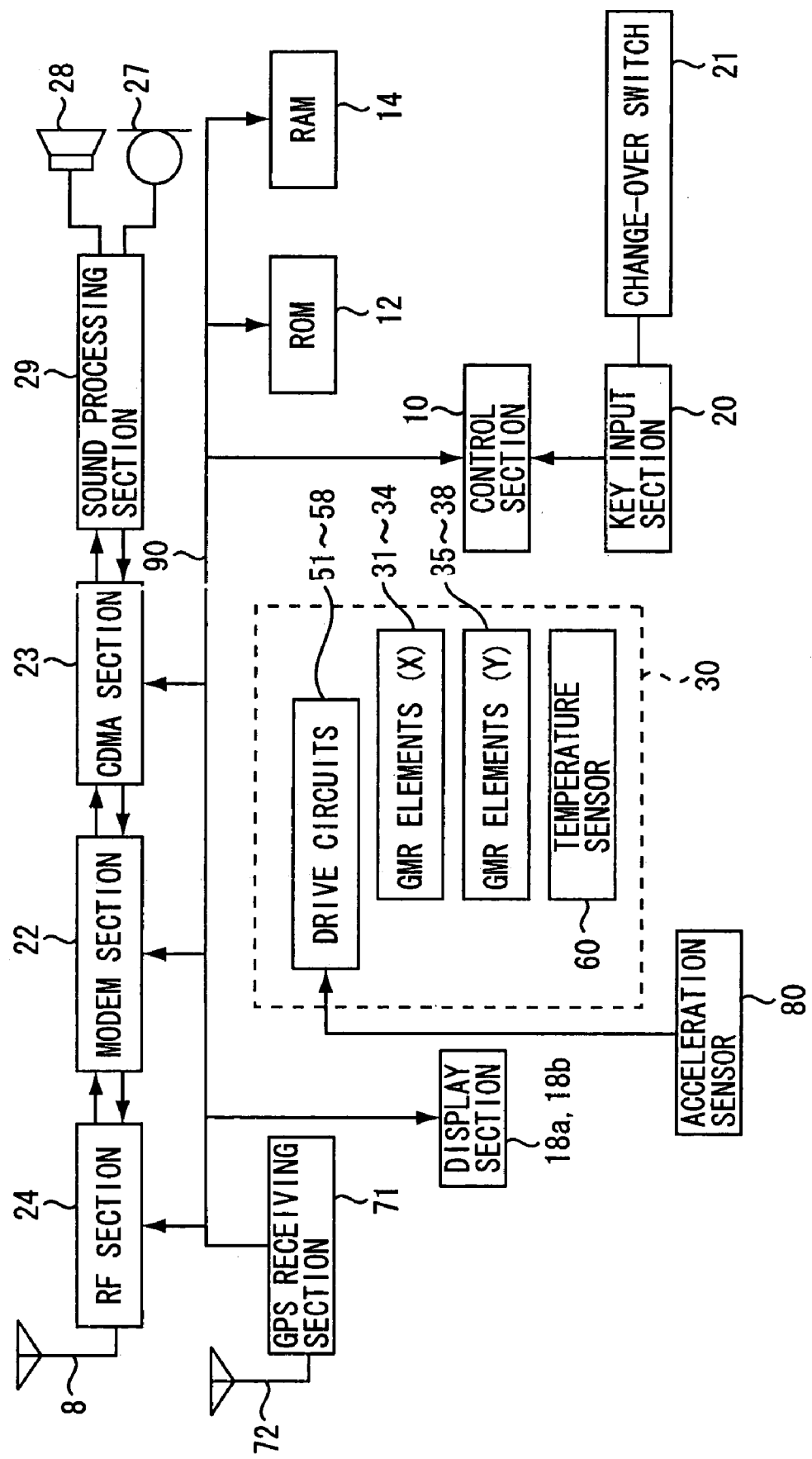
FIG. 1 is a block diagram showing a structure of a portable telephone in a first embodiment of the present invention.

As shown in FIG. 2, a portable telephone having a structure shown in FIG. 1 comprises a case 1 having operation keys and the like, and a case 2 having a liquid crystal display section. FIG. 2(a) is a perspective view showing the state where the case 1 and the case 2 of the portable telephone are opened, FIG. 2(b) is a front view observing the case 2 in the state where the case 1 and the case 2 of the portable telephone are closed, FIG. 2(c) is a side view observing the case 1 and the case 2 in the same state, and FIG. 2(d) is a rear view observing the case 1 in the same state. As shown in FIG. 2(a), it is assumed that there are an X-axis along a shorter side of the case 1 and a Y-axis along a longer side of the case 1. Note that the X-axis and the Y-axis are perpendicular to each other.

Herein, respective surfaces of the cases of the portable telephone are defined as follows. Specifically, the surface of the case 1 having the operation keys and the like is defined as an operation surface and the surface opposite to the operation surface is defined as a back surface. On the other hand, of the surfaces of the case 2, the surface provided with a liquid crystal display section 18a is defined as a main display surface and the surface opposite to the main display surface is defined as a front surface.

As shown in FIG. 1, the portable telephone comprises an RF (Radio Frequency) antenna 8, a control section 10 (control means), a ROM (Read Only Memory) 12, a RAM (Random Access Memory) 14 (data storage, storage means), display sections 18a and 18b, a key input section 20, a change-over switch 21, a modem section 22, a CDMA (Code Division Multiple Access) section 23, an RF section 24, a microphone 27, a reception speaker 28, a sound processing section 29, a geomagnetic sensor 30, a GPS (Global Positioning System) receiving section 71, a GPS antenna 72, an acceleration sensor 80 for detecting an acceleration applied to the portable telephone, and a bus line 90.

The control section 10 controls the respective sections of the portable telephone by executing telephone function programs and other programs. Further, the control section 10 receives measurement data of the geomagnetic sensor 30 and calculates an azimuth (azimuth data processing device). The ROM 12 stores therein various telephone function programs and control programs each executed by the control section 10 at the time of transmission or reception and other various fixed data. In the RAM 14, there is set a work area or the like for temporarily storing data and so on that are used during operation of the control section 10.

The ROM 12 is a machine readable medium for use in a portable information terminal apparatus having a CPU contained in the control section 10 and the geomagnetic sensor 31–38 which has a magnetic sensitivity to a geomagnetic field in a plurality of axes of a coordinate system and which is affected by magnetization to cause an magnetic offset. The medium in the form of the ROM 12 contains program instructions executable by the CPU for causing the portable information terminal apparatus to perform a method of measuring the magnetic offset of the geomagnetic sensor. This method is described in detail hereinafter.

The RF section 24 performs frequency conversion of a signal received by the RF antenna 8, and so on. The modem section 22 demodulates an output signal therefrom and outputs a demodulated signal to the CDMA section 23. The CDMA section 23 performs spread spectrum (Spread Spectrum) or despreading in the following manner. Specifically, the CDMA section 23 despreads the output signal of the modem section 22 to extract a signal before spreading and outputs it to the sound processing section 29. On the other hand, the CDMA section 23 spreads an output signal of the sound processing section 29 and outputs a spread signal to the modem section 22. The modem section 22 receives a signal, to be transmitted to the exterior, from the CDMA section 23 and modulates it, and outputs a signal after modulation to the RF section 24. Then, the RF section 24 performs frequency conversion of the signal and transmits a frequency-converted signal from the RF antenna 8.

Figure 2A:
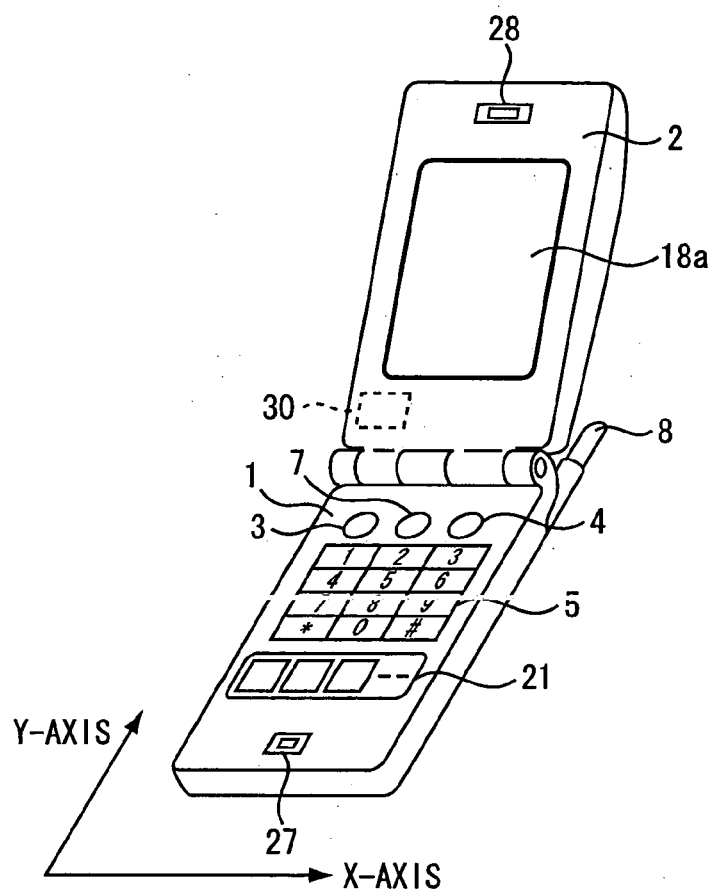
FIGS. 2(a) through 2(d) are diagrams showing the external appearance of a portable telephone in the first to third embodiments of the present invention.
Figure 2B:
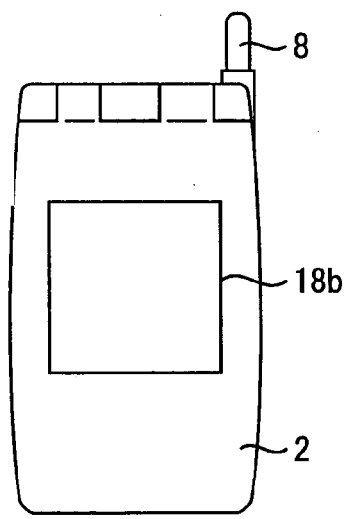
Figure 2C:
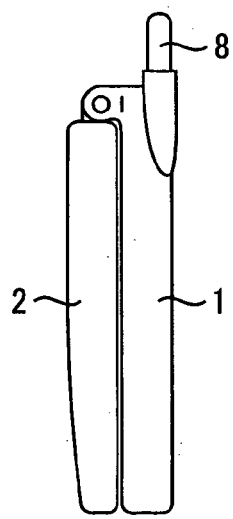
Figure 2D:
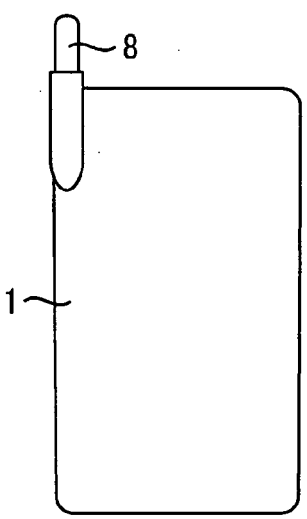

As shown in FIG. 2(a), the key input section 20 has a start key 3 that is used when receiving a call, an end key 4 that is used when ending a call, a ten-key 5 comprising numerical keys and code keys, a redial key 7, and the change-over switch 21.

The display sections 18a and 18b are configured to display character information of a composition that is written when transmitting an electronic mail, various data including the contents of various menus and so on, and further their detailed contents and so on. The display section 18a is provided on the operation surface of the case 1 and the display section 18b is provided on the front surface of the case 2.

The sound processing section 29 is formed by including a coding section (CODER) as coding means and a decoding section (DECODER) as decoding means, decodes a sound signal output from the CDMA section 23, and outputs a decoded signal to the reception speaker. On the other hand, the sound processing section 29 compresses and codes a sound signal for transmission input from the microphone 27 and outputs a compressed and coded signal to the CDMA section 23.

The GPS receiving section 71 receives, at the GPS antenna 72 connected thereto, signals transmitted from a plurality of GPS satellites constituting the GPS, demodulates the signals received from the GPS satellites, calculates a current position of the subject navigation device on the basis of the demodulated signals to derive position information (latitude and longitude) thereof, and outputs it to the control section 10. The processing of calculating such a current position is the same as that performed in the conventional car navigation system or the like.

Figure 3:
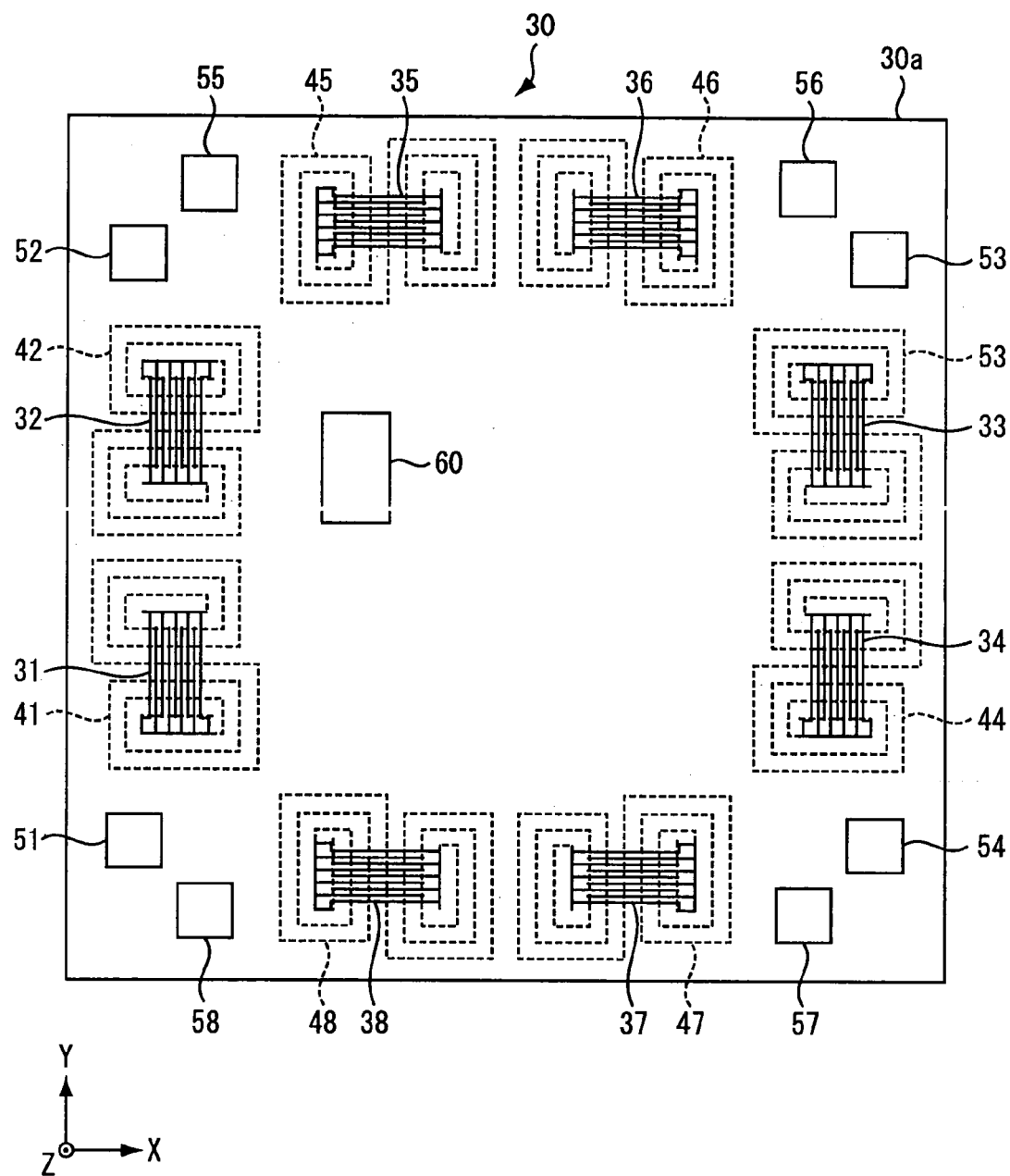
FIG. 3 is a schematic plan view of a geomagnetic sensor 30 in the first to fourth embodiments of the present invention.

As shown in FIG. 3, the geomagnetic sensor 30 comprises a Si (silicon) substrate 30a formed with an LSI (Large Scale Integration), having a square shape with sides along the X-axis and the Y-axis perpendicular to each other, and having a small thickness in a Z-axis direction perpendicular to the X-axis and the Y-axis, a total of eight GMR (Giant Magnetoresistive) elements 31 to 38 formed on the substrate 30a, initialization coils 41 to 48 for applying initialization magnetic fields to the GMR elements 31 to 38, respectively, and drive circuits 51 to 58 connected to the coils 41 to 48, respectively, and each for applying a predetermined voltage to both ends of a corresponding one of the coils 41 to 48. Note that a temperature sensor 60 for monitoring the temperature of the geomagnetic sensor 30 is provided on the substrate 30a.

The first X-axis direction GMR element 31 is formed on a lower side with respect to a center portion in the Y-axis direction of the substrate 30a and near an end portion in a negative direction of the X-axis, and has a fixed layer (pinned layer) in which the direction of magnetization is fixed (pinned) wherein the pinned magnetization direction is the negative direction of the X-axis. The second X-axis direction GMR element 32 is formed on an upper side with respect to the center portion in the Y-axis direction of the substrate 30a and near an end portion in the negative direction of the X-axis, wherein the pinned magnetization direction is the negative direction of the X-axis. The third X-axis direction GMR element 33 is formed on the upper side with respect to the center portion in the Y-axis direction of the substrate 30a and near an end portion in a positive direction of the X-axis, wherein the pinned magnetization direction in a pinned layer is the positive direction of the X-axis. The fourth X-axis direction GMR element 34 is formed on the lower side with respect to the center portion in the Y-axis direction of the substrate 30a and near an end portion in the positive direction of the X-axis, wherein the pinned magnetization direction in a pinned layer is the positive direction of the X-axis.

On the other hand, the first Y-axis direction GMR element 35 is formed on a left side with respect to a center portion in the X-axis direction of the substrate 30a and near an end portion in a positive direction of the Y-axis, wherein the pinned magnetization direction in a pinned layer is the positive direction of the Y-axis. The second Y-axis direction GMR element 36 is formed on a right side with respect to the center portion in the X-axis direction of the substrate 30a and near an end portion in the positive direction of the Y-axis, wherein the pinned magnetization direction in a pinned layer is the positive direction of the Y-axis. The third Y-axis direction GMR element 37 is formed on the right side with respect to the center portion in the X-axis direction of the substrate 30a and near an end portion in a negative direction of the Y-axis, wherein the pinned magnetization direction in a pinned layer is the negative direction of the Y-axis. The fourth Y-axis direction GMR element 38 is formed on the left side with respect to the center portion in the X-axis direction of the substrate 30a and near an end portion in the negative direction of the Y-axis, wherein the pinned magnetization direction in a pinned layer is the negative direction of the Y-axis.

The GMR elements 31 to 38 have the same structure except the positions and directions arranged on the substrate 30a. Therefore, the first X-axis direction GMR element 31 will be described hereinbelow as a representative example.

Figure 4:
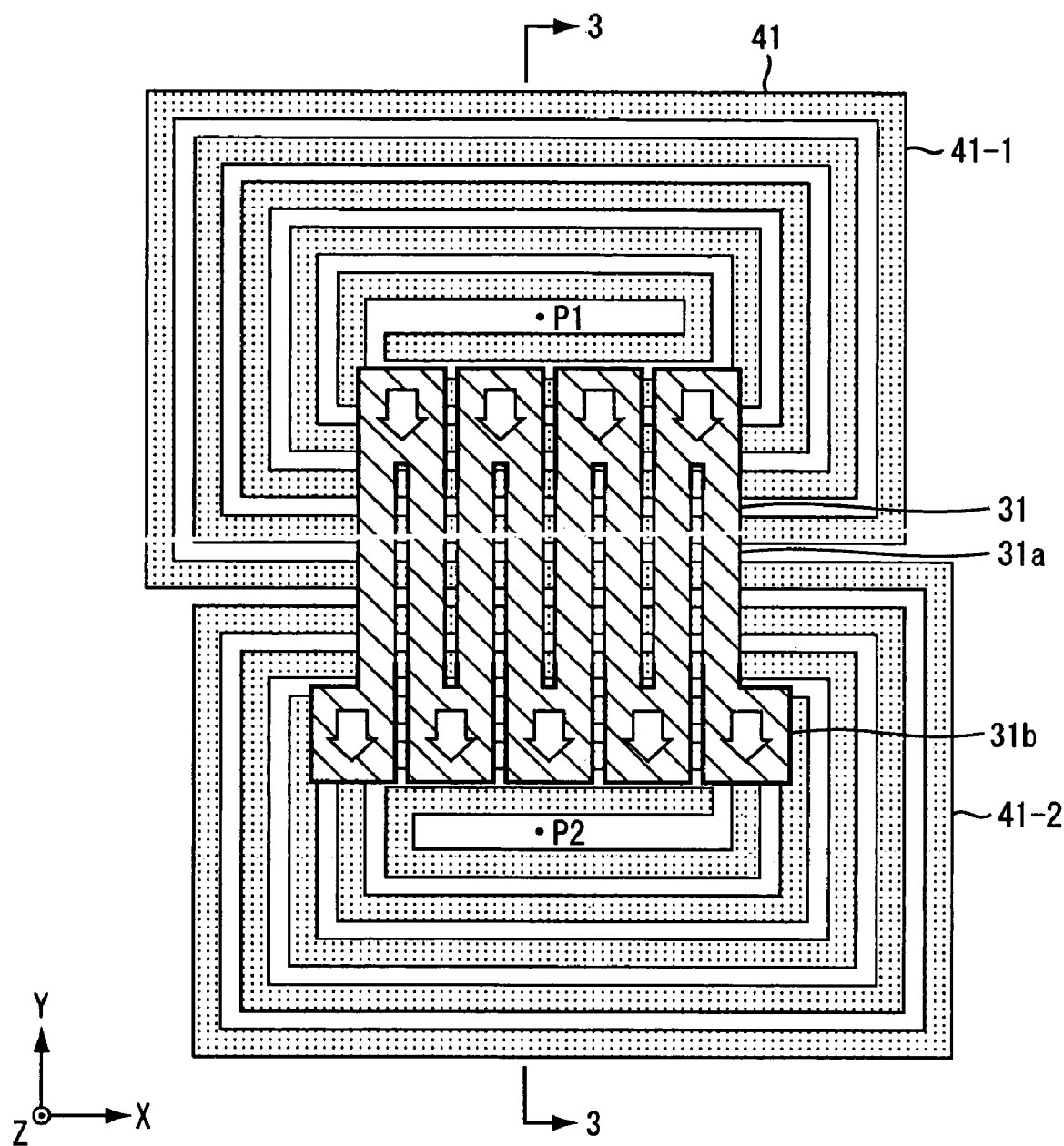
FIG. 4 is a partial enlarged plan view of a GMR element 31 and a coil 41 of the geomagnetic sensor 30 in FIG. 3.
Figure 5:
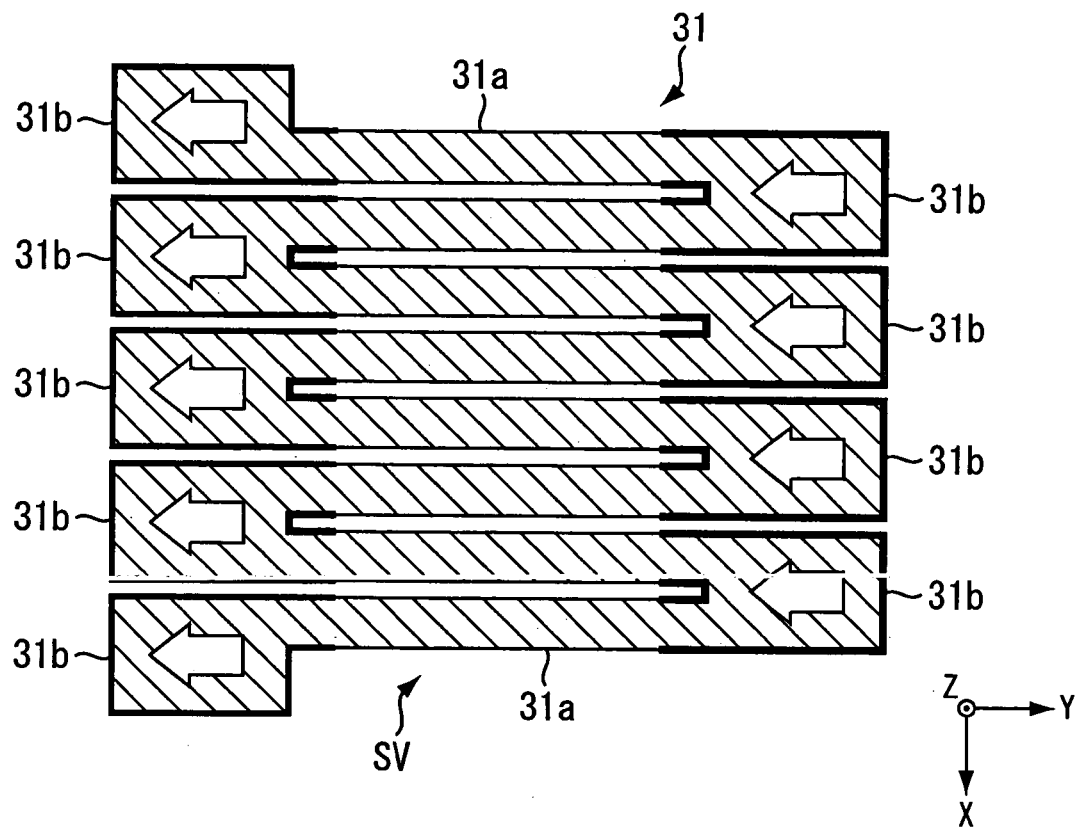
FIG. 5 is a plan view of the GMR element 31 in FIG. 3.
Figure 6:
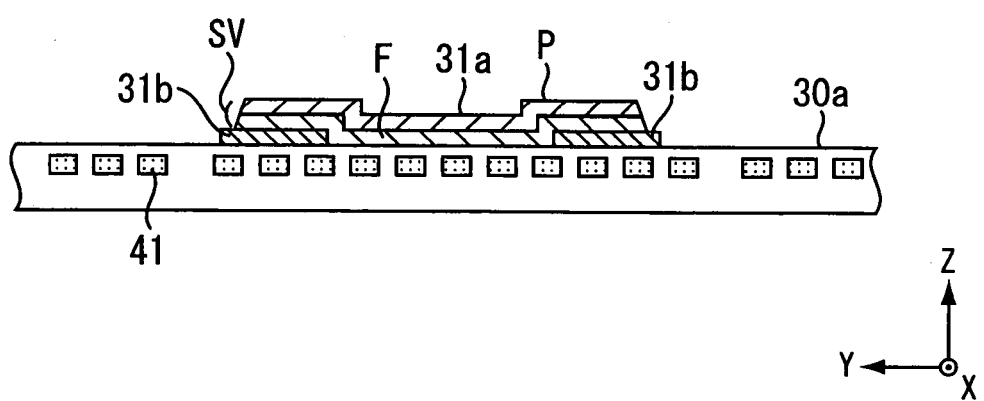
FIG. 6 is a schematic sectional view wherein the GMR element 31 and the coil 41 are sectioned by a plane along line 3—3 in FIG. 4.

As shown in FIGS. 5 and 6, the first X-axis direction GMR element 31 shown in FIG. 4 comprises a plurality of narrow belt-shaped portions 31a . . . 31a each formed by a spin-valve film SV and having a longitudinal direction in the Y-axis direction, and bias magnet films (hard ferromagnetic body thin film layers) 31b . . . 31b formed under both end portions in the Y-axis direction of the respective narrow belt-shaped portions 31a and made of a material such as cobalt (Co) chromium (Cr) platinum (Pt) being a hard ferromagnetic substance and having a high coercive force and a high squareness ratio. Each narrow belt-shaped portion 31a extends in the X-axis direction on an upper surface of the bias magnet film 31b so as to be joined to the adjacent narrow belt-shaped portion 31a.

Figure 7:
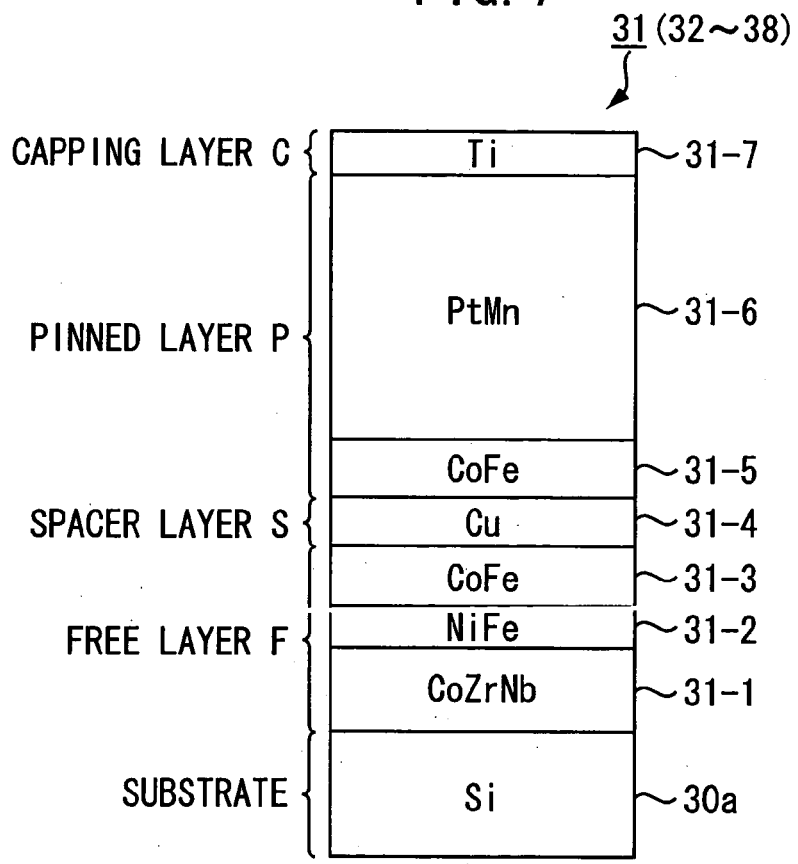
FIG. 7 is a diagram showing a spin-valve film structure of the GMR element 31 in FIG. 4.

The spin-valve film SV of the first X-axis direction GMR element 31 is, as a film structure thereof is shown in FIG. 7, formed by including a free layer (free layer, free magnetization layer) F, a conductive spacer layer S made of copper (Cu) and having a film thickness of 2.4 nm (24 Å), a pinned layer P, and a capping layer C made of titanium (Ti) or tantalum (Ta) and having a film thickness of 2.5 nm (25 Å), which are stacked on the substrate 30a in the order named.

The free layer F is a layer in which the direction of magnetization changes depending on a direction of an external magnetic field and is composed of a cobalt (Co) zirconium (Zr) niobium (Nb) amorphous magnetic layer 31-1 having a film thickness of 8 nm (80 Å) and directly formed on the substrate 30a, a nickel (Ni) iron (Fe) magnetic layer 31-2 having a film thickness of 3.3 nm (33 Å) and formed on the CoZrNb amorphous magnetic layer 31-1, and a CoFe layer 31-3 having a film thickness of about 1 to 3 nm (10 to 30 Å) and formed on the NiFe magnetic layer 31-2. The CoZrNb amorphous magnetic layer 31-1 and the NiFe magnetic layer 31-2 form the foregoing soft ferromagnetic body thin film layer. The CoFe layer 31-3 serves to prevent diffusion of Ni of the NiFe layer 31-2 and Cu 31-4 of the spacer layer S. Note that the bias magnet films 31b . . . 31b apply bias magnetic fields to the free layer F in the Y-axis direction (the Y-axis negative direction indicated by wide arrows in FIGS. 4 and 5) in order to maintain a uniaxial anisotropy of the free layer F.

The pinned layer P is composed of a CoFe magnetic layer 31-5 having a film thickness of 2.2 nm (22 Å) and an antiferromagnetic film 31~36 made of a Pt manganese (Mn) alloy containing 45 to 55 mol % of Pt and having a film thickness of 24 nm (240 Å), which are stacked together. The CoFe magnetic layer 31~35 is backed in an exchange-coupling manner by the magnetized antiferromagnetic film 31~36 so that the direction of magnetization thereof is pinned in the negative direction of the X-axis.

Figure 8:
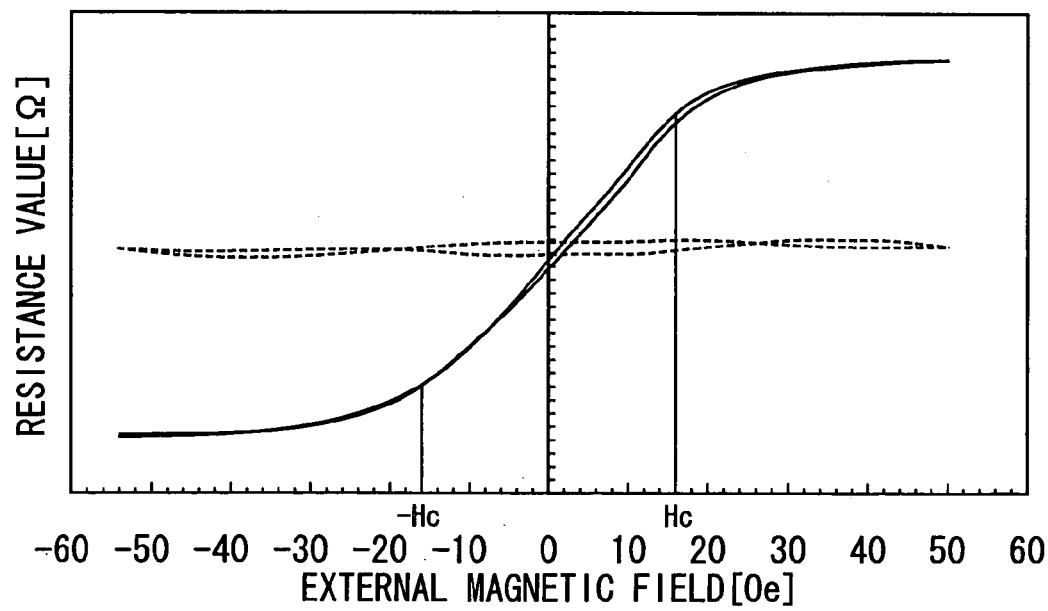
FIG. 8 is a graph showing changes in resistance value of the GMR element 31 in FIG. 4 with respect to external magnetic fields.

The first X-axis direction GMR element 31 thus structured exhibits a resistance value that changes substantially in proportion to an external magnetic field, changing along the X-axis, within the range of –Hc to +Hc as indicated by solid lines in FIG. 8 while exhibits a substantially constant resistance value with respect to an external magnetic field changing along the Y-axis as indicated by broken lines in FIG. 8.

Figure 9:
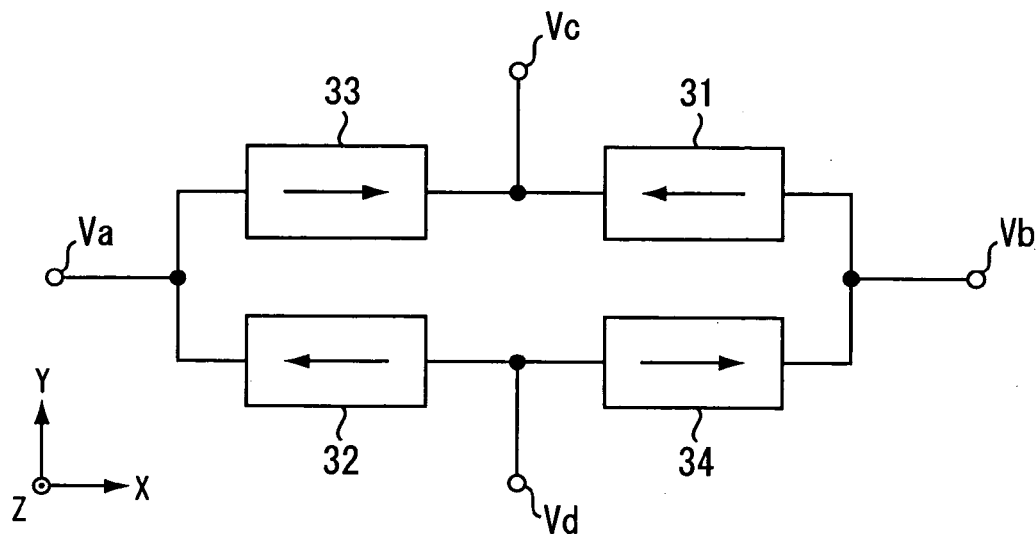
FIG. 9 is an equivalent circuit diagram of an X-axis direction geomagnetic sensor comprising the GMR element 31 in FIG. 4 and GMR elements 32 to 34 having the same structure.

In the geomagnetic sensor 30, as shown in FIG. 9, an X-axis direction geomagnetic sensor for detecting a magnetic field in the X-axis direction is formed by full-bridge connecting the first to fourth X-axis direction GMR elements 31 to 34 together. In FIG. 9, arrows given to the GMR elements 31 to 34 represent pinned directions of magnetization of the pinned layers of the GMR elements 31 to 34, respectively. In this structure, a constant potential difference is applied across a node Va between the second X-axis direction GMR element 32 and the third X-axis direction GMR element 33 and a node Vb between the first X-axis direction GMR element 31 and the fourth X-axis direction GMR element 34 so that a potential difference (Vc-Vd) between a node Vc between the first X-axis direction GMR element 31 and the third X-axis direction GMR element 33 and a node Vd between the second X-axis direction GMR element 32 and the fourth X-axis direction GMR element 34 is taken out as a sensor output Vout.

Figure 10:
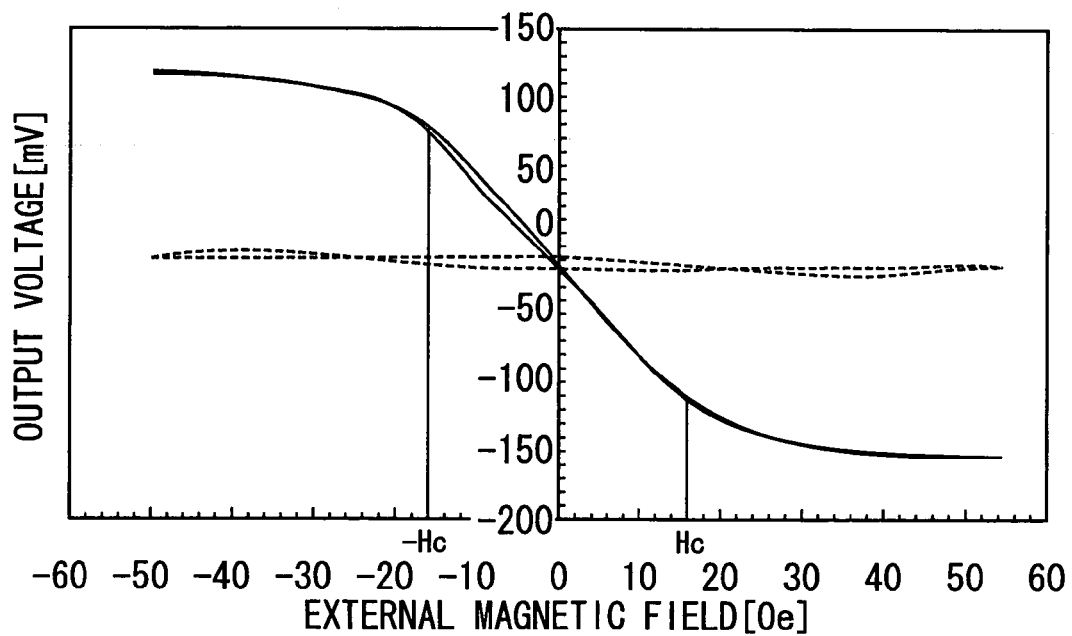
FIG. 10 is a graph showing changes in output voltage of the X-axis direction geomagnetic sensor in FIG. 9 with respect to an external magnetic field changing in an X-axis direction and a magnetic field changing in a Y-axis direction.

As a result, the X-axis direction geomagnetic sensor shows an output voltage Vxout that changes substantially in proportion to an external magnetic field, changing along the X-axis, within the range of –Hc to +Hc as indicated by solid lines in FIG. 10 while shows an output voltage of substantially "0" with respect to an external magnetic field changing along the Y-axis as indicated by broken lines in FIG. 10.

Like the X-axis direction geomagnetic sensor, a Y-axis direction geomagnetic sensor is formed by full-bridge connecting the first to fourth Y-axis direction GMR elements 35 to 39 together and shows an output voltage Vyout that changes substantially in proportion to an external magnetic field, changing along the Y-axis, within the range of –Hc to +Hc while shows an output voltage of substantially "0" with respect to an external magnetic field changing along the X-axis. As described above, the geomagnetic sensor 30 detects the external magnetic fields. Note that the geomagnetic sensor 30 implements temperature compensation of magnetic properties by the use of a non-illustrated temperature compensation circuit on the basis of temperature information obtained by the temperature sensor 60.

Next, description will be given about a principle of an azimuth measuring method by the azimuth data processing device of the portable telephone assuming that the operation surface of the portable telephone is placed in a substantially horizontal state and that an external magnetic field applied to the geomagnetic sensor 30 is only the geomagnetism. Herein, it is assumed that an azimuth ang of the portable telephone represents, in the case where the operation surface of the case 1 of the portable telephone is substantially horizontal, an azimuth of a vector directed from a this-side portion (e.g. the microphone 27) of the operation surface of the portable telephone toward the center of a coupling portion, i.e. a vector directed in the positive direction of the Y-axis.

In this specification, it is defined that a reference (0°) of the azimuth ang is the west and that the azimuth ang becomes 90°, 180°, and 270° as rotating toward the north, the east, and the south in the order named, respectively.

Figure 11:
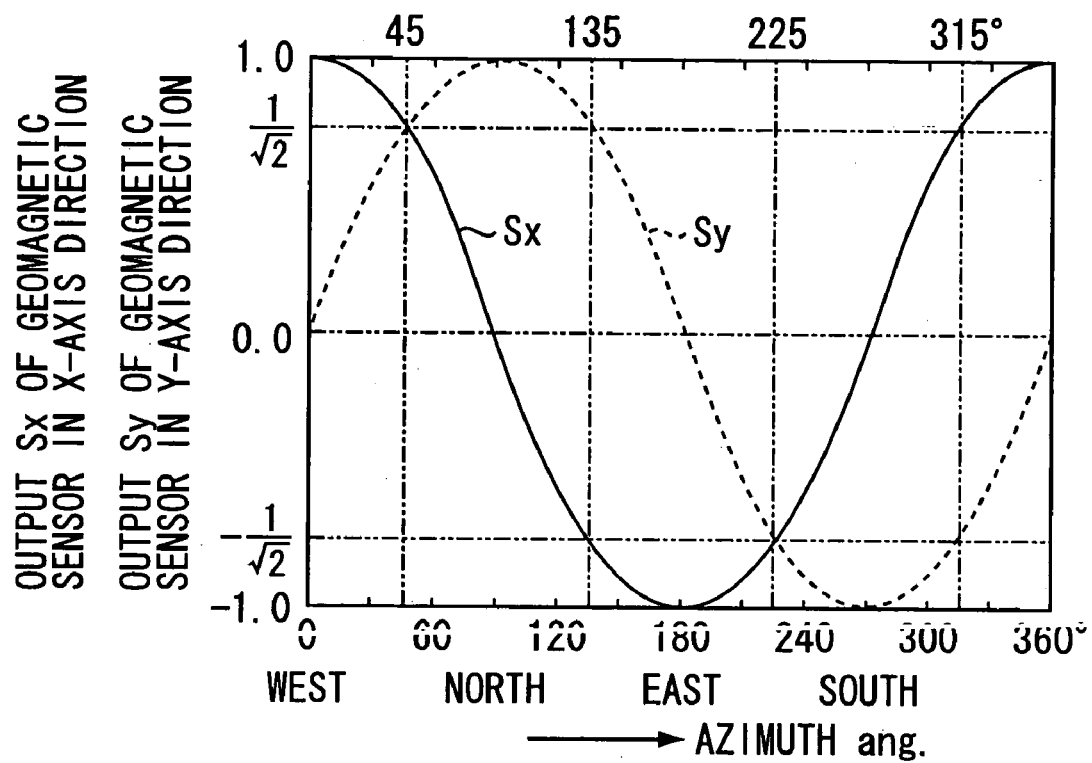
FIG. 11 is a graph showing outputs of an X-axis direction geomagnetic sensor and a Y-axis direction geomagnetic sensor with respect to an azimuth in the same embodiment.

Incidentally, the geomagnetism is a magnetic field directed from the south to the north. Therefore, when the operation surface of the case 1 of the portable telephone is substantially horizontal, the outputs of the X-axis direction geomagnetic sensor and the Y-axis direction geomagnetic sensor of the geomagnetic sensor 30 change in a cosine wave fashion and in a sine wave fashion, respectively, with respect to the azimuth ang of the portable telephone 10 as shown in FIG. 11. It is assumed that sensor outputs Sx and Sy in FIG. 11 are standardized.

The standardization is that a value obtained by dividing an actual output of the X-axis direction geomagnetic sensor by a half of a difference between a maximum value and a minimum value of outputs thereof obtained when the portable telephone is rotated by 360° in the state where the operation surface of the case 1 thereof is substantially horizontal is set as an output Sx after the standardization.

Likewise, the standardization is that a value obtained by dividing an actual output of the Y-axis direction geomagnetic sensor by a half of a difference between a maximum value and a minimum value of outputs thereof obtained when the portable telephone is rotated by 360° in the state where the operation surface of the case 1 thereof is substantially horizontal is set as an output Sy after the standardization.

From the foregoing, the azimuth ang of the portable telephone can be derived based on classification into the following cases (a) to (d).

(a) When Sx>0 and |Sx|>|Sy| are established with respect to Sx and Sy, azimuth ang=$\tan^{-1}$(Sy/Sx).

(b) When Sx<0 and |Sx|>|Sy| are established, ang=180+$\tan^{-1}$(Sy/Sx).

(c) When Sy>0 and |Sx|<|Sy| are established, ang=90°−$\tan^{-1}$(Sx/Sy)

(d) When Sy<0 and |Sx|<|Sy| are established, ang=270−$\tan^{-1}$(Sx/Sy)

Note that when the azimuth ang derived by any of the foregoing (a) to (d) is negative, a value obtained by adding 360° to the derived azimuth ang is set as an azimuth ang. On the other hand, when the derived azimuth ang is 360° or more, a value obtained by subtracting 360° from the derived azimuth ang is set as an azimuth ang.

However, as described before, in the portable telephone, many permanent magnet components are included as represented by the speaker 28 and magnetic fields are leaking from these components. Therefore, the geomagnetic sensor 30 disposed at a predetermined position in the portable telephone is applied with the leakage magnetic fields (external magnetic fields other than the geomagnetism) caused by these permanent magnet components. As a result, the output of the X-axis direction geomagnetic sensor shifts (parallel movement) by an output corresponding to X-axis components of the leakage magnetic fields and likewise the output of the Y-axis direction geomagnetic sensor shifts by an output corresponding to Y-axis components of the leakage magnetic fields. This output shift is called an offset and the respective shift amounts in the X-axis direction and in the Y-axis direction are set as offset values. Therefore, in order to measure a correct azimuth in the portable telephone, it is necessary to perform correction of the outputs, i.e. subtraction of the foregoing offset values from the X- and Y-axis output values, respectively. Herein, since the offset values are, as described before, based on the influence caused by the soft ferromagnetic bodies provided inside the portable telephone, it is necessary to actually carry out measurement at respective points and judge validity thereof.

Next, description will be given about a principle of a method for estimating offset values and judging validity thereof as described above in the azimuth data processing device when the geomagnetism and leakage magnetic fields are applied to the geomagnetic sensor 30 as external magnetic fields.

Figure 12:
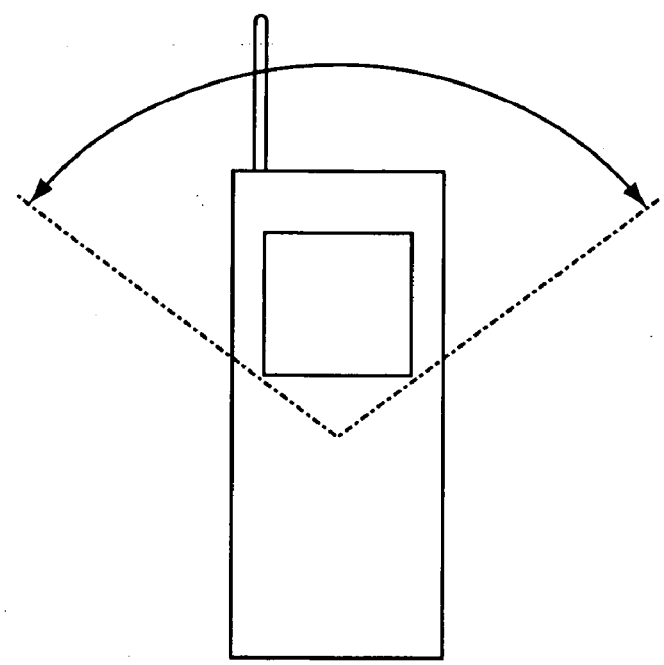
FIG. 12 is a diagram showing the state where the portable telephone in the same embodiment is swung on a single plane, for example, a horizontal plane.

The portable telephone is configured such that the external magnetism is measured at predetermined time intervals. Then, as shown in FIG. 12, the portable telephone is swung on a single plane like a plane including the X- and Y-axis magnetism-sensitive directions, for example, a horizontal plane, and the measurement of the external magnetic field is carried out at a plurality of measurement points during the swinging, thereby judging validity of estimated offset value from the measurement data.

Herein, given that offset value to be derived are $X_0$ and $Y_0$ and that the radius of an compass circle drawn by plotting the values outputted from the geomagnetic sensor 30 is R, the following relationship is established.

$$(X-X_0)^2+(Y-Y_0)^2=R^2 \therefore R^2-X-Y_0^2+2XX_0+2YY_0=X^2+Y^2 \quad \text{(formula 11)}$$

Further, the external magnetism measured at the measurement points are given as coordinate values of (Xi, Yi) (i=1, 2, 3, ..., N) and a least square error $\epsilon$ is defined as follows. Then, by the use of the method of least squares for calculating coordinate values that make minimum the least square error $\epsilon$, the origin of the compass circle of the geomagnetic sensor 30 is derived to thereby estimate the offset values (offset estimation step) (offset estimation means).

[Expression 1] (formula 12)

$$\varepsilon = \sum \{(X_i - X_o)^2 + (Y_i - Y_o)^2 - R^2\}^2$$
$$= \sum \{(X_i^2 + Y_i^2) - 2X_iX_o - 2Y_iY_o + (X_o^2 + Y_o^2) - R^2\}^2$$

Herein, giving $a_i=(X_i^2+Y_i^2)$, $b_i=-2X_i$, $c_i=-2Y_i$, and $D=(X_0^2+Y_0^2)-R^2$, [Expression 2] is obtained

[Expression 2]

$$\epsilon = \Sigma(a_i + b_i X_o + c_i Y_o + D)^2 \quad \text{(formula 13)}$$

The condition that makes minimum the least square error $\epsilon$ is obtained by differentiating $\epsilon$ with variables $X_0$, $Y_0$ and D, and expressed by [Expression 3]. Here, the variables X0, Y0 and D are treated as an independent variable of $\epsilon$ for simplifying the computation.

[Expression 3]

$$\begin{cases} \frac{\partial \varepsilon}{\partial X_o} = 2\sum (a_i + b_i X_o + c_i Y_o + D)b_i = 0 & \text{(formula 14)} \\ \frac{\partial \varepsilon}{\partial Y_o} = 2\sum (a_i + b_i X_o + c_i Y_o + D)c_i = 0 & \text{(formula 15)} \\ \frac{\partial \varepsilon}{\partial D} = 2\sum (a_i + b_i X_o + c_i Y_o + D) = 0 & \text{(formula 16)} \end{cases}$$

By solving the following equation on the basis of (formula 14) to (formula 16), the offset values $X_0$ and $Y_0$ are derived. Coordinates $(X_0, Y_0)$ obtained from the values $X_0$ and $Y_0$ become the origin (center) of the compass circle.

[Expression 4]

$$\begin{bmatrix} [bb] & [bc] & [b] \\ [bc] & [cc] & [c] \\ [b] & [c] & N \end{bmatrix} \begin{bmatrix} XO \\ YO \\ D \end{bmatrix} = \begin{bmatrix} -[ab] \\ -[ac] \\ -[a] \end{bmatrix} \quad \text{(formula 17)}$$

where

[Expression 5]

$$[k] = \sum_{i=1}^{N} k_1, \quad [k1] = \sum_{i=1}^{N} k_i 1_i \quad \text{(formula 18)}$$

is given.

Next, description will be given about a method of deriving a standard deviation $\sigma$ from respective measured values mi and a mean value A of the respective measured values mi. The value mi denotes a distance on the coordinate system between each coordinate value (Xi, Yi) (i=1, 2, 3, ..., N) representing the external magnetic field data measured at the respective measurement points and the origin $(X_0, Y_0)$ of the compass circle. This method includes the steps of mean value calculation step and standard deviation calculation step. The standard deviation $\sigma$ is expressed by the following formula.

[Expression 6]

$$\sigma = \sqrt{\frac{1}{N}\sum_{i=1}^{N}(m_i - A)^2}$$
$$= \sqrt{\frac{1}{N}\sum_{i=1}^{N}(m_i^2 - 2Am_i + A^2)}$$
$$= \sqrt{\frac{1}{N}\sum_{i=1}^{N}m_i^2 - \frac{2A}{N}\sum_{i=1}^{N}m_i + A^2}$$

[Expression 7]

$$A = \frac{1}{N}\sum_{i=1}^{N} m_i$$

Herein, because of [Expression 7], after all,

[Expression 8]

$$\sigma = \sqrt{\frac{1}{N}\sum_{i=1}^{N} m_i^2 - A^2} \quad \text{(formula 19)}$$
$$= \sqrt{\frac{1}{N}\sum_{i=1}^{N} m_i^2 - \left(\frac{1}{N}\sum_{i=1}^{N} m_i\right)^2}$$
$$= \sqrt{\frac{N\sum_{i=1}^{N} m_i^2 - \left(\sum_{i=1}^{N} m_i\right)^2}{N^2}}$$

[Expression 8] is obtained.

In the method of judging the validity of the estimated offset values in this embodiment, since the respective measured values mi are given by [Expression 9], the validity of the estimated offset values is judged by the use of the radius of the compass circle derived by using the estimated offset values and the measurement data, as shown by (formula 21) noted below (judgment means).

[Expression 9]

$$m_i = \sqrt{(X_i - X_o)^2 + (Y_i + Y_o)^2} \qquad \text{(formula 20)}$$

[Expression 10]

$$\sigma = \sqrt{\frac{N \sum_{i=1}^{N}[(X_i - X_o)^2 + (Y_i - Y_o)^2] - \left(\sum_{i=1}^{N}\sqrt{(X_i - X_o)^2 + (Y_i + Y_o)^2}\right)^2}{N^2}} \qquad \text{(formula 21)}$$

Next, description will be given about the method of judging the validity of the offset values estimated by the foregoing method (validity judgment step) (validity judgment means).

As described above, if there are many measurement data that largely differ with respect to the mean radius on the basis of distribution of the respective measurement data forming the compass circle output by the geomagnetic sensor 30, the measurement data is judged to be invalid. Accordingly, the validity of the measurement data is judged based on the following formula.

$$\sigma < F \qquad \text{(formula 22)}$$

In this case, since a normally required specification of a geomagnetic sensor is that 16 azimuths can be distinguished, it is necessary that the error of the offset values be no greater than an amount corresponding to ⅕ of the geomagnetism. Therefore, since the error is judged acceptable if it is within ⅕ of the geomagnetism in the case where the radius of the compass circle is 2σ, F as noted above is preferably an amount corresponding to 0.03 Oe (oersted) being a quantity of magnetism that is ⅒ of the geomagnetism.

Next, description will be given about operation of calibration of an offset of the geomagnetic sensor 30, implemented by the azimuth data processing device of the portable telephone according to this embodiment. The calibration means the steps of measuring a magnetic field which may be mixture of a net geomagnetic field and other extraneous magnetic field causing a varying offset, computing an offset value of the varying offset based on the measurement data of the magnetic field, and updating previous offset value based on new offset value by recurrently sampling the measurement data and computing the offset value.

First, the power of the portable telephone is turned on so that the operation of the portable telephone is started. Hereinbelow, the operation of the calibration of the offset of the geomagnetic sensor 30 of the portable telephone will be described with reference to a flowchart shown in FIG. 13. It is assumed that offset values obtained in the previous operation are stored in the RAM 14.

First, a calibration start button (trigger key) for designating calibration of an offset in the portable telephone is turned on (step Sa1) so that the control section 10 commands the geomagnetic sensor 30 to measure the external magnetism (step Sa2). Then, the control section 10 reads measurement data from the geomagnetic sensor 30 (step Sa3) and stores the data into the RAM 14 (step Sa4). Then, it is judged by the control section 10 whether or not the number of the data stored in the RAM 14 has reached a predetermined number. If the judgment is "NO", since the number of the data stored in the RAM 14 has not yet reached the predetermined number, the control section 10 returns the flow to step Sa2 after waiting for 0.1 sec (step Sa6), to repeat the operation of subsequent steps Sa2 to Sa5 (data storing means).

On the other hand, when the judgment in step Sa5 is "YES", the flow proceeds to step Sa7 where the control section 10 estimates an offset value. Then, the control section 10 calculates the above mentioned standard deviation σ, and it is judged whether or not the estimated offset values are valid (step Sa8) (validity judgment step) (validity judgment means). If the judgment is "YES", the offset values are stored in the RAM 14 under control of the control section 10 (step Sa9) (offset storing means). Note that the offset values previously stored in the RAM 14 are updated to the offset values calculated in step Sa9 under control of the control section 10. Then, the operation of the calibration of the offset of the geomagnetic sensor 30 of the portable telephone is finished. On the other hand, when the judgment in step Sa8 is "NO", the operation of the calibration of the offset of the geomagnetic sensor 30 of the portable telephone is finished without updating the offset values stored in the RAM 14. In this case, the offset values updated in the previous calibration operation and kept in the RAM 14 are used, as they are, as the offset values.

As described above, according to this embodiment, the calibration of the offset of the geomagnetic sensor can be implemented by the simple operation without referring to a detailed instruction manual, wherein the portable telephone judges whether or not the calibration of the offset has been successful, so that the offset values can be updated only when the proper calibration has been performed. Therefore, the correction of the measurement data can be carried out with the simple operation and yet reliably.

Figure 14:
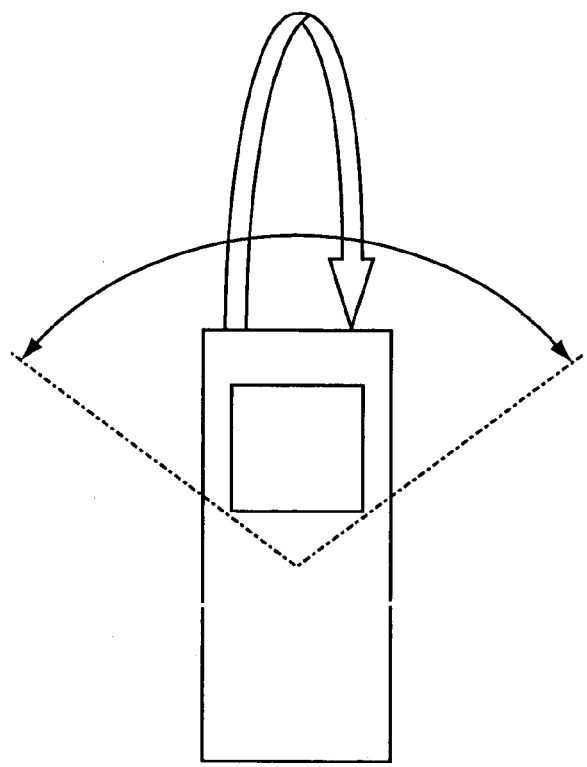
FIG. 14 is a diagram showing the state where a portable telephone having a three-axis geomagnetic sensor in the same embodiment is swung forward and backward.

In this embodiment, the two-axis geomagnetic sensor is assumed as the geomagnetic sensor, but it is possible to realize similar operation even by using a three-axis geomagnetic sensor. In this case, in the case of the two axes, the calibration can be achieved by swinging the portable telephone leftward and rightward in the plane including the two sensitive directions, while, in the case of the three axes, the calibration can be achieved by, as shown in FIG. 14, swinging a portable telephone leftward and rightward in a plane including two of three sensitive directions and further upward and downward (forward and backward).

Figure 15:
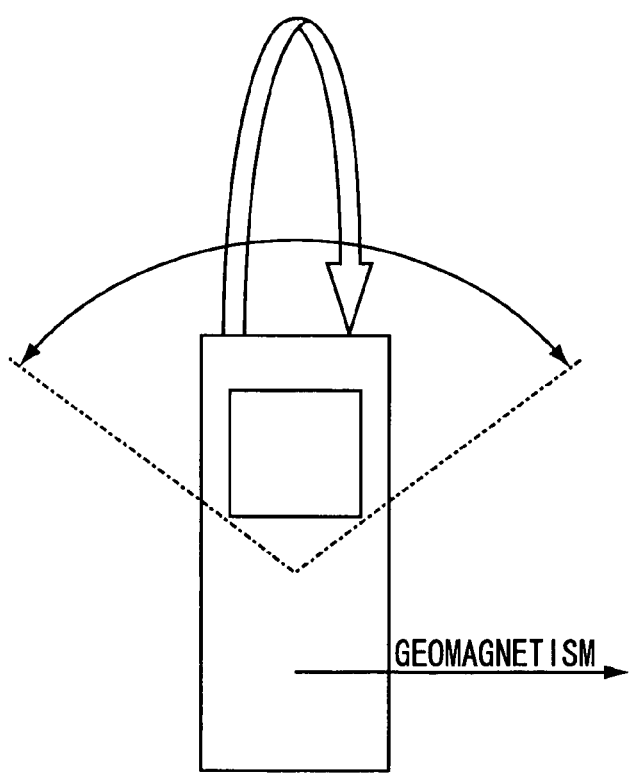
FIG. 15 is a diagram showing the state where the portable telephone having the three-axis geomagnetic sensor in the same embodiment is swung perpendicularly to the geomagnetism.

As shown in FIG. 15, in the case of a particular positional relationship where when the portable telephone is placed on the sheet surface, the geomagnetism is directed in a lateral direction of the sheet surface, the relative relationship between the geomagnetic sensor and the geomagnetism does not change even by swinging the portable telephone upward and downward (forward and backward), i.e. in a direction perpendicular to the sheet surface. In such a case, it is possible to perform a calibration by swinging the portable telephone in another direction.

Figure 16:
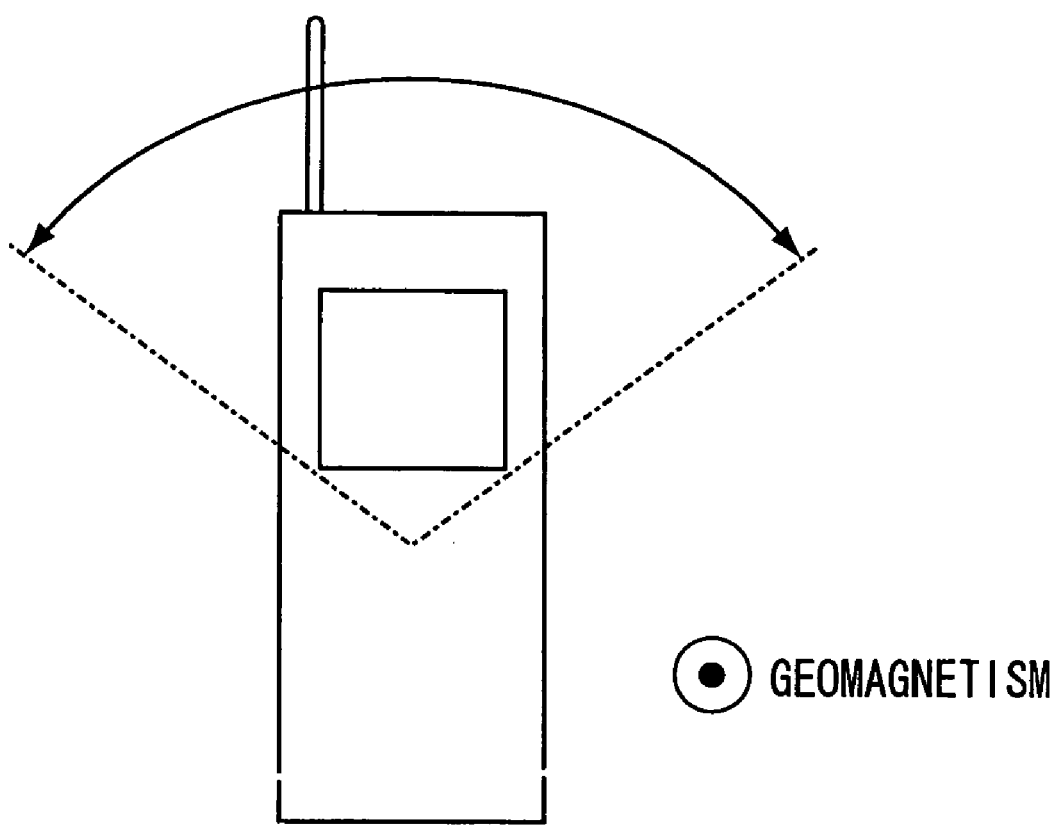
FIG. 16 is a diagram showing the state where the portable telephone having a two-axis geomagnetic sensor in the same embodiment is swung perpendicularly to the geomagnetism.

On the other hand, in the case of the two-axis geomagnetic sensor, even when implementing the foregoing calibration, if the geomagnetism is directed perpendicularly to the sheet surface as shown in FIG. 16, the relative relationship between the geomagnetic sensor and the geomagnetism does not change even by swinging the sensor as illustrated. However, also in this case, as assuming that the geomagnetic sensor is outputting a compass circle having a radius of zero, the offset is arithmetically processed and derived correctly.

Further, in this embodiment, the GMR elements are assumed as the geomagnetic sensor. However, the type of geomagnetic sensor is not limited thereto and may be any type such as magnetoresistive effect elements such as TMR (Tunneling Magnetoresistive) elements or MR (Magnetoresistive) elements, Hall elements, MI (Magneto Impedance) elements, or a fluxgate sensor.

Particularly, in the case of the element like the Hall element that exhibits a remarkable change in property due to temperature, it can be used for correcting an offset change caused by the temperature. On the other hand, in the case of the element like the MI element that is easily magnetized, it is effective as means for removing the influence caused by magnetization of the element itself.

Next, the second embodiment of the present invention will be described.

The block structure of a portable telephone in this second embodiment is the same as that in the first embodiment, but the offset calibration processing of a control section 10 differs from that in the first embodiment. Hereinbelow, this embodiment will be described with reference to the drawing.

Figure 17:
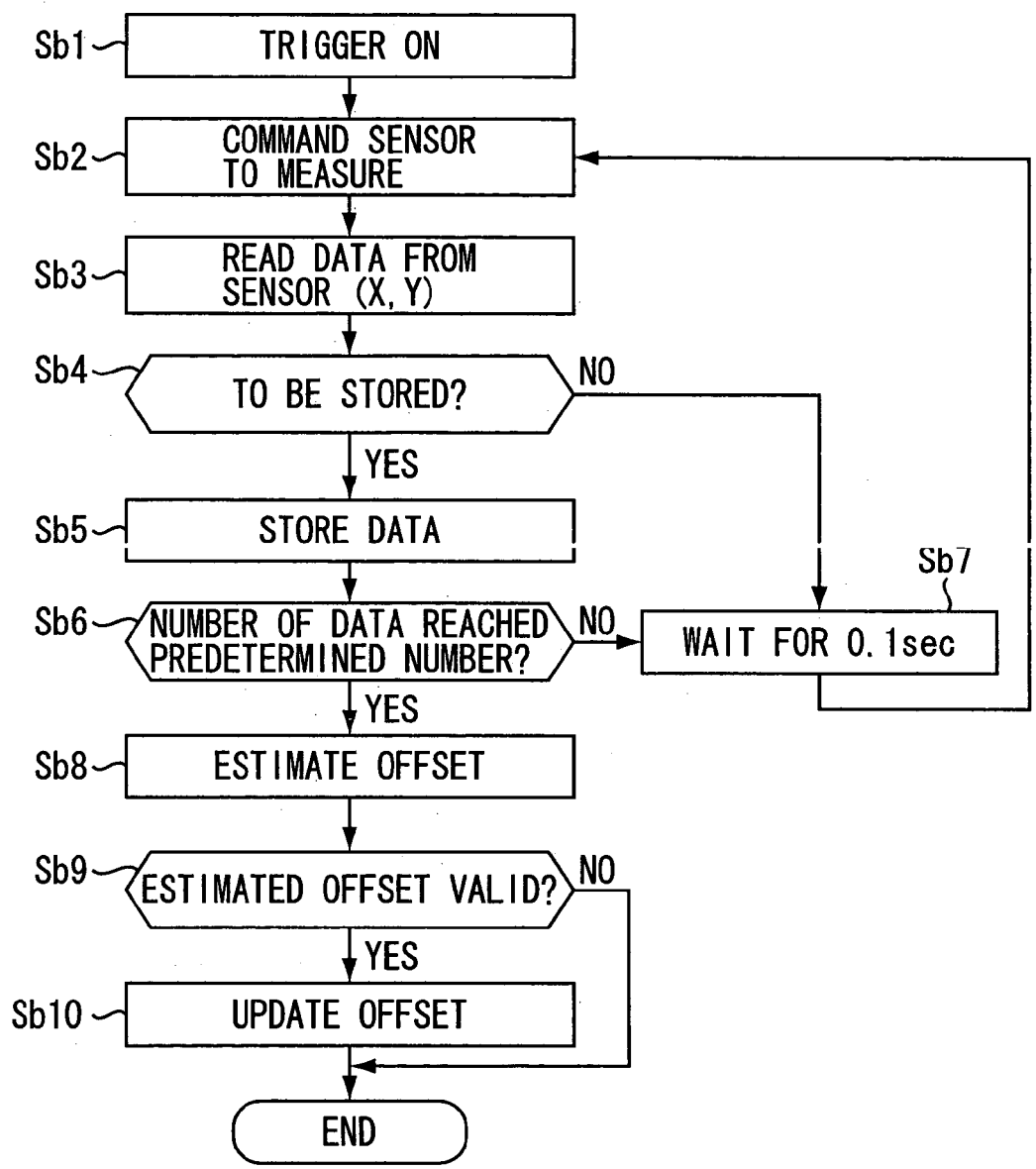
FIG. 17 is a flowchart showing operation of calibration of an offset of the geomagnetic sensor 30 in the portable telephone in a second embodiment of the present invention.
Figure 19A:
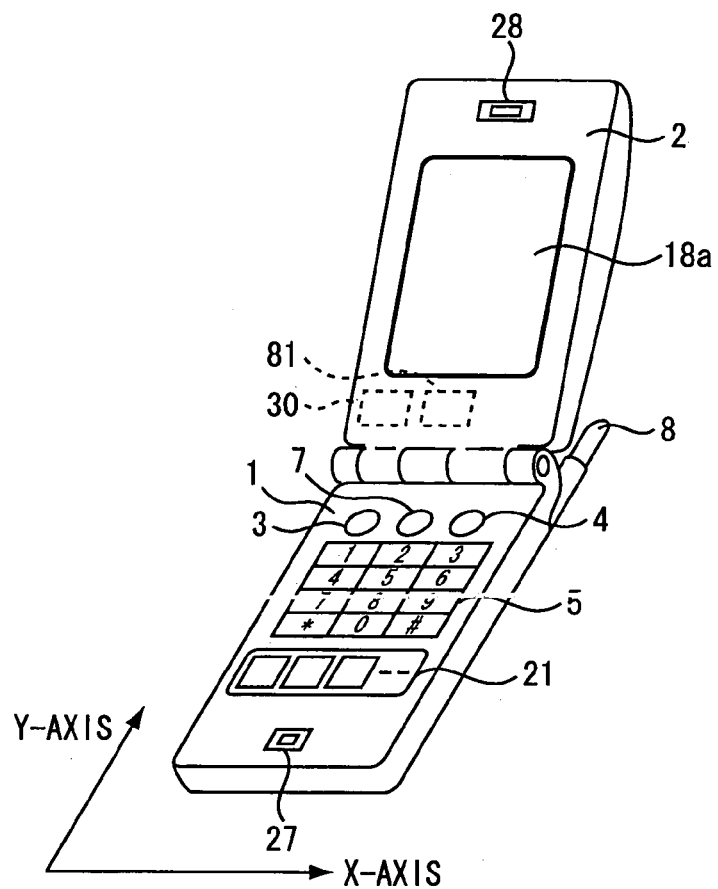
FIGS. 19(a) through 19(d) are diagrams showing the external appearance of a portable telephone in the same embodiment.
Figure 19B:
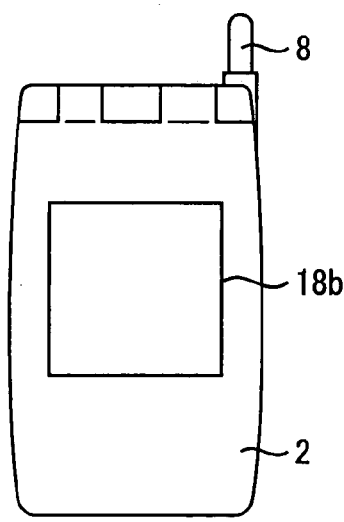
Figure 19C:
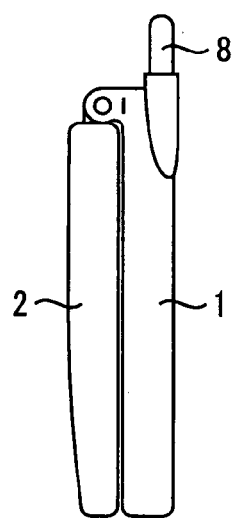
Figure 19D:
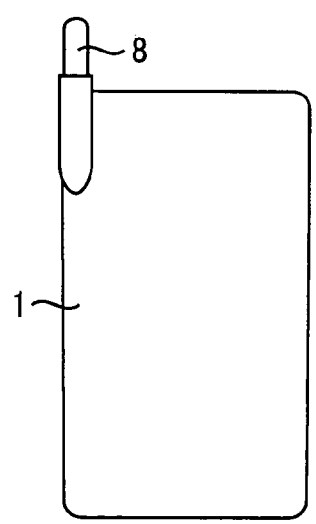

As shown in FIG. 17, the processing of steps Sb1 and Sb2 is carried out. This processing is the same as that of steps Sa1 and Sa2 shown in FIG. 13. Then, the control section 10 reads out the measurement data from a geomagnetic sensor 30 (step Sb3) (data reading means). Then, by judging in step Sb3 whether or not the distance in the coordinate system between the current data and the previous data that has been stored one sample before in the RAM 14 from the geomagnetic sensor 30 exceeds a predetermined distance, it is judged whether or not the current data should be stored into the RAM 14 (step Sb4) (data storage judging means). A method for the judgment will be described later. When the judgment is "YES", the flow proceeds to step Sb5 where the current data is stored into the RAM 14 (step Sb6) (data storing means). Then, it is judged whether or not the number of the data stored in the RAM 14 has reached a predetermined number. If the judgment is "NO", since the number of the data stored in the RAM 14 has not yet reached the predetermined number, the flow returns to step Sb2 after waiting for 0.1 sec (step Sb7), to repeat the operation of subsequent steps Sb2 to Sb6.

On the other hand, when the judgment in step Sb4 is "NO", the flow proceeds to step Sb7 and, after waiting for 0.1 sec, returns to step Sb2 to repeat the operation of subsequent steps Sb2 to Sb6.

On the other hand, when the judgment in step Sb6 is "YES", the flow proceeds to step Sb8 and implements the processing of steps Sb8 to Sb10. This processing is the same as that of steps Sa7 to Sa9 shown in FIG. 13. Through the foregoing processing, the operation of the calibration of the offset of the geomagnetic sensor 30 of the portable telephone is finished.

Next, description will be given about the method of judging in step Sb4 whether or not the data read from the geomagnetic sensor 30 in step Sb3 is data that should be stored into the RAM 14. Herein, given that data subjected to judgment for storage is X, Y and that data stored into the RAM 14 immediately before obtaining the data X, Y is Xp, Yp, the data X, Y is stored into the RAM 14 only when the following condition is satisfied.

[Expression 11]

$$d < \sqrt{(X_o - X)^2 + (Y_p - Y)^2}$$ (formula 23)

As described above, according to this embodiment, the following problem can be avoided. Specifically, it is possible to avoid a problem that, in the first embodiment, data is concentrated to the vicinity of a certain point when the data is captured while a user hardly moves the portable telephone, or the speed of moving the portable telephone by a user is not uniform so that the density of data becomes uneven.

Herein, the number of measurement points is preferably 20 or more when the measurement range is 90° (rotation angle of the geomagnetic sensor) and, therefore, a distance between the measurement points on the coordinate system is required to be smaller than 1/10 of the radius of an compass circle. In view of the foregoing, it may be arranged that the processing of reading data from the geomagnetic sensor 30 is not performed per certain time interval, but is performed by rotating the geomagnetic sensor 30 at a rotation angle that makes the distance between the measurement points smaller than 1/10 of the radius of the compass circle.

Next, the third embodiment of the present invention will be described.

The block structure of a portable telephone in this second embodiment is the same as that in the first or second embodiment, but the offset calibration processing of a control section 10 is a combination of the first and second embodiments. Hereinbelow, this embodiment will be described. Note that a flowchart is a combination of FIGS. 13 and 17 and illustration thereof is omitted.

Figure 13:
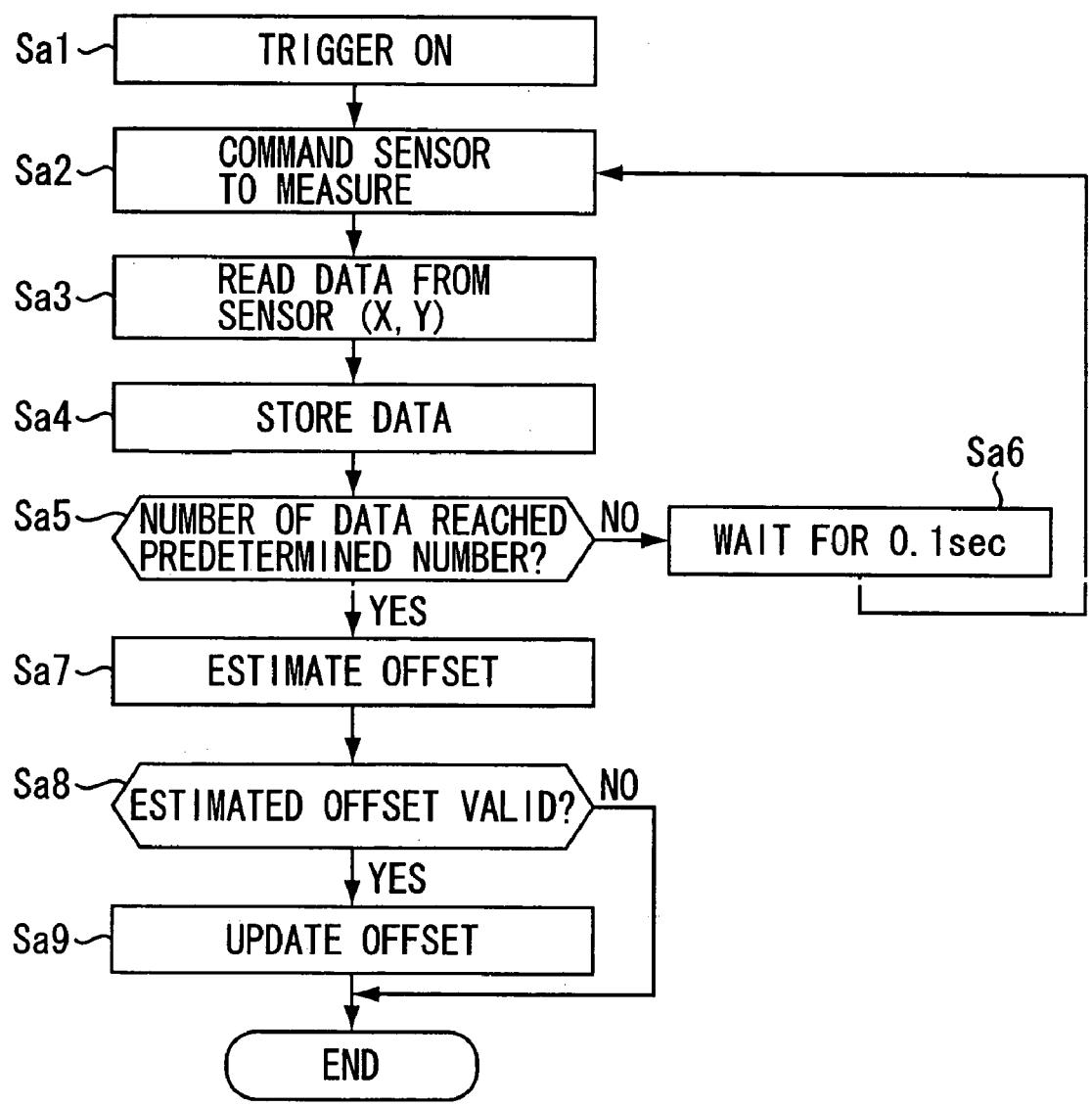
FIG. 13 is a flowchart showing operation of calibration of an offset of the geomagnetic sensor 30 in the portable telephone in the same embodiment.

In this case, the processing of steps Sa2 to Sa6 in FIG. 13 and the processing of steps Sb2 to Sb7 in FIG. 17 are processed parallelly and, when the number of data stored in the RAM 14 by either one of the processings exceeds a predetermined number, the offset estimation in step Sa7 or Sb8 is carried out. With respect to the predetermined numbers, it is necessary that the number of data by the processing of FIG. 13 be set greater than the number of data by the processing of FIG. 17. For example, it is desirable that the former be set 10 times the latter.

As described above, according to this embodiment, the following problem can be avoided. Specifically, it is possible to avoid a problem that, in the second embodiment, when, as shown in FIG. 16, the portable telephone having the two-axis geomagnetic sensor is swung perpendicularly to the geomagnetism, since the measured values of the geomagnetic sensor do not change over a certain value, the swinging of the portable telephone cannot be detected so that data is not stored into the RAM 14 however long the time passes.

Next, the fourth embodiment of the present invention will be described.

The block structure (FIG. 18) and operation of a portable telephone in this fourth embodiment are similar to those in the first to third embodiments, but an inclination sensor 81 is added as a component. Further, the offset calibration processing of a control section 10 partly differs from that of the second embodiment. Hereinbelow, this embodiment will be described with reference to the drawings.

As shown in FIG. 19, the portable telephone according to this embodiment is mounted with the inclination sensor 81. As an example of the inclination sensor 81, there is, for example, a capacitance variable type sensor that is attached adjacent to a geomagnetic sensor 30 and has a fixed electrode and a movable electrode confronting each other at a certain interval therebetween, wherein the interval between the movable electrode and the fixed electrode changes when the inclination sensor 81 is inclined so that the capacitance value formed thereby changes.

Figure 20:
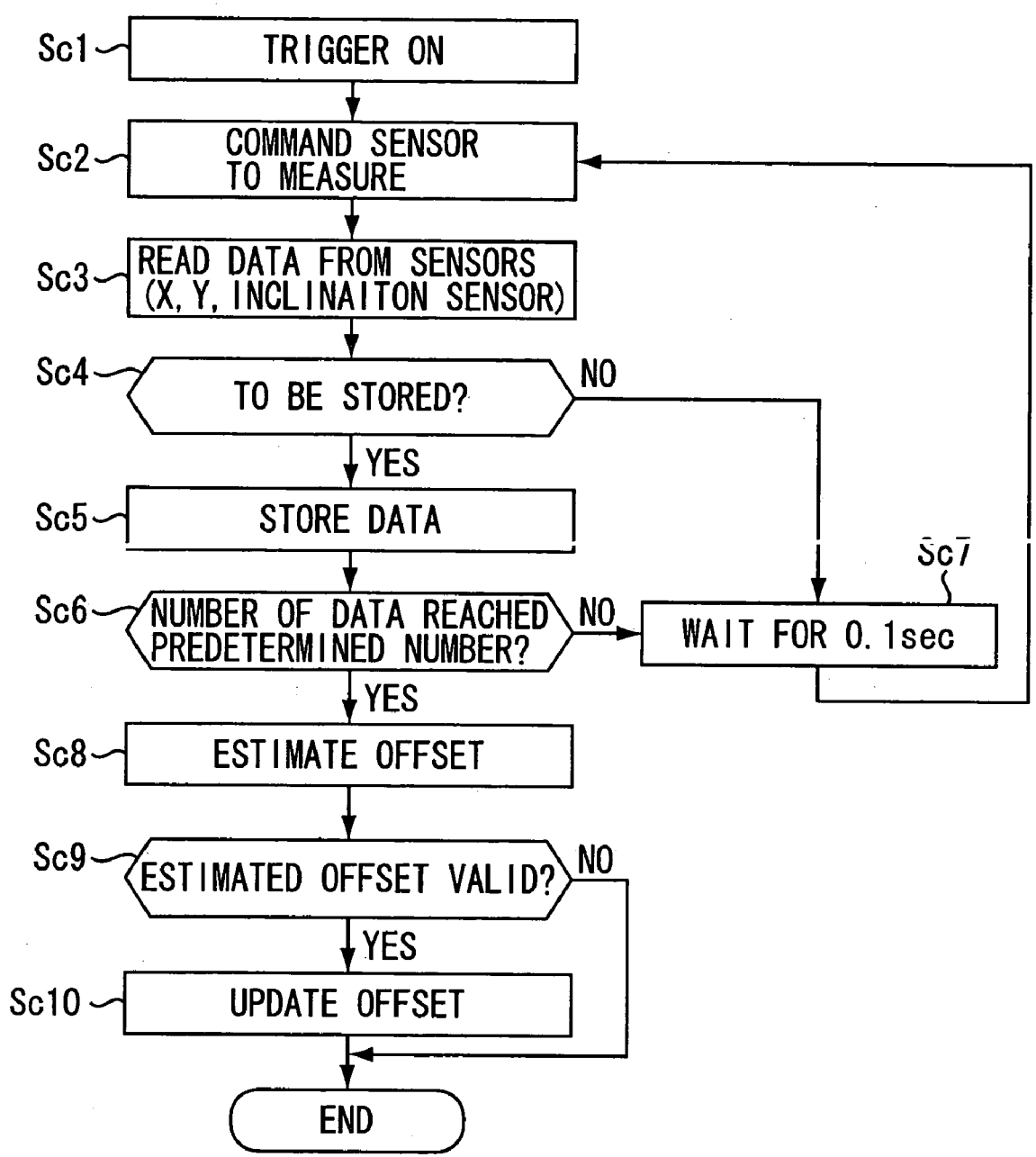
FIG. 20 is a flowchart showing operation of calibration of an offset of the geomagnetic sensor 30 in the portable telephone in the same embodiment.
Figure 21:
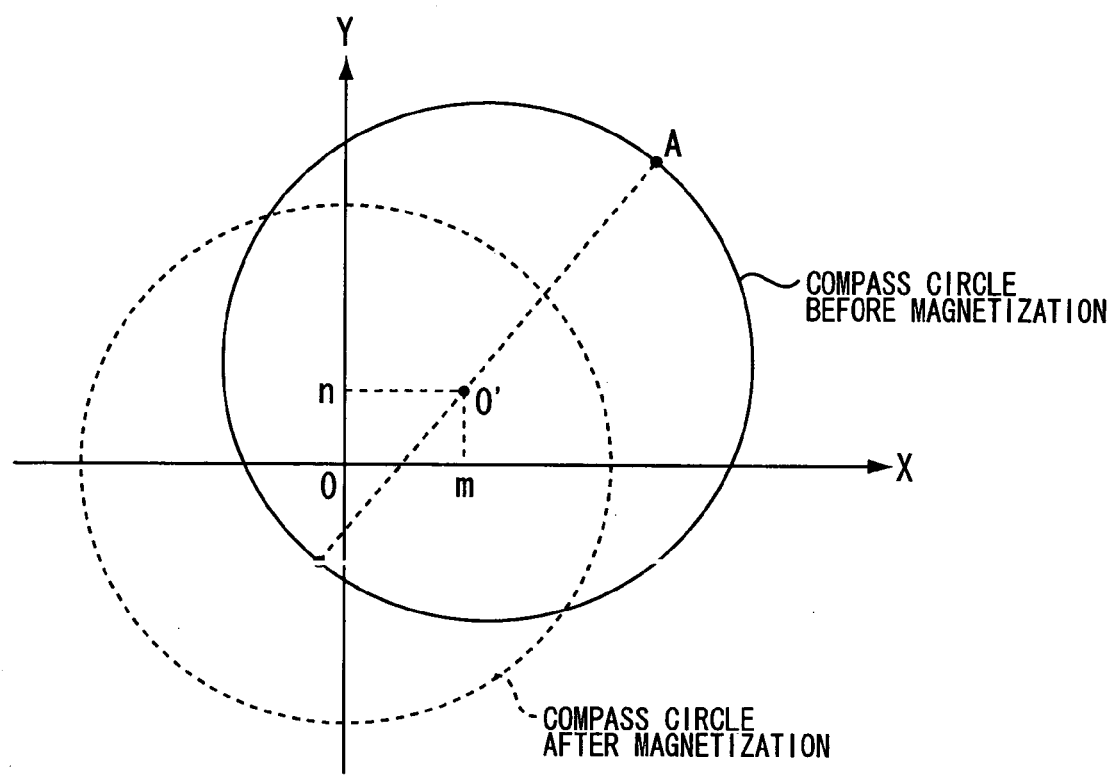
FIG. 21 is a diagram showing compass circles drawn by detection values of a conventional geomagnetic sensor.

Next, operation of calibration of an offset of the geomagnetic sensor 30 of the portable telephone according to this embodiment will be described with reference to a flowchart shown in FIG. 20. Since the offset calibration operation of the geomagnetic sensor 30 of the portable telephone in this embodiment other than step Sc3 (steps Sc1 and Sc2 and steps Sc4 to Sc10) is the same as steps Sb1 and Sb2 and steps Sb4 to Sb10 in the second embodiment, only the different point will be described.

Specifically, in step Sc3, the control section 10 reads not only detection results about the geomagnetism by the geomagnetic sensor 30 but also detection results about inclination by the inclination sensor 81 at constant time intervals. A difference is computed between the current inclination angle data and the previous inclination angel data detected previously by the inclination sensor 31. If the computed difference exceeds a predetermined difference, the current measurement data of the geomagnetism is inputted into the RAM 14.

As described above, according to this embodiment, the following problem can be avoided. Specifically, a problem that, in the second embodiment, when the portable telephone having the two-axis geomagnetic sensor is swung perpendicularly to the geomagnetism, since the measured values of the geomagnetic sensor do not change over a certain value, the swinging of the portable telephone cannot be detected so that data is not stored into the RAM 14 however long the time passes, can be avoided by recognizing the swinging of the portable telephone by the inclination sensor 81 except a case where the geomagnetism is directed perpendicularly to the ground. Further, it is possible to make the data density uniform in the range of the swinging by a user without depending on the speed of the swinging by the user. Further, the detection results of the inclination sensor 81 can be utilized for correction of inclination in azimuth display.

In this embodiment, the capacitance variable type sensor is assumed as the inclination sensor 81. However, the type of inclination sensor is not limited thereto and may be any type.

Further, when the estimated offset is judged not to be valid, it may be arranged that the display section 18a or 18b displays to that effect.

Further, it may be arranged that the offset calibration can be carried out again by a particular key operation after displaying that the estimated offset is judged not to be valid.

When carrying out the offset calibration again, it is desirable that newly measured data and measured data stored in the RAM 14 be compared with each other and only the proper data be stored into the RAM 14. For example, it is desirable that the distances between the offset values and the newly measured data and between the offset values and the measured data stored in the RAM 14 be derived and the data having the distance closer to the mean radius of an compass circle be stored into the RAM 14.

Although the first through fourth embodiments of the present invention have been described above in detail with reference to the drawings, the specific structures are not limited to those embodiments but also include design changes within a range not departing from the gist of the present invention.

Figure 22:
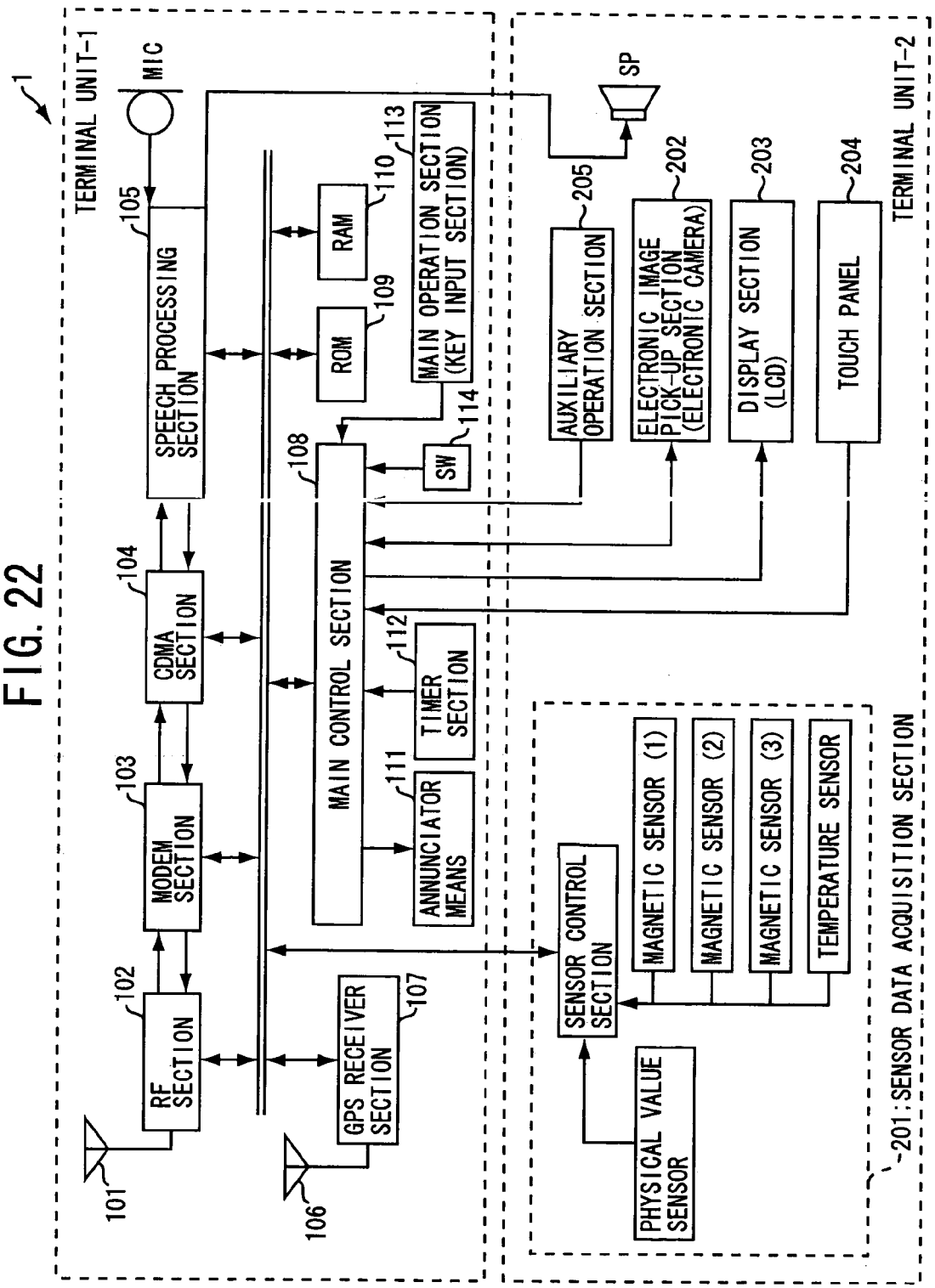
FIG. 22 is a block diagram showing an electrical structure of a portable communication terminal (portable terminal) which is one embodiment of a portable electronic apparatus with an azimuth detection function of the present invention.

Hereinbelow, further embodiments of the present invention will be described with reference to FIGS. 22 through 31. FIG. 22 is a block diagram showing an electrical structure of a portable communication terminal (hereinafter referred to as a portable terminal) according to the CDMA (Code Division Multiple Access) communication system, which is one embodiment of a portable electronic apparatus with an azimuth detection function of the present invention. Hereinbelow, those portions common to respective figures to refer to are assigned the same symbols.

A portable terminal 1 of this embodiment has a so-called folding structure comprising two housings (terminal unit-1 and terminal unit-2). Specifically, these two housings are coupled to each other through a coupling portion not illustrated such that the terminal unit-1 and the terminal unit-2 can be opened and closed with respect to a rotation shaft of the coupling portion. Folding portable terminals include a general folding type in which, from the state where the two units are overlapped each other, the two units start to be opened perpendicularly to the main plane (the plane where the terminal unit-1 and the terminal unit-2 overlap each other in the closed state) of the portable terminal and are further rotated that way about the rotation shaft, and what is called a revolver type in which the terminal unit-1 and the terminal unit-2 are rotated in parallel to the main plane of the portable terminal so as to be opened and closed. In this embodiment, although the general folding type and the revolver type are distinguished therebetween when particularly distinguishing them, it is defined that the portable terminal of the revolver type is also included in the folding portable terminals.

Next, the electrical structure of the portable terminal 1 of this embodiment will be described.

An antenna 101 shown in FIG. 22 performs transmission and reception of radio waves with respect to a radio base station not illustrated. An RF section 102 implements processing relating to transmission and reception of signals. The RF section 102 has a local oscillator and so on. At the time of reception, the RF section 102 mixes a local oscillating signal of a predetermined frequency to a reception signal output from the antenna 101 to thereby convert the reception signal into a reception IF signal of an intermediate frequency (IF) and outputs it to a modem section 103. On the other hand, at the time of transmission, the RF section 12 mixes a local oscillating signal of a predetermined frequency to a transmission IF signal of an intermediate frequency to thereby convert the transmission IF signal into a transmission signal of a transmission frequency and outputs it to the antenna 101.

The modem section 103 performs a demodulation process of a received signal and a modulation process of a signal to be transmitted. The modem section 103 has a local oscillator and so on, converts the reception IF signal output from the RF section 102 into a baseband signal of a predetermined frequency, converts the baseband signal into a digital signal, and outputs it to a CDMA section 104. On the other hand, the modem section 103 converts a transmission digital baseband signal output from the CDMA section 104 into an analog signal, converts it into a transmission IF signal of a predetermined frequency, and outputs it to the RF section 102.

The CDMA section 104 implements a coding process of a signal to be transmitted and a decoding process of a received signal. The CDMA section 104 decodes the baseband signal output from the modem section 103. On the other hand, the CDMA section 104 codes a transmission signal and outputs a coded baseband signal to the modem section 103.

A sound processing section 105 performs processing relating to sound at the time of telephone conversation. At the time of telephone conversation, the sound processing section 105 converts an analog sound signal output from a microphone (MIC) into a digital signal and outputs it to the CDMA section 104 as a transmission signal. On the other hand, at the time of telephone conversation, the sound processing section 105 produces an analog drive signal for driving a speaker (SP) on the basis of a signal indicative of sound data decoded by the CDMA section 104 and outputs it to the speaker (SP). The microphone (MIC) produces a sound signal based on a sound input by a user and outputs it to the sound processing section 105. The speaker (SP) emits a sound of a conversation partner based on the signal output from the sound processing section 105.

A GPS antenna 106 receives radio waves transmitted from each of GPS satellites not illustrated and outputs a reception signal based on the radio waves to a GPS receiving section 107. The GPS receiving section 107 demodulates this reception signal and, based on the reception signal, acquires accurate time information of the GPS satellite and information such as a propagation time of the radio waves. On the basis of the acquired information, the GPS receiving section 107 calculates distances to three or more GPS satellites and, on the basis of the triangulation principle, calculates a position (longitude, latitude, altitude, etc.) in three-dimensional space.

A main control section 108 is formed by a CPU (Central Processing Unit) and so on and controls respective sections inside the portable terminal 1. The main control section 108 performs input/output of control signals or data with respect to the RF section 102, the modem section 103, the CDMA section 104, the sound processing section 105, the GPS receiving section 107, a sensor data acquisition section 201 described below, a ROM 109, and a RAM 110 through a bus. The ROM 109 stores therein various programs executed by the main control section 108, initial property values of a temperature sensor and an inclination sensor measured at the time of shipment inspection, and so on. The RAM 110 temporarily stores data and the like processed by the main control section 108.

The ROM 109 is a machine readable medium for use in the portable electronic apparatus 1 having the CPU, the geomagnetic sensor and a foldable body which is handled by opening operation and closing operation and which generates a leakage magnetic field. The machine readable medium composed of the ROM 109 contains an azimuth measurement program executable by the CPU for causing the portable electronic apparatus 1 to perform an azimuth measurement process, which will be described later in detail.

Annunciator means 111 comprises, for example, a speaker, a vibrator, a light-emitting diode, or the like and notifies a user of reception of a call, reception of a mail, or the like by the use of sound, vibration, light, or the like. A timer section 112 has a timing function and produces timing information such as year, month, day, day of the week, time, and so on. A main operation section 113 comprises input keys for inputting characters, conversion keys for converting Chinese characters, numerals, and so on, cursor keys for operating a cursor, a power on/off key, a call key, a redial key, and so on and outputs a signal indicative of an operation result by a user to the main control section 108. An open/close switch (SW) 114 is a switch for detecting the start of opening (opening operation) and the end of closing (closing operation) of the folding portable terminal.

The sensor data acquisition section 201 comprises magnetic sensors (1) to (3) for detecting magnetism (magnetic fields) in X-axis, Y-axis, and Z-axis directions perpendicular to each other, respectively, a temperature sensor for detecting a temperature, a physical value sensor for detecting an inclination of the portable terminal 1, and a sensor control section for processing (A/D conversion, etc.) detection results by the foregoing respective sensors.

An electronic image pickup section 202 comprises optical lenses and image pickup elements such as CCD (Charge Coupled Device), converts an image of a subject formed on image pickup surfaces of the image pickup elements by the optical lenses into an analog signal by the image pickup elements, converts the analog signal into a digital signal, and outputs it to the main control section 108. A display section 203 has a liquid crystal display and so on and displays an image, characters, and so on based on a display signal output from the main control section 108. A touch panel 204 is incorporated into the surface of the liquid crystal display provided in the display section 203 and outputs a signal corresponding to contents of an operation by a user to the main control section 108. An auxiliary operation section 205 has a push switch for use in display switching, and so on.

Figure 23:
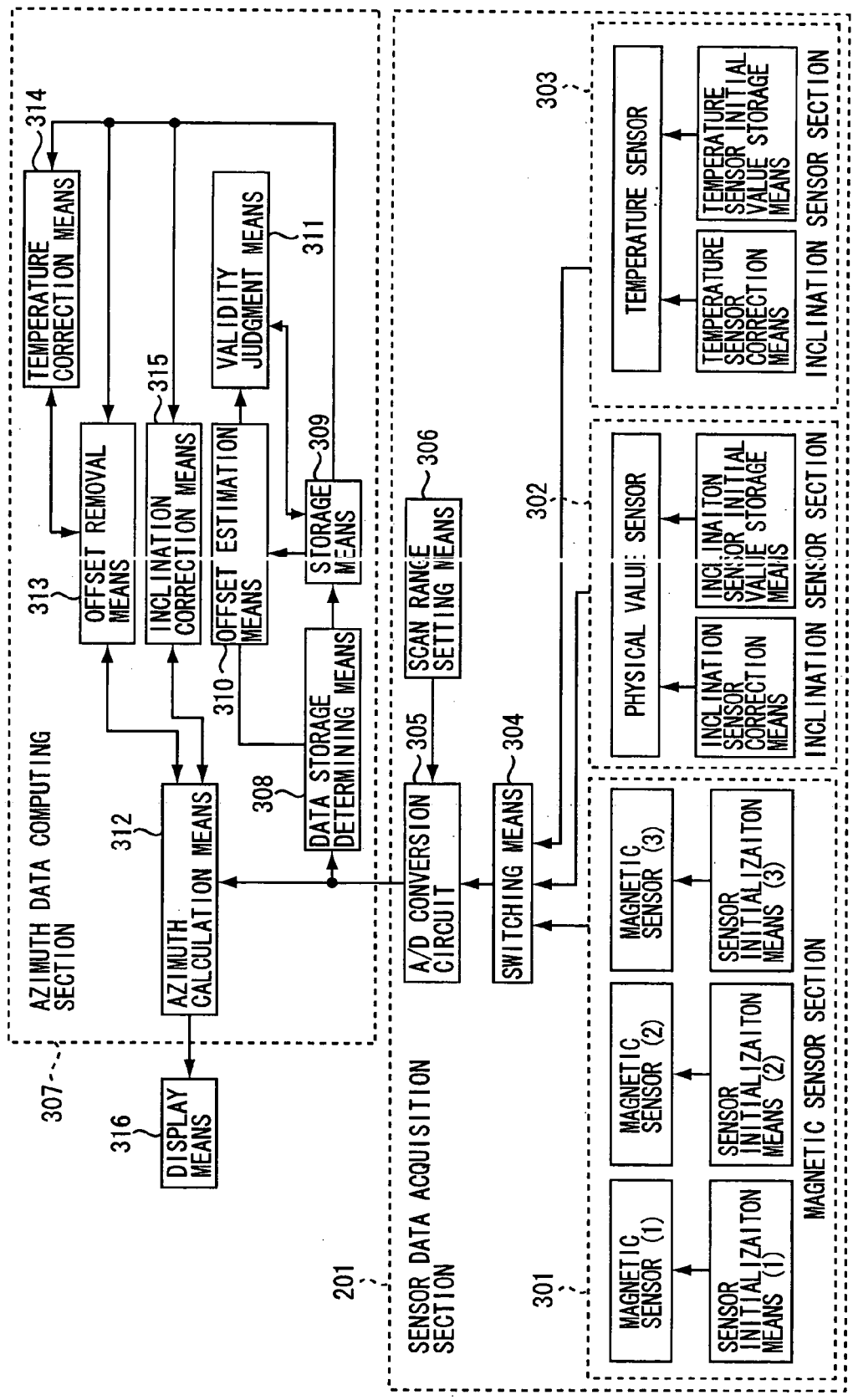
FIG. 23 is a functional block diagram of the same embodiment.

Herein, a functional block diagram shown in FIG. 23 will be described.

Note that an azimuth data computing section 307 shown in the same figure corresponds to the main control section 108 shown in FIG. 22, and display means 316 corresponds to the display section 203 shown in FIG. 22.

A magnetic sensor section 301 comprises magnetic sensors (1) to (3) and sensor initialization means (1) to (3) for initializing the respective magnetic sensors after the power is turned on. The sensor initialization means (1) to (3) are provided for resetting the magnetic sensors (1) to (3) into the initial state because when a strong magnetic field is applied, the direction of magnetization of magnetic bodies of the magnetic sensors (1) to (3) goes wrong.

An inclination sensor section 302 comprises a physical value sensor (inclination sensor), inclination sensor initial value storage means that stores, in advance at the time of manufacture, initial values indicative of values of an offset of an output value, sensitivity, and so on of the physical value sensor, and inclination sensor correction means for correcting, at the time of measurement, an output of the physical value sensor based on the initial values stored by the inclination sensor initial value storage means.

A temperature sensor section 303 comprises a temperature sensor, temperature sensor initial value storage means that stores, in advance at the time of manufacture, initial values indicative of values of an offset of an output value, sensitivity, and so on of the temperature sensor, and temperature sensor correction means for correcting, at the time of measurement, an output of the temperature sensor based on the initial values stored by the temperature sensor initial value storage means.

Switching means 304 switches among outputs from the magnetic sensor section 301, the inclination sensor section 302, and the temperature sensor section 303 and inputs an analog signal output from one of the sensor sections into an A/D conversion circuit 305. The A/D conversion circuit 305 converts this analog signal into a digital signal. Scan range setting means 306 sets per sensor a voltage range serving as a conversion unit when quantizing an output voltage of each sensor to perform digital conversion, and a quantization unit (e.g. perform quantization per 0.1 mV, etc.).

In the azimuth data computing section 307, data storage determining means 308 performs processing relating to data storage such as judging, at the time of calibration, whether or not measurement data represented by a digital signal corresponding to an output of the magnetic sensor should be stored into storage means. Offset estimation means 310 estimates an offset based on measurement data acquired at the time of calibration (details will be described later). Validity judgment means 311 judges validity of the offset estimated by the offset estimation means 310 (details will be described later). Storage means 309 stores measurement data and so on.

Azimuth calculation means 312 calculates an azimuth based on measurement data acquired at the time of azimuth calculation. Offset removal means 313 removes an offset from measurement data acquired at the time of azimuth calculation. Temperature correction means 314 implements temperature correction with respect to measurement data when the temperature correction of this measurement data is necessary. Inclination correction means 315 implements inclination correction with respect to measurement data when the inclination correction is necessary. The display means 316 displays as an image the azimuth calculated by the azimuth calculation means 312.

Herein, the operation of the azimuth data computing section 307 will be described in detail.

At the time of calibration, measurement data output from the sensor data acquisition section 201 is input into the data storage determining means 308. The data storage determining means 308 judges based on a data storage judging algorithm whether or not the measurement data should be stored into the storage means 309. As a result of the judgment, if it is judged that the measurement data should be stored into the storage means 309, the data storage determining means 308 stores the measurement data into the storage means 309. Further, the data storage determining means 308 counts the number of the measurement data stored in the storage means 309 and, when the number of the measurement data has reached a predetermined number, stops storing measurement data into the storage means 309 and commands the offset estimation means 310 to estimate an offset.

When commanded by the data storage determining means 308 to estimate the offset, the offset estimation means 310 reads the measurement data from the storage means 309 and estimates the offset based on an offset estimation algorithm. Further, the offset estimation means 310 notifies the estimation result of the offset to the validity judgment means 311. When the estimation result of the offset is notified by the offset estimation means 310, the validity judgment means 311 reads measurement data from the storage means 309 and, based on a validity judgment algorithm, judges whether or not the estimated offset is valid. When the estimated offset is valid, the validity judgment means 311 stores this offset into the storage means 309.

At the time of azimuth calculation, measurement data output from the sensor data acquisition section 201 is input into the azimuth calculation means 312. This measured data is magnetic data, temperature data, and inclination data. The azimuth calculation means 312 outputs the magnetic data and the temperature data to the offset removal means 313. When these measured data are input, the offset removal means 313 reads the offset from the storage means 309, performs correction by removing an offset portion from the magnetic data, and outputs the magnetic data after the correction to the azimuth calculation means 312.

Further, depending on necessity, the azimuth calculation means 312 commands the offset removal means 313 to implement temperature correction of the magnetic data. In response to this command, the offset removal means 313 outputs the temperature data to the temperature correction means 314. The temperature correction means 314 reads temperature data at the time of calibration from the storage means 309 and, based on a current temperature and a temperature at the time of calibration, corrects the current magnetic data and notifies the correction result to the offset removal means 313. On the basis of this correction result, the offset removal means 313 outputs the magnetic data after the offset removal, which has been subjected to the temperature correction, to the azimuth calculation means 312.

Specifically, assuming that a temperature at the time of calibration is T0, an estimated offset is OF, a temperature coefficient is A (this is measured at the time of shipment inspection and stored in the ROM 109), a temperature at the time of measurement is T, and a measured value of the magnetic sensor is S0, magnetic data S1 after the offset removal, which has been subjected to the temperature correction, is given by $$S1 = S0 - \{OF + A(T-T0)\}$$

Further, the azimuth calculation means 312 implements inclination correction depending on necessity.

Herein, this inclination correction will be described in detail.

Figure 24A:
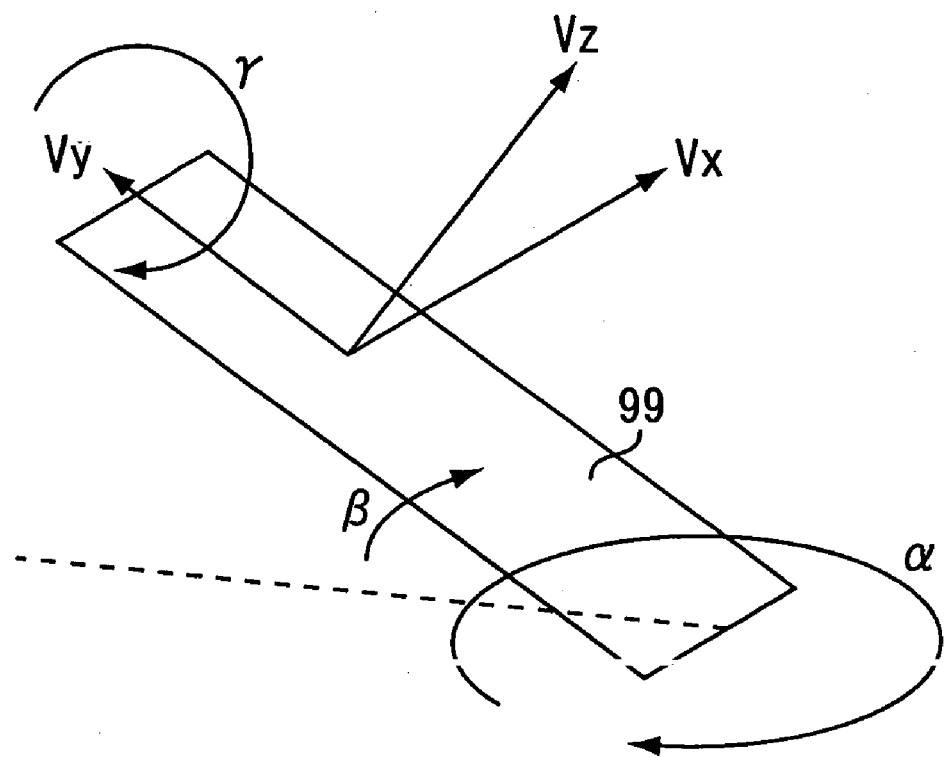
FIGS. 24(a) and 24(b) are diagrams showing a coordinate system of the portable terminal and a ground coordinate system.
Figure 24B:
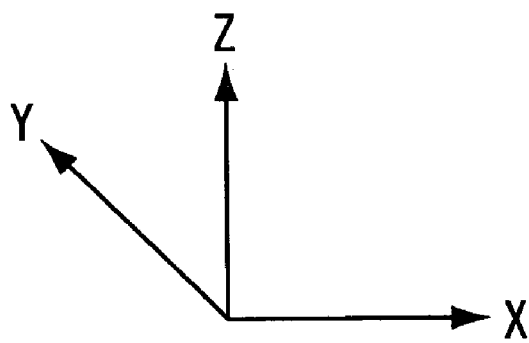

Here, a coordinate system of the portable terminal 1 is defined as shown in FIG. 24(a). Specifically, it is given that a direction angle of the antenna 101 of the portable terminal 1 is α, an elevation angle thereof is β, and a twist angle (a rotation angle about an antenna axis) is γ. A sign is positive in arrow directions shown in the figure. Further, it is given that a unit vector in an antenna direction is Vy, a unit vector in a direction perpendicular to the plane (e.g. the plane at a portion of symbol 99 in FIG. 24) formed by the terminal unit-2 (the side where the antenna 101 and the magnetic sensor section 301 are arranged) is Vz, and a unit vector perpendicular to Vy and Vz is Vx. Arrow directions shown in the figure are positive directions. As shown in FIG. 24(b), a ground coordinate system is represented by X, Y, and Z and the Y-axis defines the north direction.

Herein, it is given that gravity in the ground coordinate system is G=(0, 0, Gz). Further, it is given that gravity in the portable coordinate system is g=(gx, gy, gz). It is assumed that gravity in the portable coordinate system can be detected by the inclination sensor.

Naturally, gravity in the ground coordinate system is known.

Then, gravity g in the portable coordinate system and gravity G in the ground coordinate system are expressed by the following formula.

$$(Gx, Gy, Gz)BC = (gx, gy, gz)$$

where $$B = \begin{bmatrix} 1 & 0 & 0 \\ 0 & \cos\beta & \sin\beta \\ 0 & -\sin\beta & \cos\beta \end{bmatrix} \quad \text{[Expression 12]}$$

-continued $$C = \begin{bmatrix} \cos\gamma & 0 & -\sin\gamma \\ 0 & 1 & 0 \\ \sin\gamma & 0 & \cos\gamma \end{bmatrix} \quad \text{[Expression 13]}$$

Accordingly, BC is expressed by the following formula.

$$BC = \begin{bmatrix} \cos\gamma & 0 & -\sin\gamma \\ \sin\beta\sin\gamma & \cos\beta & \sin\beta\cos\gamma \\ \cos\beta\sin\gamma & -\sin\beta & \cos\beta\cos\gamma \end{bmatrix} \quad \text{[Expression 14]}$$

Therefore, gravity g in the portable coordinate system is expressed by the following formula.

$$(gx, gy, gz) = (0, 0, Gz) \begin{bmatrix} \cos\gamma & 0 & -\sin\gamma \\ \sin\beta\sin\gamma & \cos\beta & \sin\beta\cos\gamma \\ \cos\beta\sin\gamma & -\sin\beta & \cos\beta\cos\gamma \end{bmatrix} \quad \text{[Expression 15]}$$

$$= Gz(\cos\beta\sin\gamma, -\sin\beta, \cos\beta\cos\gamma)$$

From this formula, the elevation angle $\beta$ and the twist angle $\gamma$ are derived.

$$\beta = \arctan\left(-\frac{gy}{\sqrt{gx^2 + gz^2}}\right) \quad \text{[Expression 16]}$$

$$\gamma = \begin{cases} \arctan\left(\frac{gx}{gz}\right) & gz \geq 0 \\ 180(deg) + \arctan\left(\frac{gx}{gz}\right) & gz < 0 \end{cases} \quad \text{[Expression 17]}$$

From the elevation angle $\beta$ and the twist angle $\gamma$ thus derived, the direction angle $\alpha$ and an elevation angle $\theta$ of the geomagnetism can be derived. Herein, given that the geomagnetism in the portable coordinate system is h=(hx, hy, hz) and the geomagnetism in the ground coordinate system is H=(0, Hy, Hz), $$(0,Hy,Hz)ABC = (hx,hy,hz)$$

is established, where $$A = \begin{bmatrix} \cos\alpha & -\sin\alpha & 0 \\ \sin\alpha & \cos\alpha & 0 \\ 0 & 0 & 1 \end{bmatrix} \quad \text{[Expression 18]}$$

$$B = \begin{bmatrix} 1 & 0 & 0 \\ 0 & \cos\beta & \sin\beta \\ 0 & -\sin\beta & \cos\beta \end{bmatrix} \quad \text{[Expression 19]}$$

$$C = \begin{bmatrix} \cos\gamma & 0 & -\sin\gamma \\ 0 & 1 & 0 \\ \sin\gamma & 0 & \cos\gamma \end{bmatrix} \quad \text{[Expression 20]}$$

Accordingly, the following formula is obtained.
[Expression 21]

$$(0,Hy,Hz)A = (hx,hy,hz)C^{-1}B^{-1} \equiv (hx',hy',hz')$$

Therefore, (hx', hy', hz')=(Hy sin $\alpha$, Hy cos $\alpha$, Hz).

Since the elevation angle $\beta$ and the twist angle $\gamma$ are derived in advance and the geomagnetism h in the portable coordinate system is measured, (hx',hy',hz') is determined.

Herein, assuming that the geomagnetism H in the ground coordinate system is known, the direction angle $\alpha$ is derived. Further, the elevation angle $\theta$ is also derived by the following formula.

$$\theta = \arctan\frac{hz'}{\sqrt{hx'^2 + hy'^2}} \quad \text{[Expression 22]}$$

The azimuth calculation means 312 calculates the azimuth based on the magnetic data after the correction as described above and notifies the calculated azimuth to the display means 316. The display means 316 displays, for example, information indicative of the azimuth on a map.

Next, the data storage judging algorithm will be described.

The data storage judging algorithm is for preventing storage of measurement data that cannot be used for calibration, in the case where data is entered while a user hardly moves the portable terminal 1 so that measurement data are concentrated to the vicinity of the same point on an azimuth circle or a compass sphere (described below) or where the data density becomes uneven because the operation speed of the user is not uniform. When such measured data is obtained, storage thereof into the storage means 309 is prevented.

When the portable terminal 1 is rotated in the horizontal plane (herein, it is assumed that an XY plane formed by respective axes of the magnetic sensor (1) and the magnetic sensor (2) is parallel to the horizontal plane), an output X of the magnetic sensor (1) converted into a magnetic field value changes in a sine wave fashion while an output Y of the magnetic sensor (2) converted into a magnetic field value changes in a sine wave fashion with a phase difference of 90° with respect to the output X.

Given that an offset is (X0, Y0), the following expression of relation is established, which is called an azimuth circle.

$$(X-X0)^2 + (Y-Y0)^2 = R^2$$

A similar expression of relation is established also in the case of three dimensions, which is called a compass sphere.

$$(X-X0)^2 + (Y-Y0)^2 + (Z-Z0)^2 = R^2$$

Specifically, given that data stored into the RAM 110 immediately before is (Xp, Yp, Zp) and data to be subjected to the storage judgment is (X, Y, Z), the data storage judging algorithm stores the data (X, Y, Z) into the RAM 110 only when the following condition is satisfied. Note that a value of d is preferably about 1/10 of the radius of the azimuth circle.

[Expression 23]

$$d < \sqrt{(X_P-X)^2 + (Y_P-Y)^2 + (Z_P-Z)^2}$$

Next, the offset estimation algorithm will be described.

Given that measurement data is (xi, yi, zi) (i=1, ..., N), an offset is (X0, Y0, Z0), the radius of a compass sphere is R, the following expression of relation is established.

$$(xi-X_0)^2 + (yi-Y_0)^2 + (zi-Z_0)^2 = R^2$$

In this case, a least square error $\epsilon$ is defined as follows.

$$\varepsilon = \sum \{(x_i - X0)^2 + (y_i - Y0)^2 + (z_i - Z0)^2 - R^2\}^2$$
$$= \sum \{(x_i^2 + y_i^2 + z_i^2) - 2x_i X0 - 2y_i Y0 - 2z_i Z0 + (X0^2 + Y0^2 + Z0^2) - R^2\}^2$$

[Expression 24]

Herein, given that $a_i = xi^2 + yi^2 + zi^2$ $b_i = -2xi$ $c_i = -2yi$ $d_i = -2zi$ $D = (X0^2 + Y0^2 + Z0^2) - R^2$ (24)

$\epsilon$ is given by the following formula.

[Expression 25]

$\epsilon = \Sigma(a_i + b_i X0 + c_i Y0 + d_i Z0 + D)^2$

The condition that makes minimum the least square error a is obtained by differentiating $\epsilon$ with variables $X_0$, Y0 and D, and expressed by [Expression 26]. Here, the variables X0, Y0, Z0 and D are treated as an independent variable of $\epsilon$ for simplifying the computation.

$$\begin{cases} \frac{\partial \varepsilon}{\partial X0} = 2\sum (a_i + b_i X0 + c_i Y0 + d_i Z0 + D)b_i = 0 \\ \frac{\partial \varepsilon}{\partial Y0} = 2\sum (a_i + b_i X0 + c_i Y0 + d_i Z0 + D)c_i = 0 \\ \frac{\partial \varepsilon}{\partial Z0} = 2\sum (a_i + b_i X0 + c_i Y0 + d_i Z0 + D)d_i = 0 \\ \frac{\partial \varepsilon}{\partial D} = 2\sum (a_i + b_i X0 + c_i Y0 + d_i Z0 + D) = 0 \end{cases}$$

[Expression 26]

Therefore, the following formula is established.

$$\begin{bmatrix} [bb] & [bc] & [bd] & [b] \\ [bc] & [cc] & [cd] & [c] \\ [bd] & [cd] & [dd] & [d] \\ [b] & [c] & [d] & N \end{bmatrix} \begin{bmatrix} X0 \\ Y0 \\ Z0 \\ D \end{bmatrix} = \begin{bmatrix} -[ab] \\ -[ac] \\ -[ad] \\ -[a] \end{bmatrix}$$

[Expression 27]

where the operator [ ] used in the above equation represents:

$$[m] = \sum_{i=1}^{N} m_i, \quad [mn] = \sum_{i=1}^{N} m_i n_i$$

[Expression 28]

By solving these simultaneous equations, X0, Y0, Z0, and D that make minimum the least square error $\epsilon$ are derived. Further, R can also be derived from the formula (24).

Next, the validity judgment algorithm will be described.

In the processing according to this algorithm, the following values are calculated from an estimated offset, the radius of a compass sphere (or an azimuth circle), and measurement data stored in the RAM 110.

$$\sigma = \frac{1}{R}\sqrt{\frac{N\sum_{i=1}^{N}\{(x_i - X0)^2 + (y_i - Y0)^2 + (z_i - Z0)^2\} - \left(\sum_{i=1}^{N}\sqrt{(x_i - X0)^2 + (y_i - Y0)^2 + (z_i - Z0)^2}\right)^2}{N^2}}$$

[Expression 29]

$$w_x = \frac{\text{Max}(x_i) - \text{Min}(x_i)}{R}$$ [Expression 30]

$$w_y = \frac{\text{Max}(y_i) - \text{Min}(y_i)}{R}$$ [Expression 31]

$$w_z = \frac{\text{Max}(z_i) - \text{Min}(z_i)}{R}$$ [Expression 32]

where Max(xi) represents a maximum value among measurement data x1, . . . , XN and Min(xi) represents a minimum value among the measurement data x1, . . . , XN. Further, $\sigma$ represents a standard deviation. It is judged whether or not the following judgment criteria are satisfied with respect to the foregoing values and, when the judgment criteria are satisfied, the estimated offset is judged valid.

$\sigma < F$ $w_x > G$ $w_y > G$ $w_z > G$

Herein, F is preferably about 0.1 and G is preferably about 1.

Next, referring to FIG. 25, the operation relating to the calibration will be described in further detail.

[In Case of Revolver-Type Portable Terminal]

In the structural example shown in FIG. 22, the respective magnetic sensors are disposed on the terminal unit-2 side being the side that moves in the open direction when the portable terminal 1 is opened or closed. On the other hand, the unit-1 is generally held stationary by the hand of the user when the portable terminal 1 is opened or closed. In the case of the portable terminal 1 being of the revolver type, the magnetic sensors are mounted on the side that is rotated at the time of opening and closing (see FIG. 26). It is preferable that the position where the magnetic sensors are disposed be closer to the portion where the terminal unit-1 and the terminal unit-2 are coupled to each other (naturally, may be disposed on the terminal unit-1 side). This is because this position is normally remote from the position where the microphone or the speaker that generates magnetism are disposed. The portable terminal 1 is provided with the open/close switch (SW) 114 so that the opening/closing operation can be recognized at stages of the start of opening and the end of closing. The magnetic sensor section 301 may be formed by two-axis magnetic sensors or three-axis magnetic sensors.

(1) Calibration Method 1

Figure 26:
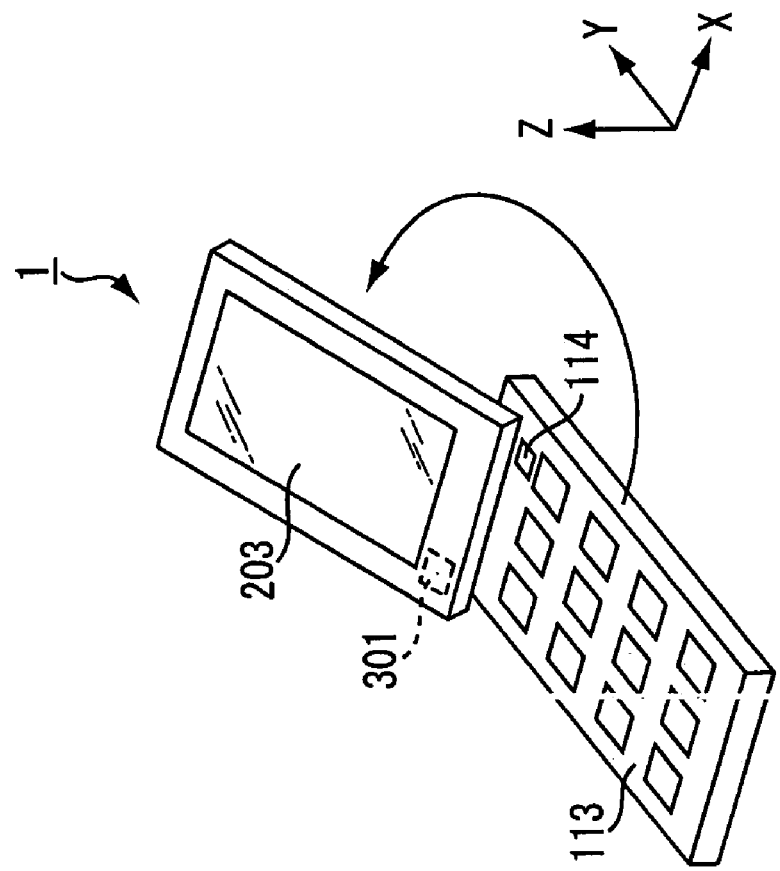
FIGS. 26(a) and 26(b) are diagrams showing the external appearance of a revolver-type portable terminal (closed state and opened state).
Figure 26:
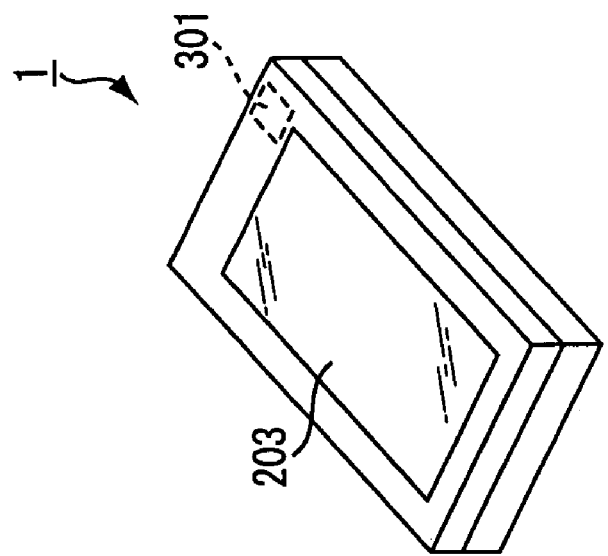

First, when the start of opening of the terminal unit-2 is detected by the open/close switch (SW) 114, trigger is on at this timing (step S101). In this event, the terminal unit-2 mounted with the magnetic sensor section 301 has started rotation (opening operation) so as to finally form an angle θ with respect to the terminal unit-1 as shown in FIG. 26.

The main control section 108 commands the sensor control section to carry out measurement by the use of the respective sensors (step S102). Data are read from the respective sensors and data sampling is started (step S103). Herein, the outputs of the respective magnetic sensors are continuously sampled for a predetermined time.

Then, on the basis of the foregoing data storage judging algorithm, it is judged whether or not to store the measurement data into the RAM 110 (step S104).

When it is judged No in step S104, the flow returns to step S102 after waiting for 0.1 seconds (step S105).

When it is judged Yes in step S104, the measurement data is stored into the RAM 110 (step S106), and it is further judged whether or not the number of the measurement data stored in the RAM 110 has reached a predetermined number (step S107).

When it is judged No in step S107, the flow proceeds to step S105. On the other hand, when it is judged Yes in step S107, sampling of measurement data is stopped, the measurement data stored in the RAM 110 is read therefrom, and an offset is estimated on the basis of the offset estimation algorithm (step S108).

Subsequently, based on the foregoing validity judgment algorithm, it is judged whether or not the estimated offset is valid values (step S109). When it is judged Yes based on this judgment, the offset estimated in step S108 is stored into the RAM 110 so that the update processing is finished (step S110). On the other hand, when it is judged No in step S109, the sequence of processing is finished without updating the offset (step S111).

When it is judged No in step S109, i.e. the offset estimated in step S108 is judged invalid, it may be configured to command a user to further open and close the portable terminal 1 or command the user to carry out opening and closing of the portable terminal 1 in a plurality of directions, thereby further acquiring measurement data from the respective magnetic sensors. With this configuration, the number of data that are measured increases so that accuracy of the offset estimation is improved. The command to the user is performed by, for example, emitting a warning sound by the use of the annunciator means 111 and displaying the contents of command to the user on the display section 203.

When the magnetic sensor section 301 is formed by the two-axis magnetic sensors, the calibration is implemented as described above (according to the calibration method 1). When the magnetic sensor section 301 is formed by the three-axis magnetic sensors, calibration according to the following calibration method 2 is further implemented after the judgment of Yes in step S107 in the foregoing calibration method 1.

(2) Calibration Method 2

In response to depression of a predetermined button (calibration button) of the main operation section 113, sampling is started. In this calibration method 2, a user is required to swing the portable terminal 1 in arrow directions of FIG. 27 (it is assumed that this operation by the user is indicated to the user in advance by an instruction manual or the like).

Then, outputs of the respective magnetic sensors are continuously sampled for a predetermined time. In the revolver type, when the terminal unit-2 is rotated with respect to the terminal unit-1 so as to be opened completely, the terminal unit-2 moves to finally form the angle of θ with respect to the main plane (described before) of the portable terminal 1. That is, the movable unit-2 is revolved to displace in directions of the three axes X, Y and Z in response to the opening operation. Thus, the magnetic sensor section 301 in the terminal unit-2 moves so as to change with respect to the three axes, respectively. When θ is occasionally small, the user is required to swing the portable terminal 1 so as to obtain measurement data for supplementing the small change of θ.

When the data acquisition is completed as described above, an offset is estimated from the obtained data. Then, the offset kept in the RAM 110 is updated with the estimated offset.

The update processing of the offset in the foregoing calibration methods 1 and 2 may be implemented only when correction of the offset is judged necessary on the basis of comparison between offset data obtained this time and offset data before updating (this judgment criterion is determined separately).

Alternatively, it may be configured that, based on judgment according to a predetermined criterion whether or not the offset has reached a level (or criterion range) where updating thereof is necessary, selection is made as to whether or not to perform data acquisition at the time of opening/closing of the portable terminal 1.

Herein, description will be given about an offset estimation method (another example) in the revolver-type portable terminal 1.

Figure 27:
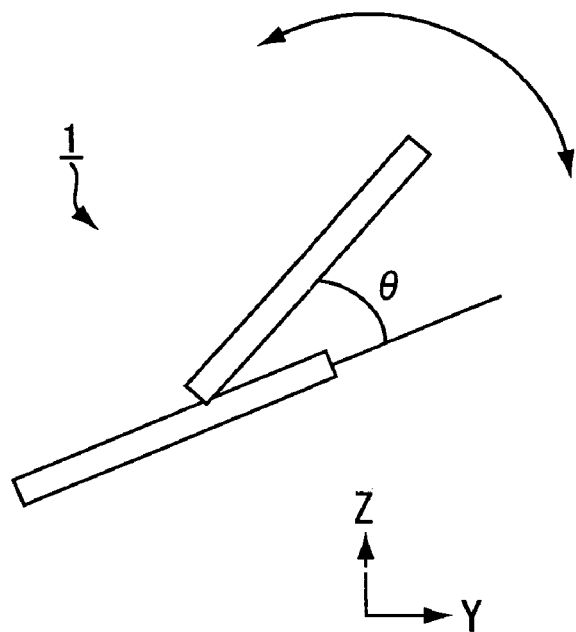
FIG. 27 is a diagram showing directions in which the portable terminal is swung according to a calibration method in the revolver-type portable terminal.

Although estimation of an offset can be derived according to the foregoing offset estimation algorithm, when the angle θ formed by the terminal unit-1 and the terminal unit-2 shown in FIG. 27 is taken into account, it can also be derived in the following manner.

Figure 28:
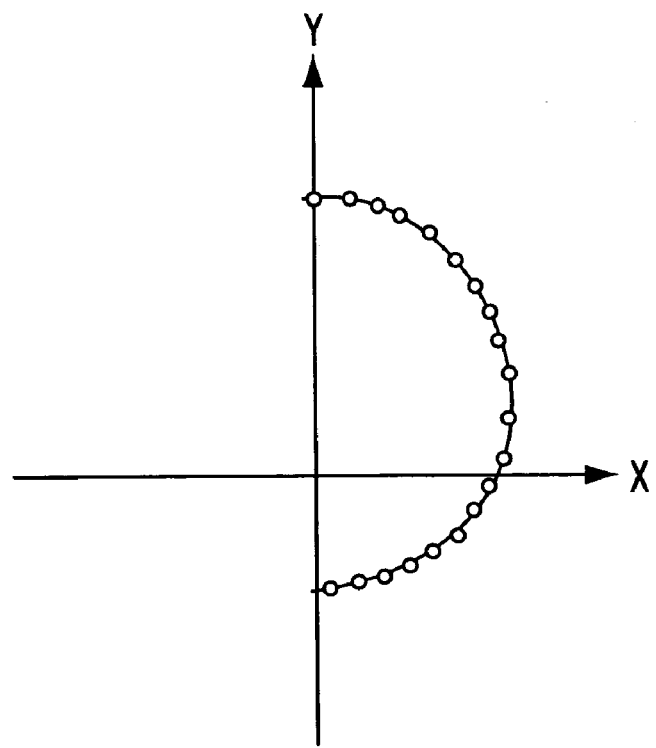
FIG. 28 is a diagram wherein measurement data sampled according to the calibration method are plotted on the XY plane (one example).

(a) In Case where Magnetic Sensor Section 301 is Formed by Two-axis Magnetic Sensors When measurement data sampled in the calibration method 1 are plotted using values of an X sensor (a magnetic sensor for detecting a magnetic force of the geomagnetism in the X-axis direction) with respect to the axis of abscissas and values of a Y sensor (a magnetic sensor for detecting a magnetic force of the geomagnetism in the Y-axis direction perpendicular to the X axis) with respect to the axis of ordinates (i.e. pairs of output values of the X sensor and output values of the Y sensor are plotted on the XY plane), the result becomes as shown in FIG. 28. This locus is part of an ellipse and the flattening ratio thereof depends on θ in FIG. 27 and an angle formed between the geomagnetism and the rotation plane (the plane formed when the magnetic sensor moves by rotation). Since θ is known here, offsets of X and Y and the angle formed between the geomagnetism and the rotation plane can be obtained by deriving the flattening ratio of the ellipse and the center coordinates.

Figure 29:
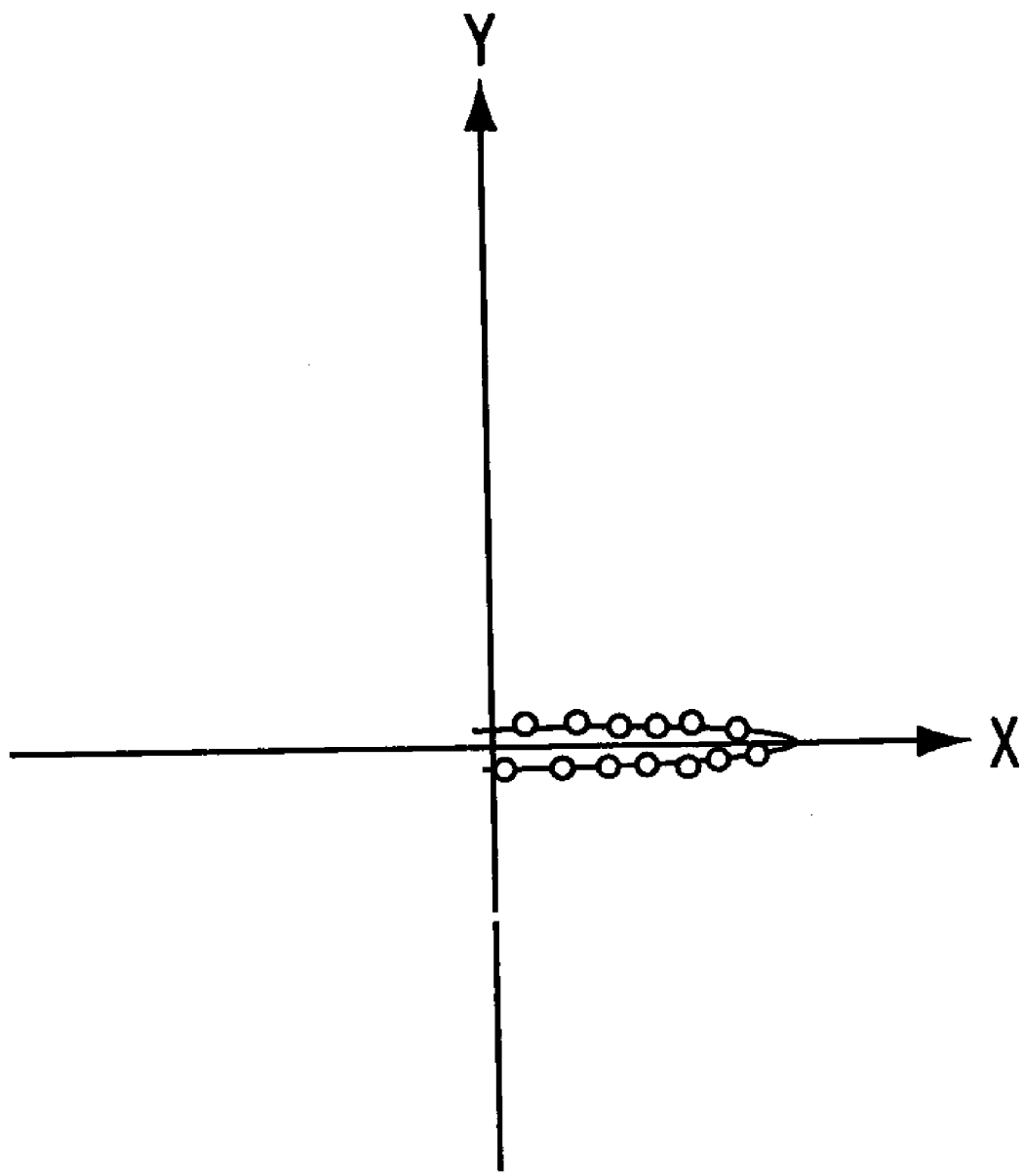
FIG. 29 is a diagram wherein measurement data sampled according to the calibration method are plotted on the XY plane (one example where θ is small).

(b) In Case where Magnetic Sensor Section 301 is Formed by Three-axis Magnetic Sensors Offsets on the XY plane can be derived like in the case of the two axes of the foregoing (a). With respect also to an offset in the Z-axis direction, when θ is relatively large (θ>30°), an offset value of Z can be derived like in the case of the two axes by the use of a locus of measurement data at the time of calibration on the XZ plane. However, when θ is small, accuracy is poor. This is because, as shown in FIG. 29, a locus is so flattened as to be substantially linear.

In such a case, the offset of Z may be derived from sampled data in the calibration method 2. In the calibration method 2, the user is required to swing the portable terminal 1. However, it may also be configured that when the user has changed the inclination of the terminal at the time of azimuth measurement, outputs of the magnetic sensors are sampled to thereby use those measurement data.

[In Case of General Folding Portable Terminal]

In the foregoing structural example shown in FIG. 22, the respective magnetic sensors are disposed on the terminal unit-2 side being the side which moves in the open direction when the portable terminal 1 is opened and closed. On the other hand, the unit-1 is generally held stationary by the hand of the user when the portable terminal 1 is opened or closed. That is, assuming that the terminal unit-2 is called a cover, the magnetic sensors are mounted on the cover side to be opened and closed (see FIG. 30). It is preferable that, like the revolver type, the position where the magnetic sensors are disposed be closer to the portion where the terminal unit-1 and the terminal unit-2 are coupled to each other. The portable terminal 1 is provided with the open/close switch (SW) 114 so that the opening/closing operation can be recognized at stages of the start of opening (at a stage where the terminal unit-2 is opened by a predetermined angle or more with respect to the terminal unit-1) and the end of closing. Herein, it is assumed that the magnetic sensor section 301 is formed by three-axis magnetic sensors.

Figure 31:
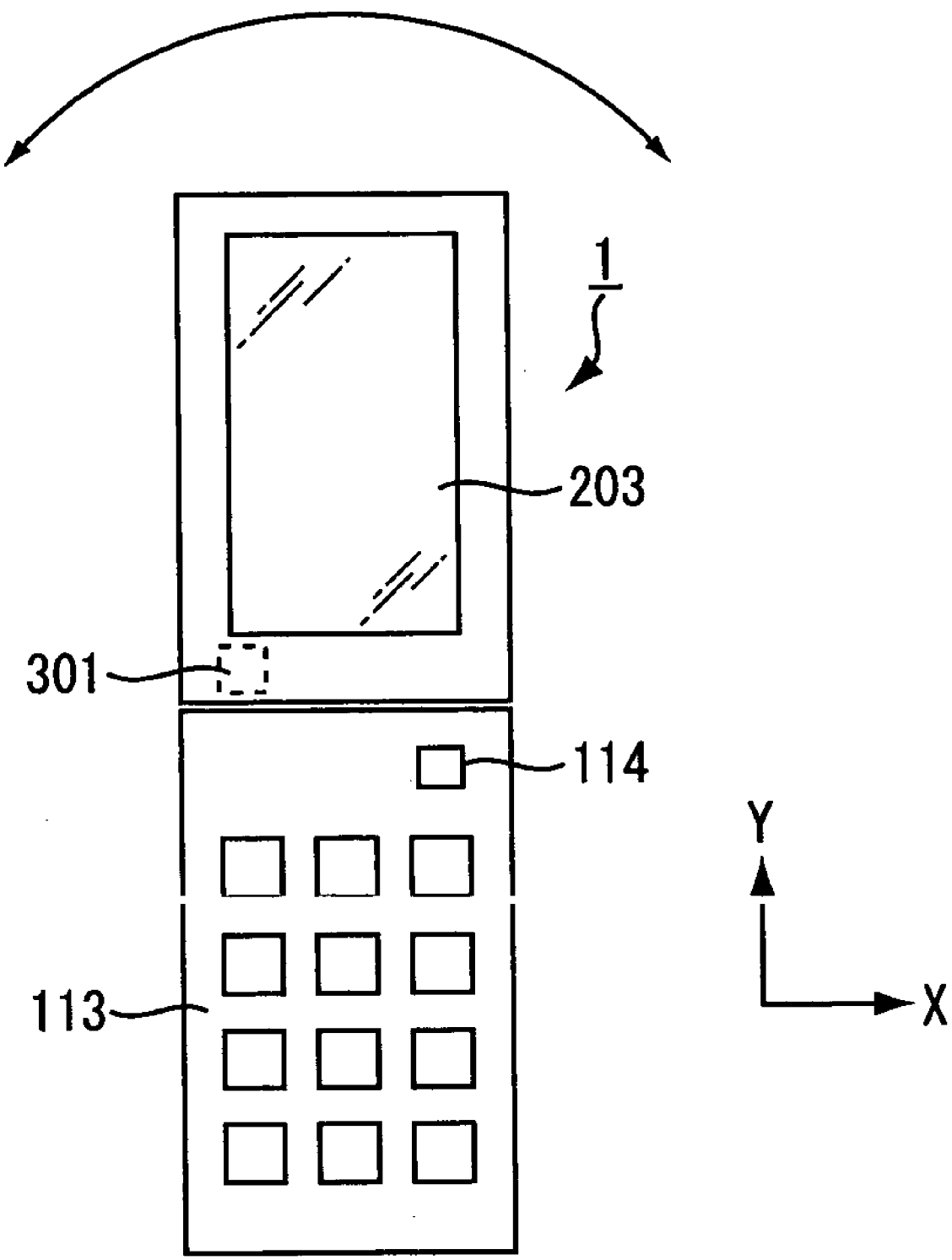
FIG. 31 is a diagram showing directions in which the portable terminal is swung according to the calibration method in the general folding portable terminal.

Also in the case of the general folding portable terminal, it is possible to utilize the processing sequence of the calibration method 1 and the calibration method 2 in the case of the foregoing revolver type. However, in the calibration method 2 here, when sampling outputs of the respective magnetic sensors, a user is required to swing the portable terminal 1 as shown in FIG. 31. In the case where the portable terminal 1 is of the general folding type as shown in FIG. 30, when the terminal unit-2 having the magnetic sensor section 301 is opened from the terminal unit-1, although the plane formed by a locus thereof largely changes, a change in a direction (X direction) perpendicular to the locus is small and, therefore, in order that a substantial change appear in this direction, the user is required to swing the portable terminal 1 in arrow directions shown in FIG. 31 to thereby obtain measurement data.

As described above, when the portable terminal 1 is the general folding portable terminal, the offsets in the Y-axis and Z-axis directions can be estimated from the measurement data obtained according to the calibration method 1. The offset in the X-axis direction can be estimated from the measurement data obtained by the foregoing calibration method 2. It is also possible to estimate the offset by the use of those measurement data obtained when the user changes the direction at the time of azimuth measurement.

Note that the operation flow described above is one example, thereby not being limited to the foregoing processing flow.

The description has been given above about the embodiments of the present invention with reference to the drawings. However, it is needless to say that the specific structures are not limited to the embodiments but also include structures within a range not departing from the gist of the present invention.

In the foregoing embodiments, the calibration is implemented at the timing when the user opens the portable terminal, but it is also possible to implement calibration after closing thereof. This is because, immediately after closing the portable terminal, the user makes motions such as putting the portable terminal into a pocket or placing it on a desk so that the portable terminal changes the direction thereof for a while after closing thereof. Therefore, it is possible to sample outputs of the magnetic sensors during this period and to estimate an offset from those measurement data.

Further, calibration may always be implemented at the timing when the user opens and closes the portable terminal, or confirmation may be made to the user as to whether or not to commence calibration at the time of opening and closing.

Next description is directed to method and apparatus for compensating a leakage magnetic field generated in the portable terminal set.

Figure 32:
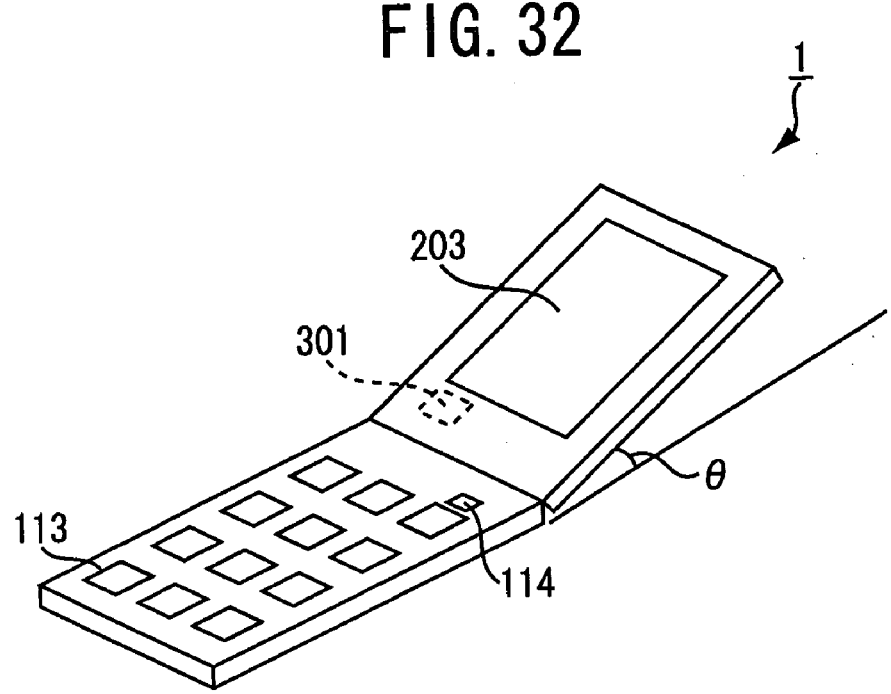
FIG. 32 is a diagram showing an appearance of the portable terminal in an open state according to another embodiment of the invention.

In the structural example shown in FIG. 22, the respective magnetic sensors are disposed on the side of the terminal unit-2 which moves in the open direction. On the other hand, the unit-1 is generally held stationary by the hand of the user when the portable terminal 1 is opened or closed. Assuming that the terminal unit-2 is called a cover, the magnetic sensors are mounted on the cover side to be opened and closed (see FIG. 32). Although the position where the magnetic sensors are disposed is preferably closer to the portion where the terminal unit-1 and the terminal unit-2 are coupled to each other (naturally, may be disposed on the terminal unit-1 side), it may be located at any portion. The portable terminal 1 is provided with the open/close switch (SW) 114 so that the opening/closing operation can be recognized at stages of the start of opening and the end of closing. Herein, it is assumed that the magnetic sensor section 301 is formed by three-axis magnetic sensors.

(1) Calibration Method

Figure 25:
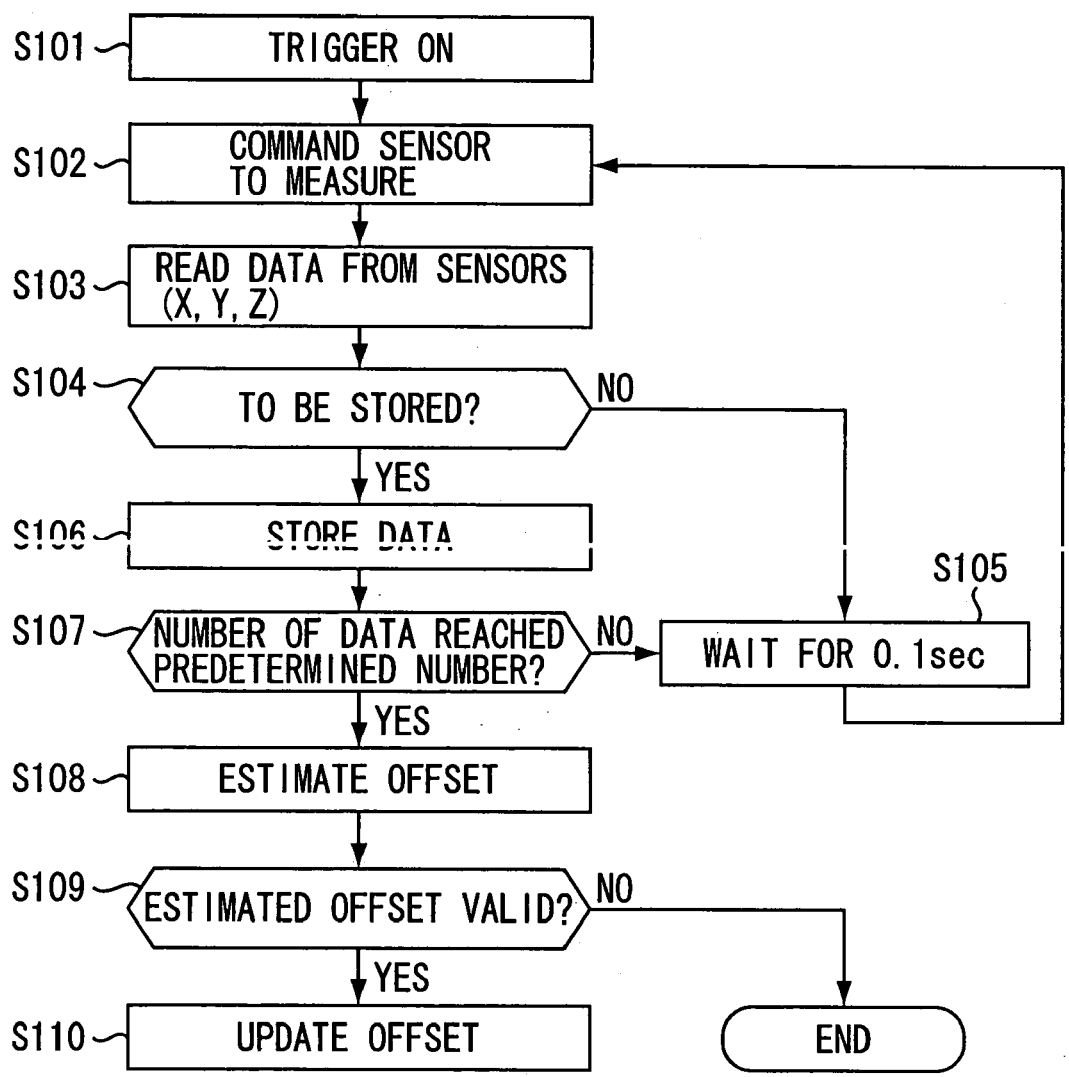
FIG. 25 is a flowchart for explaining operation relating to calibration.

The basic calibration method is described in conjunction with FIG. 25. First, when the end of closing of the terminal unit-2 is detected by the open/close switch (SW) 114, trigger is on at this timing (step S101). Thereafter, the user makes motions such as putting the portable terminal 1 into a pocket or placing it on a desk. Therefore, the portable terminal 1 changes the direction thereof for a while after closing thereof.

The main control section 108 commands the sensor control section to carry out measurement by the use of the respective sensors (step S102). Data are read from the respective sensors and data sampling is started (step S103). Herein, the outputs of the respective magnetic sensors are continuously sampled for a predetermined time. When the measurement data thus sampled are plotted in the XYZ space, data points are scattered on a certain spherical surface.

Then, on the basis of the foregoing data storage judging algorithm, it is judged whether or not to store the measurement data into the RAM 110 (step S104).

When it is judged No in step S104, the flow returns to step S102 after waiting for 0.1 seconds (step S105).

When it is judged Yes in step S104, the measurement data is stored into the RAM 110 (step S106), and it is further judged whether or not the number of the measurement data stored in the RAM 110 has reached a predetermined number (step S107).

When it is judged No in step S107, the flow proceeds to step S105. On the other hand, when it is judged Yes in step S107, sampling of measurement data is stopped, the measurement data stored in the RAM 110 is read therefrom, and an offset is estimated on the basis of the foregoing offset estimation algorithm (step S108).

Subsequently, based on the foregoing validity judgment algorithm, it is judged whether or not the estimated offset is valid values (step S109). When it is judged Yes based on this judgment, the offset estimated in step S108 is stored into the RAM 110 so that the temporary update processing is finished (step S110). On the other hand, when it is judged No in step S109, the sequence of processing is finished without updating the offset (step S111).

The (temporary) update processing of the offset in the foregoing calibration method may be implemented only when correction of the offset is judged necessary on the basis of comparison between offset data obtained this time and offset data before updating (this judgment criterion is determined separately).

Alternatively, it may be configured that, based on judgment according to a predetermined criterion whether or not the offset has reached a level (or criterion range) where updating thereof is necessary, selection is made as to whether or not to perform data acquisition at the time of opening/closing of the portable terminal 1.

Herein, another example of a calibration method will be described.

Since, in general, the user's motion is not determined after closing the portable terminal 1, if the measurement data sampled in step S103 are plotted in the XYZ space as described above, there is a case where data points are concentrated on a particular plane. For example, when data are concentrated on the XY plane, the value of Z cannot be derived accurately even by deriving the center of an azimuth sphere from those data.

In this case, according to the foregoing data storage judging algorithm, the measurement data that cannot be used for calibration is prevented from being stored into the storage means 309. However, also in this case, the measurement data is stored into the storage means 309 and an offset is estimated according to the foregoing offset estimation algorithm. Then, as a validity judgment algorithm, the least square error of the radius of the azimuth sphere is derived and then the least square error when the offset is moved in the Z-axis direction by a certain amount is further derived. When a difference between the two least square errors in this event is smaller than a predetermined value, the offset with respect to the Z-axis is invalidated and only the offsets with respect to the X-axis and Y-axis are temporarily updated.

Next, the leakage magnetic field correction will be described.

The offsets derived as described above are ones in the state where the portable terminal 1 is closed. In general, a speaker, a microphone, and so on are mounted in a portable terminal such as a portable telephone and permanent magnets are used therein. There is a case where the influence exerted on the offset of the magnetic sensor by a leakage magnetic field from the permanent magnet differs between the state where the portable terminal 1 is closed and the state where it is opened. In this case, it is necessary to correct the offset derived before corresponding to such a difference.

Normally, the operation when opening the portable terminal 1 is determined. Further, the positional relationship between the incorporated permanent magnet and magnetic sensor is known. When outputs of the magnetic sensor are sampled at the time of the operation of opening the portable terminal 1, i.e. from the start of opening of the portable terminal 1, and the measurement data are plotted in the XYZ space, a curve described in the XYZ space by the measurement data is limited and, when the strength of magnetization of the permanent magnet, the relative angle between the geomagnetism and the portable terminal 1, and the strength of the geomagnetism are determined, it is determined to be one.

Assuming herein that the direction of magnetization is the Z direction, a magnetic field formed around a geomagnetic sensor by a permanent magnet with a magnetization M is expressed by the following formula. Note that x, y, and z are coordinates of the geomagnetic sensor when the position of the permanent magnet is given as the origin. Further, Hx denotes an X component of the magnetic field, Hy denotes a Y component of the magnetic field, and Hz denotes a Z component of the magnetic field.

$$Hx = \frac{1}{4\pi\mu_0} \frac{3M \cdot x \cdot z}{(x^2 + y^2 + z^2)^{\frac{5}{2}}} \quad \text{[Expression 33]}$$

$$Hy = \frac{1}{4\pi\mu_0} \frac{3M \cdot y \cdot z}{(x^2 + y^2 + z^2)^{\frac{5}{2}}} \quad \text{[Expression 34]}$$

$$Hz = \frac{1}{4\pi\mu_0} \left( \frac{3M \cdot z^2}{(x^2 + y^2 + z^2)^{\frac{5}{2}}} - \frac{M}{(x^2 + y^2 + z^2)^{\frac{3}{2}}} \right) \quad \text{[Expression 35]}$$

Now, x, y, and z are known as a function of an open/close angle θ (see FIG. 32) of the portable terminal 1. Further, the relative direction of the geomagnetic sensor mounted in the terminal unit-2 with respect to the terminal unit-1 portion is also derived as a function of θ. Further, the relative direction and strength of the geomagnetism with respect to the terminal unit-1 portion are also known. Therefore, a change in output of the geomagnetic sensor based on the geomagnetism at the time of opening/closing of the portable terminal 1 is also known.

Figure 33:
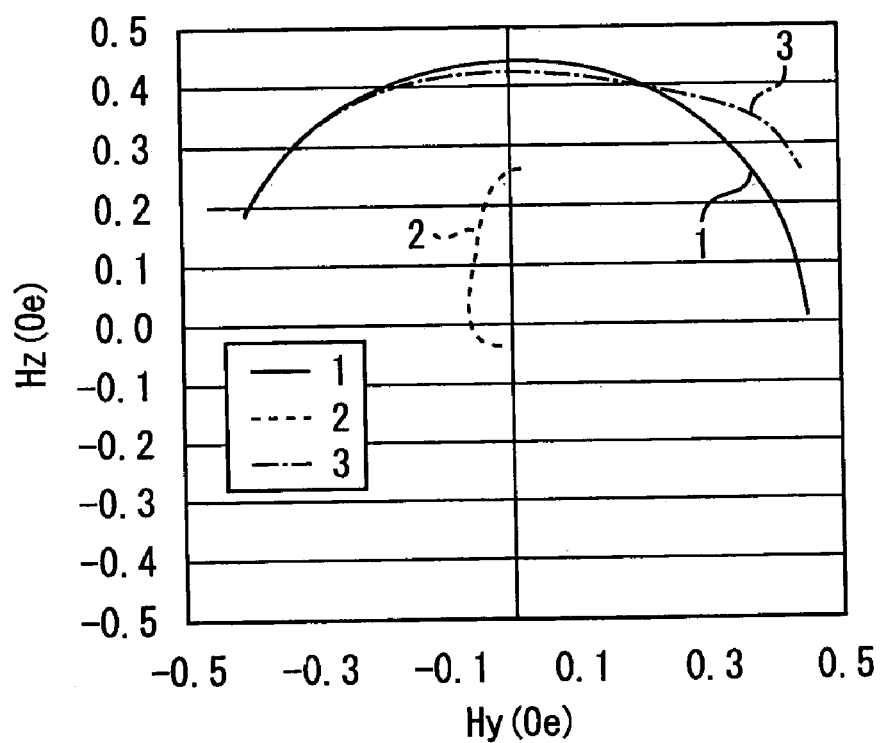
FIG. 33 is a graph indicating a simulated change of values of Hy and Hz.

Herein, simulation is made for the change of the magnetic field during the movement of the portable terminal 1 from the closed state to the completely opened state. The simulation uses a formula representing a magnetic field made around the geomagnetic sensor by the permanent magnet having the magnetization. When simulating a relationship between Hy1 and Hz1 of a magnetic field from the permanent magnet, a relationship between Hy2 and Hz2 of a magnetic field from the geomagnetism, and a relationship between Hy3 (=Hy1+Hy2) and Hz3 (Hz1+Hz2) each being the sum of the magnetic field from the permanent magnet and the magnetic field from the geomagnetism, the simulation result becomes, for example, as shown in FIG. 33. In this figure, a first curve represents the relationship between Hy2 and Hz2 of the magnetic field from the geomagnetism, a second curve represents the relationship between Hy1 and Hz1 of the magnetic field from the permanent magnet, and a third curve represents the relationship between Hy3 and Hz3 each being the sum of the magnetic field from the permanent magnet and the magnetic field from the geomagnetism. FIG. 33 indicates the simulated change of values of Hy and Hz. It is possible to conduct extended simulation including Hx as well as Hy and Hz.

In FIG. 33, the curves 2 and 3 vary in accordance with variation of the magnetization M. Here, the fitting is carried out for the curve 3 with using the magnetization M as a parameter, such that the curve 3 is fitted along a serried of measurement data which are successively acquired from the geomagnetic sensor during the course of the opening operation of the portable terminal 1, thereby obtaining the magnetization M.

Next, based on the obtained magnetization M, computation is carried out to calculate a value of the magnetic field under the closed state of the portable terminal 1, and another value of the magnetic field under the open state of the portable terminal 1. The magnetic field from the permanent magnet varies while the portable terminal 1 changes from the closed state to the completely open state. This variation of the magnetic field is represented by the curve 2 with the obtained magnetization M. Here, the opposite end points of the curve 2 correspond to the magnetic field from the magnet observed under the completely open state of the portable terminal 1, the magnetic field from the magnet observed under the closed state of the portable terminal 1. Therefore, the values of the magnetic field at the opposite end point of the curve 2 with the obtained magnetization M are calculated to obtain the value of magnetic field under the closed state of the portable terminal 1, and the value of the magnetic field under the completely open state of the portable terminal 1.

Further, a difference is calculated between the value of the magnetic field under the closed state of the portable terminal 1, and the value of the magnetic field under the completely open state of the portable terminal 1. This difference value corresponds to a value of the magnetic field influenced to the geomagnetic sensor from the magnet having the magnetization M.

Lastly, the calculated difference is subtracted from the offset value which is previously estimated under the closed state of the portable terminal 1, thereby compensating for the leakage magnetic field and formally updating the offset.

As described above, when the calibration of the magnetic sensor is implemented in the state where the portable terminal 1 is closed, and then the user opens the portable terminal 1, the leakage magnetic field correction of the offset is further implemented so that more accurate calibration is realized without forcing the user to carry out a particular operation.

In the foregoing, the main control section 108 of the portable terminal 1 performs the processing for the estimation of the offset and the leakage magnetic field correction. However, it may be configured that a processing section for implementing such processing is provided in a sensor data acquisition section (magnetic sensor device) 115, a close signal indicating that the portable terminal 1 has been closed is fed to the sensor data acquisition section 115 from the main control section 108 and, in response thereto, the sensor data acquisition section 115 performs the foregoing offset estimation processing, while, an open signal indicating that the portable terminal 1 has been opened is fed to the sensor data acquisition section 115 from the main control section 108 and, in response thereto, the sensor data acquisition section 115 performs the foregoing leakage magnetic field correction processing.

The invention claimed is:

1. A method of measuring a magnetic offset of a geomagnetic sensor equipped in a portable information terminal apparatus, the geomagnetic sensor having a magnetic sensitivity to a geomagnetic field in a plurality of axes of a coordinate system, and being affected by magnetization to cause the magnetic offset, the method comprising:

a data measurement step of measuring an output of the geomagnetic sensor and acquiring a plurality of measurement data of the geomagnetic field, each measurement data being represented by a data point in the coordinate system;

an offset estimation step of estimating an offset value of the magnetic offset of the geomagnetic sensor from the plurality of the measurement data of the geomagnetic field, the offset value being represented by an offset point in the coordinate system;

a mean value calculation step of calculating distances between the offset point corresponding to the offset value and a plurality of the data points corresponding to the plurality of the measurement data used for estimating of the offset value, and further calculating a mean value of the calculated distances between the offset point and the plurality of the data points;

a standard deviation calculation step of calculating a standard deviation of the calculated distances with respect to the calculated mean value of the distances; and a validity judgment step of judging validity of the estimated offset value on the basis of the calculated standard deviation.

2. The method according to claim 1, wherein the portable information terminal apparatus has a first storage and a second storage, and the data measurement step successively acquires the measurement data from the geomagnetic sensor, the method further comprising:

a data storing step of storing the measurement data successively acquired by the data measurement step into the first storage, so that the offset estimation step reads out the plurality of the measurement data from the first storage and estimates the offset value of the magnetic offset from the plurality of the measurement data read out from the first storage; and an offset storing step of storing the estimated offset data in the second storage when the validity of the estimated offset value is confirmed by the validity judgment step.

3. The method according to claim 1, wherein the portable information terminal apparatus has a first storage for storing the measurement data and a second storage for storing the offset value, and the data measurement step successively acquires the measurement data including previous measurement data and current measurement data, the method further comprising:

a distance calculation step of calculating a distance between a current data point corresponding to the current measurement data and a previous data point corresponding to the previous measurement data which has been stored in the first storage;

a determining step of determining whether the calculated distance between the current data point and the previous data point is greater than a predetermined distance;

a data storing step of storing the current measurement data in the first storage when the calculated distance is determined greater than the predetermined distance, thereby accumulating the measurement data in the first storage by repeating a routine of the distance calculation step, the determining step and the data storing step, so that the offset estimation step reads out the plurality of the measurement data from the first storage when a number of the measurement data stored in the first storage reaches a predetermined number and estimates the offset value of the magnetic offset from the plurality of the measurement data read out from the first storage; and an offset storing step of storing the estimated offset data in the second storage when the validity of the estimated offset value is confirmed by the validity judgment step.

4. The method according to claim 1, further comprising a notifying step of notifying a user when the estimated offset value is judged not to be valid by the validity judgment step.

5. The method according to claim 1, further comprising a comparing step of comparing with one anther the plurality of the measurement data each of which is used for the estimating of the offset value and each of which is denoted by a set of coordinate components corresponding to a set of the axes of the coordinate system, such that the comparing is done in terms of the coordinate components of the measurement data for each axis to obtain a difference between a maximum value and a minimum value of the coordinate components for each axis, wherein the validity judgment step judges the validity of the estimated offset value on the basis of the obtained difference between the maximum value and the minimum value of the coordinate components for each axis in addition to the calculated standard deviation.

6. The method according to claim 1, wherein the data measurement step measures the output of the geomagnetic sensor which is selected from a group consisting of a Giant Magnetoresistive device, a Tunneling Magnetoresistive device, a Magnetoresistive device, a Hall device, a Magneto Impedance device and a flux gate sensor.

7. The method according to claim 1, wherein the data measurement step measures the output of the geomagnetic sensor having a magnetic sensitivity either in two axes of a two dimensional coordinate system or three axes of a three dimensional coordinate system, such that each measurement data is represented by a data point in either of the two dimensional coordinate system or the three dimensional coordinate system.

8. A method of measuring a magnetic offset of a geomagnetic sensor equipped in a portable information terminal apparatus having a storage, the geomagnetic sensor having a magnetic sensitivity to a geomagnetic field in a plurality of axes of a coordinate system and being affected by magnetization to cause the magnetic offset, the method comprising:
    a data measurement step of measuring an output of the geomagnetic sensor, and successively providing a plurality of measurement data of the geomagnetic field including previous measurement data and current measurement data, each measurement data being represented by a data point in the coordinate system;
    a distance determining step of calculating a distance between a current data point corresponding to the current measurement data and a previous data point corresponding to the previous measurement data which has been stored in the storage, and determining whether the calculated distance between the current data point and the previous data point is greater than a predetermined distance;
    a data storing step of storing the current measurement data in the storage when the calculated distance is determined greater than the predetermined distance, thereby accumulating the measurement data in the storage; and
    an offset estimation step of reading a plurality of the measurement data from the storage and estimating an offset value of the magnetic offset from the plurality of the measurement data read out from the storage.

9. A method of measuring a magnetic offset of a geomagnetic sensor equipped in a portable information terminal apparatus having a storage and an inclination sensor, the geomagnetic sensor having a magnetic sensitivity to a geomagnetic field in two axes of a two dimensional coordinate system and being affected by magnetization to cause the magnetic offset, the inclination sensor sensing an inclination angle of the portable information terminal apparatus, the method comprising:
    a data measurement step of measuring an output of the geomagnetic sensor, and successively providing a plurality of the measurement data of the geomagnetic field including preceding measurement data and succeeding measurement data;
    an inclination measurement step of measuring an output of the inclination sensor and successively providing a plurality of angle data which represent the inclination angles of the portable information terminal apparatus and which include preceding angle data measured concurrently with the preceding measurement data and succeeding angle data measured concurrently with the succeeding measurement data;
    a data storing step of storing the succeeding measurement data in the storage when a difference between a inclination angle of the portable information terminal apparatus denoted by the succeeding angle data and another inclination angle of the portable information terminal apparatus denoted by the preceding angle data is greater than a predetermined difference, thereby accumulating the measurement data in the storage by repeating a routine of the data measurement step, the inclination measurement step and the data storing step; and
    an offset estimation step of reading out a plurality of the accumulated measurement data from the storage and estimating the offset value of the magnetic offset from the plurality of the accumulated measurement data read out from the storage.

10. The method according to claim 9, wherein the offset estimation step reads out the plurality of the accumulated measurement data from the storage to estimate the offset value when a number of the measurement data accumulated in the storage reaches a predetermined number, the method further comprising:
    a mean value calculation step of calculating distances between an offset point defined in the two dimensional coordinate system in correspondence to the estimated offset value and a plurality of data points defined in the two dimensional coordinate system in correspondence to the plurality of the measurement data used for the estimating of the offset value, and further calculating a mean value of the calculated distances between the offset point and the plurality of the data points;
    a standard deviation calculation step of calculating a standard deviation of the calculated distances with respect to the calculated mean value of the distances;
    a validity judgment step of judging validity of the estimated offset value on the basis of the calculated standard deviation; and
    an offset storing step of storing the estimated offset data when the validity of the estimated offset value is confirmed by the validity judgment step.

11. A method of measuring a magnetic offset of a geomagnetic sensor equipped in a portable information terminal apparatus having a storage, the geomagnetic sensor having a magnetic sensitivity to a geomagnetic field and being affected by magnetization to cause the magnetic offset, the method comprising:
    a data measurement step of measuring an output of the geomagnetic sensor and successively providing measurement data of the geomagnetic field from the output of the geomagnetic sensor;

a data storing step of storing the measurement data into the storage; and an offset estimation step of reading out the measurement data from the storage when a number of the measurement data stored in the storage reaches a predetermined number, and estimating an offset value of the magnetic offset based on the predetermined number of the measurement data read out from the storage.

12. An azimuth measurement method performed in a portable electronic apparatus having a geomagnetic sensor and a foldable body handled by opening operation and closing operation, the method comprising the steps of:

using the geomagnetic sensor to measure a geomagnetism with a certain offset and outputting measurement data of the geomagnetism such that the measurement data may contain an error due to the offset;

detecting an azimuth direction based on the measurement data from the geomagnetic sensor;

detecting the opening operation or the closing operation of the foldable body;

commencing acquisition of a series of the measurement data from the geomagnetic sensor when either of the opening operation or the closing operation of the foldable body is detected;

estimating a value of the offset on the basis of the acquired series of the measurement data; and setting the estimated value of the offset for use in correcting the error contained in the measurement data during the detection of the azimuth direction.

13. A method of measuring a magnetic offset of a geomagnetic sensor which has a magnetic sensitivity to a geomagnetism in axes X, Y and Z of a coordinate system XYZ, and which is affected by magnetization to cause the magnetic offset, the method comprising:

a data measurement step of measuring an output of the geomagnetic sensor and acquiring a plurality of measurement data (xi, yi, zi) (i=1, . . . , N) of the geomagnetism; and an offset estimation step of estimating an offset value (X0, Y0, Z0) of the magnetic offset of the geomagnetic sensor from the plurality of the measurement data (xi, yi, zi) (i=1, . . . , N) of the geomagnetism, wherein the offset value (X0, Y0, Z0) is estimated by the steps (1) through (6) of:

(1) assuming a compass sphere of the geomagnetic sensor having a radius R in the coordinate system XYZ, and making an equation $(xi-X0)^2+(yi-Y0)^2+(zi-Z0)^2=R^2$ for each of the measurement data (xi, yi, zi) (i=1, . . . , N);

(2) defining a square error $\epsilon$ for the above equations;

$$\begin{aligned}\varepsilon &= \sum \{(x_i - X0)^2 + (y_i - Y0)^2 + (z_i - Z0)^2 - R^2\}^2 \\ &= \sum \{(x_i^2 + y_i^2 + z_i^2) - 2x_iX0 - 2y_iY0 - 2z_iZ0 + \\ & \quad (X0^2 + Y0^2 + Z0^2) - R^2\}^2\end{aligned}$$

(3) shaping the square error $\epsilon$ as follows;

$\epsilon = \Sigma(a_i + b_i X0 + c_i Y0 + d_i Z0 + D)^2$ where, $a_i = xi^2 + yi^2 + zi^2$, $b_i = -2xi$, $c_i = -2yi$, $d_i = -2zi$ and $D = (X0^2 + Y0^2 + Z0^2) - R^2$;

(4) differentiating $\epsilon$ with the variables X0, Y0, Z0, and D as follows for setting the square error $\epsilon$ to the minimum;

$$\begin{cases}\frac{\partial \varepsilon}{\partial X0} = 2\sum (a_i + b_i X0 + c_i Y0 + d_i Z0 + D)b_i = 0 \\ \frac{\partial \varepsilon}{\partial Y0} = 2\sum (a_i + b_i X0 + c_i Y0 + d_i Z0 + D)c_i = 0 \\ \frac{\partial \varepsilon}{\partial Z0} = 2\sum (a_i + b_i X0 + c_i Y0 + d_i Z0 + D)d_i = 0 \\ \frac{\partial \varepsilon}{\partial D} = 2\sum (a_i + b_i X0 + c_i Y0 + d_i Z0 + D) = 0\end{cases}$$

(5) obtaining the following simultaneous equations by effecting the above differentiating computation, where the variables X0, Y0, Z0 and D are treated as an independent variable of $\epsilon$ for simplifying the computation;

$$\begin{bmatrix}[bb] & [bc] & [bd] & [b] \\ [bc] & [cc] & [cd] & [c] \\ [bd] & [cd] & [dd] & [d] \\ [b] & [c] & [d] & N\end{bmatrix}\begin{bmatrix}X0 \\ Y0 \\ Z0 \\ D\end{bmatrix} = \begin{bmatrix}-[ab] \\ -[ac] \\ -[ad] \\ -[a]\end{bmatrix}$$

where the operator [ ] used in the above equation represents:

$$[m] = \sum_{i=1}^{N} m_i, \quad [m, n] = \sum_{t=1}^{N} m_i n_i$$

(6) solving these simultaneous equations to derive the estimated offset (X0, Y0, Z0).

14. An azimuth detection method performed in a portable electronic apparatus which has a geomagnetic sensor and a foldable body handled by opening operation and closing operation, and which generates a leakage magnetic field, the method comprising the steps of:

using the geomagnetic sensor for measuring a geomagnetic field with an offset and outputting measurement data of the geomagnetic field such that the measurement data may contain an error due to the offset;

detecting an azimuth direction based on the measurement data from the geomagnetic sensor;

acquiring a plurality of the measurement data from the geomagnetic sensor, and estimating a value of the offset on the basis of the acquired measurement data for use in correcting the error contained in the measurement data during the detection of the azimuth direction;

detecting the opening operation of the foldable body;

computing a value of the leakage magnetic field generated by the portable electronic apparatus when the opening operation of the foldable body is detected; and subtracting the computed value of the leakage magnetic field from the estimated value of the offset, thereby removing an influence of the leakage magnetic field from the estimated value of the offset.

15. An apparatus for measuring a magnetic offset of a geomagnetic sensor equipped in a portable information terminal, the geomagnetic sensor having a magnetic sensitivity to a geomagnetic field in a plurality of axes of a coordinate system, and being affected by magnetization to cause the magnetic offset, the apparatus comprising:

a data measurement section that measures an output of the geomagnetic sensor and that acquires a plurality of measurement data of the geomagnetic field, each measurement data being represented by a data point in the coordinate system;

an offset estimation section that estimates an offset value of the magnetic offset of the geomagnetic sensor from the plurality of the measurement data of the geomagnetic field, the offset value being represented by an offset point in the coordinate system;

a mean value calculation section that calculates distances between the offset point corresponding to the offset value and a plurality of the data points corresponding to the plurality of the measurement data used for estimating of the offset value, and further calculates a mean value of the calculated distances between the offset point and the plurality of the data points;

a standard deviation calculation section that calculates a standard deviation of the calculated distances with respect to the calculated mean value of the distances; and a validity judgment section that judges validity of the estimated offset value on the basis of the calculated standard deviation.

16. An apparatus for measuring a magnetic offset of a geomagnetic sensor equipped in a portable information terminal, the geomagnetic sensor having a magnetic sensitivity to a geomagnetic field in a plurality of axes of a coordinate system and being affected by magnetization to cause the magnetic offset, the apparatus comprising:

a data measurement section that measures an output of the geomagnetic sensor, and successively provides a plurality of measurement data of the geomagnetic field including previous measurement data and current measurement data, each measurement data being represented by a data point in the coordinate system;

a distance determining section that calculates a distance between a current data point corresponding to the current measurement data and a previous data point corresponding to the previous measurement data which has been stored in the storage, and that determines whether the calculated distance between the current data point and the previous data point is greater than a predetermined distance;

a data storage that stores the current measurement data when the calculated distance is determined greater than the predetermined distance, thereby accumulating the measurement data; and an offset estimation section that reads a plurality of the measurement data from the data storage and estimates an offset value of the magnetic offset from the plurality of the measurement data read out from the data storage.

17. An apparatus for measuring a magnetic offset of a geomagnetic sensor equipped in a portable information terminal having an inclination sensor, the geomagnetic sensor having a magnetic sensitivity to a geomagnetic field in two axes of a two dimensional coordinate system and being affected by magnetization to cause the magnetic offset, the inclination sensor sensing an inclination angle of the portable information terminal, the apparatus comprising:

a data measurement section that measures an output of the geomagnetic sensor, and successively provides a plurality of the measurement data of the geomagnetic field including preceding measurement data and succeeding measurement data;

an inclination measurement section that measures an output of the inclination sensor and successively provides a plurality of angle data which represent the inclination angles of the portable information terminal and which include preceding angle data measured concurrently with the preceding measurement data and succeeding angle data measured concurrently with the succeeding measurement data;

a data storage that stores the succeeding measurement data when a difference between a inclination angle of the portable information terminal denoted by the succeeding angle data and another inclination angle of the portable information terminal denoted by the preceding angle data is greater than a predetermined difference, thereby accumulating the measurement data by repeatedly operating the data measurement section and the inclination measurement section; and an offset estimation section that reads out a plurality of the accumulated measurement data from the data storage and estimates the offset value of the magnetic offset from the plurality of the accumulated measurement data read out from the data storage.

18. An apparatus for measuring a magnetic offset of a geomagnetic sensor equipped in a portable information terminal, the geomagnetic sensor having a magnetic sensitivity to a geomagnetic field and being affected by magnetization to cause the magnetic offset, the apparatus comprising:

a data measurement section that measures an output of the geomagnetic sensor and successively provides measurement data of the geomagnetic field from the output of the geomagnetic sensor;

a data storage that stores the measurement data; and an offset estimation section that reads out the measurement data from the data storage when a number of the measurement data stored in the data storage reaches a predetermined number, and that estimates an offset value of the magnetic offset based on the predetermined number of the measurement data read out from the data storage.

19. A portable electronic apparatus having a foldable body handled by opening operation and closing operation, comprising:

an azimuth detection section that has a geomagnetic sensor for measuring a geomagnetism with an offset and outputting measurement data of the geomagnetism such that the measurement data may contain an error due to the offset, and that detects an azimuth direction based on the measurement data from the geomagnetic sensor;

an open/close detection section that detects the opening operation or the closing operation of the foldable body; and a control section that responds when either of the opening operation or the closing operation is detected for commencing acquisition of a series of the measurement data from the geomagnetic sensor, then that estimates a value of the offset on the basis of the acquired series of the measurement data, and that sets the estimated value of the offset for use in correcting the error contained in the measurement data during the detection of the azimuth direction.

20. The portable electronic apparatus according to claim 19, wherein the foldable body comprises a pair of units coupled to open and close with one another by the opening operation and the closing operation, and wherein the open/close detection section physically senses the opening and closing of the pair of the units for detecting the opening operation and the closing operation.

21. The portable electronic apparatus according to claim 20, wherein the pair of the units comprise a stationary unit which is generally held stationary in the opening operation and a movable unit which is moved relative to the stationary unit in response to the opening operation, and wherein the geomagnetic sensor is mounted in the movable unit.

22. The portable electronic apparatus according to claim 21, further comprising a display device that displays information associated with operations of the portable electronic apparatus and that is mounted in the movable unit.

23. The portable electronic apparatus according to claim 19, wherein the foldable body contains a magnetic source of generating a magnetism which may cause the offset in the geomagnetic sensor, and wherein the geomagnetic sensor is positioned in the foldable body remote from the magnetic source such a manner as to reduce a magnetic influence of the magnetic source.

24. The portable electronic apparatus according to claim 19, further comprising:
 a validity judgment section that judges validity of the estimated value of the offset; and
 a notification section that operates when the estimated value of the offset is judged invalid by the validity judgment section for prompting a user to perform again the opening operation or the closing operation.

25. The portable electronic apparatus according to claim 19, further comprising:
 a validity judgment section that judges validity of the estimated value of the offset; and
 a notification section that operates when the estimated value of the offset is judged invalid by the validity judgment section for prompting a user to further perform the opening operation and the closing operation while placing the foldable body in different orientations.

26. The portable electronic apparatus according to claim 19, wherein the foldable body is a revolver type having a part which revolves in the opening operation or the closing operation.

27. The portable electronic apparatus according to claim 26, wherein the geomagnetic sensor measures the geomagnetism in three axes orthogonal to each other, and wherein the foldable body of the revolver type comprises a pair of a stationary unit and a movable unit, which are coupled to open and close with one another by the opening operation and the closing operation, the stationary unit generally being held stationary in the opening operation and the movable unit being revolved to displace in directions of the three axes in response to the opening operation.

28. An apparatus for measuring a magnetic offset of a geomagnetic sensor which has a magnetic sensitivity to a geomagnetism in axes X, Y and Z of a coordinate system XYZ, and which is affected by magnetization to cause the magnetic offset, the apparatus comprising:
 a data measurement section that measures an output of the geomagnetic sensor and acquires a plurality of measurement data (xi, yi, zi) (i=1, ..., N) of the geomagnetism; and
 an offset estimation section that estimates an offset value (X0, Y0, Z0) of the magnetic offset of the geomagnetic sensor from the plurality of the measurement data (xi, yi, zi) (i=1, ..., N) of the geomagnetism,
 wherein the offset value (X0, Y0, Z0) is estimated by the following computation algorithm (1) through (6):
 (1) assuming a compass sphere of the geomagnetic sensor having a radius R in the coordinate system XYZ, and making an equation $(xi-X0)^2+(yi-Y0)^2+(zi-Z0)^2=R^2$ for each of the measurement data (xi, yi, zi) (i=1, N);

(2) defining a square error $\epsilon$ for the above equations;

$$\varepsilon = \sum \{(x_i - X0)^2 + (y_i - Y0)^2 + (z_i - Z0)^2 - R^2\}^2$$
$$= \sum \{(x_i^2 + y_i^2 + z_i^2) - 2x_i X0 - 2y_i Y0 - 2z_i Z0 + (X0^2 + Y0^2 + Z0^2) - R^2\}^2$$

(3) shaping the square error $\epsilon$ as follows;

$$\epsilon = \Sigma(a_i + b_i X0 + c_i Y0 + d_i Z0 + D)^2$$

where, $a_i = xi^2 + yi^2 + zi^2$, $b_i = -2xi$, $c_i = -2yi$, $d_i = -2zi$ and $D = (X0^2 + Y0^2 + Z0^2) - R^2$;

(4) differentiating E with the variables X0, Y0, Z0, and D as follows for setting the square error $\epsilon$ to the minimum;

$$\begin{cases} \frac{\partial \varepsilon}{\partial X0} = 2\sum (a_i + b_i X0 + c_i Y0 + d_i Z0 + D)b_i = 0 \\ \frac{\partial \varepsilon}{\partial Y0} = 2\sum (a_i + b_i X0 + c_i Y0 + d_i Z0 + D)c_i = 0 \\ \frac{\partial \varepsilon}{\partial Z0} = 2\sum (a_i + b_i X0 + c_i Y0 + d_i Z0 + D)d_i = 0 \\ \frac{\partial \varepsilon}{\partial D} = 2\sum (a_i + b_i X0 + c_i Y0 + d_i Z0 + D) = 0 \end{cases}$$

(5) obtaining the following simultaneous equations by effecting the above differentiating computation, where the variables X0, Y0, Z0 and D are treated as an independent variable of $\epsilon$ for simplifying the computation;

$$\begin{bmatrix} [bb] & [bc] & [bd] & [b] \\ [bc] & [cc] & [cd] & [c] \\ [bd] & [cd] & [dd] & [d] \\ [b] & [c] & [d] & N \end{bmatrix} \begin{bmatrix} X0 \\ Y0 \\ Z0 \\ D \end{bmatrix} = \begin{bmatrix} -[ab] \\ -[ac] \\ -[ad] \\ -[a] \end{bmatrix}$$

where the operator [ ] used in the above equation represents:

$$[m] = \sum_{i=1}^{N} m_i, \ [m, n] = \sum_{i=1}^{N} m_i n_i$$

(6) solving these simultaneous equations to derive the estimated offset (X0, Y0, Z0).

29. A portable electronic apparatus having a foldable body handled by opening operation and closing operation, and generating a leakage magnetic field, comprising;
 an azimuth detection section that has a geomagnetic sensor for measuring a geomagnetic field with an offset and outputting measurement data of the geomagnetic field such that the measurement data may contain an error due to the offset, and that detects an azimuth direction based on the measurement data from the geomagnetic sensor;
 an offset estimation section that acquires a plurality of the measurement data from the geomagnetic sensor, and that estimates a value of the offset on the basis of the acquired measurement data for use in correcting the error contained in the measurement data during the detection of the azimuth direction;

an operation detection section that detects the opening operation of the foldable body; and a leakage magnetic field removal section that operates when the opening operation of the foldable body is detected for computing a value of the leakage magnetic field generated in the foldable body and that subtracts the computed value of the leakage magnetic field from the estimated value of the offset, thereby removing an influence of the leakage magnetic field from the estimated value of the offset.

30. The portable electronic apparatus according to claim 29, wherein the foldable body comprises a pair of units coupled to open and close with one another by the opening operation and the closing operation, and wherein the operation detection section physically senses the opening of the pair of the units for detecting the opening operation.

31. The portable electronic apparatus according to claim 29, wherein the leakage magnetic field removal section operates when the opening operation of the foldable body is detected for acquiring a series of the measurement data from the geomagnetic sensor, and computes the value of the leakage magnetic field based on the acquired measurement data.

32. The portable electronic apparatus according to claim 29, wherein the operation detection section further detects the closing operation of the foldable body, and wherein the offset estimation section operates when the closing operation is detected for commencing acquisition of a series of the measurement data from the geomagnetic sensor, and estimates the value of the offset on the basis of the acquired series of the measurement data.

33. A magnetic sensor device equipped in a portable electronic apparatus which has a foldable body handled by opening operation and closing operation, and which generates a leakage magnetic field, the magnetic sensor device comprising:

an azimuth detection section that has a geomagnetic sensor for measuring a geomagnetic field with an offset and outputting measurement data of the geomagnetic field such that the measurement data may contain an error due to the offset, and that detects an azimuth direction based on the measurement data from the geomagnetic sensor;

an offset estimation section that acquires a plurality of the measurement data from the geomagnetic sensor, and that estimates a value of the offset on the basis of the acquired measurement data for use in correcting the error contained in the measurement data during the detection of the azimuth direction; and a leakage magnetic field removal section that responds to the opening operation of the foldable body for computing a value of the leakage magnetic field generated in the foldable body and that subtracts the computed value of the leakage magnetic field from the estimated value of the offset, thereby removing an influence of the leakage magnetic field from the estimated value of the offset.

34. A machine readable medium for use in a portable information terminal apparatus having a CPU and geomagnetic sensor which has a magnetic sensitivity to a geomagnetic field in a plurality of axes of a coordinate system and which is affected by magnetization to cause an magnetic offset, the medium containing program instructions executable by the CPU for causing the portable information terminal apparatus to perform a method of measuring the magnetic offset of the geomagnetic sensor, wherein the method comprises:

a data measurement step of measuring an output of the geomagnetic sensor and acquiring a plurality of measurement data of the geomagnetic field, each measurement data being represented by a data point in the coordinate system;

an offset estimation step of estimating an offset value of the magnetic offset of the geomagnetic sensor from the plurality of the measurement data of the geomagnetic field, the offset value being represented by an offset point in the coordinate system;

a mean value calculation step of calculating distances between the offset point corresponding to the offset value and a plurality of the data points corresponding to the plurality of the measurement data used for estimating of the offset value, and further calculating a mean value of the calculated distances between the offset point and the plurality of the data points;

a standard deviation calculation step of calculating a standard deviation of the calculated distances with respect to the calculated mean value of the distances; and a validity judgment step of judging validity of the estimated offset value on the basis of the calculated standard deviation.

35. A machine readable medium for use in a portable information terminal apparatus having a CPU, a storage and a geomagnetic sensor which has a magnetic sensitivity to a geomagnetic field in a plurality of axes of a coordinate system and which is affected by magnetization to cause an magnetic offset, the medium containing program instructions executable by the CPU for causing the portable information terminal apparatus to perform a method of measuring the magnetic offset of the geomagnetic sensor, wherein the method comprises:

a data measurement step of measuring an output of the geomagnetic sensor, and successively providing a plurality of measurement data of the geomagnetic field including previous measurement data and current measurement data, each measurement data being represented by a data point in the coordinate system;

a distance determining step of calculating a distance between a current data point corresponding to the current measurement data and a previous data point corresponding to the previous measurement data which has been stored in the storage, and determining whether the calculated distance between the current data point and the previous data point is greater than a predetermined distance;

a data storing step of storing the current measurement data in the storage when the calculated distance is determined greater than the predetermined distance, thereby accumulating the measurement data in the storage; and an offset estimation step of reading a plurality of the measurement data from the storage and estimating an offset value of the magnetic offset from the plurality of the measurement data read out from the storage.

36. A machine readable medium for use in a portable information terminal apparatus having a CPU, a storage, a geomagnetic sensor and an inclination sensor, the geomagnetic sensor having a magnetic sensitivity to a geomagnetic field in two axes of a two dimensional coordinate system and being affected by magnetization to cause a magnetic offset, the inclination sensor sensing an inclination angle of the portable information terminal apparatus, the medium containing program instructions executable by the CPU for causing the portable information terminal apparatus to perform a method of measuring the magnetic offset of the geomagnetic sensor, wherein the method comprises:
- a data measurement step of measuring an output of the geomagnetic sensor, and successively providing a plurality of the measurement data of the geomagnetic field including preceding measurement data and succeeding measurement data;
- an inclination measurement step of measuring an output of the inclination sensor and successively providing a plurality of angle data which represent the inclination angles of the portable information terminal apparatus and which include preceding angle data measured concurrently with the preceding measurement data and succeeding angle data measured concurrently with the succeeding measurement data;
- a data storing step of storing the succeeding measurement data in the storage when a difference between a inclination angle of the portable information terminal apparatus denoted by the succeeding angle data and another inclination angle of the portable information terminal apparatus denoted by the preceding angle data is greater than a predetermined difference, thereby accumulating the measurement data in the storage by repeating a routine of the data measurement step, the inclination measurement step and the data storing step; and
- an offset estimation step of reading out a plurality of the accumulated measurement data from the storage and estimating the offset value of the magnetic offset from the plurality of the accumulated measurement data read out from the storage.

37. A machine readable medium for use in a portable information terminal apparatus having a CPU, a storage and a geomagnetic sensor which has a magnetic sensitivity to a geomagnetic field and which is affected by magnetization to cause an magnetic offset, the medium containing program instructions executable by the CPU for causing the portable information terminal apparatus to perform a method of measuring the magnetic offset of the geomagnetic sensor, wherein the method comprises:
- a data measurement step of measuring an output of the geomagnetic sensor and successively providing measurement data of the geomagnetic field from the output of the geomagnetic sensor;
- a data storing step of storing the measurement data into the storage; and
- an offset estimation step of reading out the measurement data from the storage when a number of the measurement data stored in the storage reaches a predetermined number, and estimating an offset value of the magnetic offset based on the predetermined number of the measurement data read out from the storage.

38. A machine readable medium for use in a portable electronic apparatus having a CPU, a geomagnetic sensor and a foldable body which is handled by opening operation and closing operation and which generates a leakage magnetic field, the machine readable medium containing an azimuth measurement program executable by the CPU for causing the portable electronic apparatus to perform an azimuth measurement process comprising the steps of:
- operating the geomagnetic sensor for measuring a geomagnetic field with a certain offset and outputting measurement data of the geomagnetic field such that the measurement data may contain an error due to the offset;
- detecting an azimuth direction based on the measurement data from the geomagnetic sensor;
- acquiring a plurality of the measurement data from the geomagnetic sensor, and estimating a value of the offset on the basis of the acquired measurement data for use in correcting the error contained in the measurement data during the detection of the azimuth direction;
- detecting the opening operation of the foldable body;
- computing a value of the leakage magnetic field generated from the foldable body when the opening operation of the foldable body is detected; and
- subtracting the computed value of the leakage magnetic field from the estimated value of the offset, thereby removing an influence of the leakage magnetic field from the estimated value of the offset.

* * * * *